(12) United States Patent
Negoro et al.

(10) Patent No.: US 8,141,109 B2
(45) Date of Patent: Mar. 20, 2012

(54) DISC DRIVE APPARATUS AND ELECTRONIC APPARATUS

(75) Inventors: Hisashi Negoro, Chiba (JP); Keiji Jitsukawa, Chiba (JP); Mitsuru Iba, Tokyo (JP); Shunsuke Nirei, Tokyo (JP); Tomoyasu Takaoka, Saitama (JP)

(73) Assignees: Sony Corporation, Tokyo (JP); Sony Optiarc Inc., Tokyo (JP)

( * ) Notice: Subject to any disclaimer, the term of this patent is extended or adjusted under 35 U.S.C. 154(b) by 31 days.

(21) Appl. No.: 12/871,247

(22) Filed: Aug. 30, 2010

(65) Prior Publication Data

US 2011/0061067 A1   Mar. 10, 2011

(30) Foreign Application Priority Data

Sep. 7, 2009   (JP) ................................ 2009-205906

(51) Int. Cl.
*G11B 17/04* (2006.01)
(52) U.S. Cl. ..................................................... 720/620
(58) Field of Classification Search .................. 720/620, 720/621, 622, 623, 704
See application file for complete search history.

(56) References Cited

U.S. PATENT DOCUMENTS

| 7,401,342 B2 * | 7/2008 | Kasama et al. ............... 720/622 |
| 7,487,518 B2 * | 2/2009 | Lee et al. ...................... 720/619 |
| 7,770,190 B2 * | 8/2010 | Fujisawa et al. ............. 720/626 |
| 7,793,314 B2 * | 9/2010 | Yamamoto et al. ........... 720/623 |
| 7,856,641 B2 * | 12/2010 | Omori et al. .................. 720/623 |
| 8,000,097 B2 * | 8/2011 | Yamamoto et al. ...... 361/679.37 |

FOREIGN PATENT DOCUMENTS

JP    4298758    4/2009

* cited by examiner

*Primary Examiner* — Angel A. Castro
(74) *Attorney, Agent, or Firm* — Oblon, Spivak, McClelland, Maier & Neustadt, L.L.P.

(57) ABSTRACT

A disc drive apparatus includes: an outer casing; a disc drive unit that includes a disc table on which a disc-like recording medium is mounted, a spindle motor, an optical pickup, and a pickup base; a slider that includes a main body and a rack gear, is movable in a first direction as an insertion direction and a second direction as an ejection direction, and moves in the second direction during loading and moved in the first direction during ejection; a drive motor functioning as a drive source of the slider; a deceleration gear group that intermeshes with the rack gear; an eject lever that is rotated to press the recording medium during the ejection; and a link member coupled with the eject lever, the slider including a lock plate and a slide plate.

8 Claims, 37 Drawing Sheets

DISC DRIVE APPARATUS AND ELECTRONIC APPARATUS

BACKGROUND OF THE INVENTION

1. Field of the Invention

The present invention relates to a technical field on a disc drive apparatus and an electronic apparatus, more particularly, to a technical field in which a lock plate and a slide plate for releasing a locked state of a rack gear are provided in a slider for performing an eject operation to thus enable a disc-like recording medium to be ejected smoothly.

2. Description of the Related Art

Various electronic apparatuses such as a personal computer and an acoustic apparatus are sometimes provided with a disc drive apparatus for recording and/or reproducing information signals onto/from a disc-like recording medium such as a CD (Compact Disc) and a DVD (Digital Versatile Disc).

A slider that is moved in a front-back direction by a drive motor is provided in the disc drive apparatus, and by moving the slider in the front-back direction, the disc-like recording medium is loaded and ejected in accordance with the movement direction.

In such a disc drive apparatus, a worm is fixed to a motor shaft of the drive motor, a rack gear is provided in the slider, and the worm and the rack gear intermesh with gears in a deceleration gear group. Therefore, a drive force of the drive motor is transmitted to the worm, the deceleration gear group, and the rack gear in the stated order to thus decelerate the slider and move it in the front-back direction.

In the disc drive apparatus that includes the drive motor as described above, a forcible eject mechanism for forcibly ejecting the disc-like recording medium in a case where the drive motor becomes inoperable due to a failure in a circuit that supplies power to the drive motor, for example, is provided (see, for example, Japanese Patent No. 4298758; hereinafter, referred to as Patent Document 1).

In the forcible eject mechanism provided in the disc drive apparatus disclosed in Patent Document 1, an eject pin presses a rotary plate on which one gear among the deceleration gear group is supported to rotate it. With the rotation of the rotary plate, an intermeshed state of two gears among the deceleration gear group is released, and the slider is pressed by the eject pin to be moved. As a result, a forcible eject operation is performed.

SUMMARY OF THE INVENTION

However, since the intermeshed state of the two gears among the deceleration gear group is released in the disc drive apparatus disclosed in Patent Document 1, at least one gear of the deceleration gear group is intermeshed with the rack gear of the slider during the forcible eject operation.

Therefore, the slider needs to be pressed by the eject pin in a state where the rack gear is intermeshed with the gear of the deceleration gear group, with the result that a load with respect to the press by the eject pin increases that much, and the eject operation cannot be performed smoothly.

Moreover, at the time the rotary plate is pressed by the eject pin to release the intermeshed state of the two gears among the deceleration gear group, the gear supported by the rotary plate needs to be rotated with respect to the gear intermeshed therewith to thus release the intermeshed state, thus resulting in a large load with respect to the press by the eject pin.

In this regard, there is a need for a disc drive apparatus and an electronic apparatus that enable a disc-like recording medium to be ejected smoothly.

According to an embodiment of the present invention, there is provided a disc drive apparatus including:

an outer casing including a disc insertion slot through which a disc-like recording medium is inserted and ejected;

a disc drive unit that includes a disc table on which the disc-like recording medium is mounted, a spindle motor for causing the disc table to rotate, an optical pickup that is moved in a radial direction of the disc-like recording medium mounted on the disc table, and a pickup base for supporting the optical pickup such that the optical pickup becomes movable in the radial direction of the disc-like recording medium, the disk drive unit being movable in a direction in which it moves farther away from a recording surface of the disc-like recording medium;

a slider that includes a main body and a rack gear and is movable in a first direction that is the same as an insertion direction of the disc-like recording medium with respect to the disc insertion slot and a second direction that is the same as an ejection direction of the disc-like recording medium, the slider being moved in the second direction during loading of the disc-like recording medium and moved in the first direction during ejection of the disc-like recording medium;

a drive motor that functions as a drive source for moving the slider in the first direction and the second direction;

a deceleration gear group that intermeshes with the rack gear of the slider and to which a drive force of the drive motor is transmitted;

a rotatable eject lever that is rotated in one rotational direction to press the disc-like recording medium during the ejection of the disc-like recording medium and causes the disc-like recording medium to be ejected from the disc insertion slot; and a link member that is coupled with the eject lever and to which the drive force of the drive motor is transmitted via the slider so that the link member becomes movable, the slider being provided with a lock plate that is movably supported by the main body and moved between a lock position at which the rack gear is locked with respect to the main body and a lock release position at which the lock of the rack gear with respect to the main body is released to enable the main body to move with respect to the rack gear in the first direction and the second direction, and a slide plate that is supported by the main body while being movable in the first direction and the second direction and includes a pressed portion that is pressed in the first direction, a lock release portion for moving the lock plate from the lock position to the lock release position at a time the pressed portion is pressed and moved in the first direction, and a press portion for pressing the main body and moving it in the first direction at the time the lock plate is moved to the lock release position.

Therefore, in the disc drive apparatus, the lock of the rack gear with respect to the main body is released when the lock plate is moved from the lock position to the lock release position, and the main body thus becomes movable with respect to the rack gear in the first direction and the second direction.

In the disc drive apparatus described above, the slider is desirably provided with a spring member that biases the lock plate toward the lock position from the lock release position.

By providing the spring member that biases the lock plate toward the lock position from the lock release position, the lock plate is biased toward the lock position by the spring member.

In the disc drive apparatus described above, the main body is desirably provided with a guided portion, and the rack gear is desirably provided with a guide portion that slidably supports the guided portion and guides the main body in the first direction and the second direction.

By providing the guided portion in the main body and providing the guide portion for guiding the main body in the first direction and the second direction in the rack gear, the guided portion is guided by the guide portion at the time the main body is moved with respect to the rack gear, with the result that the rack gear does not fall off from the main body.

The disc drive apparatus described above desirably further includes a chassis that supports the link member while enabling the link member to slide in a predetermined linear direction and rotatably supports the eject lever, the link member is desirably provided with a slide portion, and the slider is desirably provided with a cam portion with which the slide portion of the link member is slidably engaged and that causes the link member to slide in the predetermined linear direction.

By providing the slide portion in the link member and providing the cam portion with which the slide portion of the link member is slidably engaged and that causes the link member to slide in the slider, a link mechanism that couples the slider and the link member for applying a movement force of the slider to the link member becomes unnecessary.

In the disc drive apparatus described above, a slide pin is desirably provided as the slide portion of the link member, a cam surface facing a predetermined direction is desirably formed as the cam portion of the slider, and the link member desirably slides in the predetermined linear direction with respect to the chassis by the slide pin being pressed by the cam surface and slid at a time the slider is moved in the first direction.

By providing the slide pin as the slide portion of the link member and forming the cam surface facing a predetermined direction as the cam portion of the slider, the movement force of the slider is transmitted to the slide pin from the cam portion and applied to the link member.

The disc drive apparatus described above desirably further includes: a guide portion with which an outer circumferential surface of the disc-like recording medium is brought into sliding contact during the loading and the ejection of the disc-like recording medium to thus guide the disc-like recording medium; and a centering portion to hold the outer circumferential surface of the disc-like recording medium so that a center of the disc-like recording medium coincides with a center of the disc table during the loading of the disc-like recording medium, the guide portion and the centering portion being formed integrally.

By integrally forming the guide portion that guides the disc-like recording medium and the centering portion that holds the outer circumferential surface of the disc-like recording medium to center the disc-like recording medium, the outer circumferential surface of the disc-like recording medium is successively brought into sliding contact with the guide portion and the centering portion.

In the disc drive apparatus described above, the guide portion and the centering portion are each desirably formed of a resin material, the guide portion is desirably fixed to the outer casing, the centering portion can desirably be elastically deformed with respect to the guide portion, and the centering portion is desirably set apart from the outer circumferential surface of the disc-like recording medium by the centering portion being elastically deformed with respect to the guide portion at a time the disc-like recording medium is mounted on the disc table during the loading.

By setting the centering portion apart from the outer circumferential surface of the disc-like recording medium by elastically deforming the centering portion with respect to the guide portion at the time the disc-like recording medium is mounted on the disc table, a centering structure and operation are simplified.

According to another embodiment of the present invention, there is provided an electronic apparatus including:

an apparatus main body; and a disc drive apparatus to record and/or reproduce an information signal onto/from a disc-like recording medium loaded in the apparatus main body, the disc drive apparatus including an outer casing including a disc insertion slot through which a disc-like recording medium is inserted and ejected, a disc drive unit that includes a disc table on which the disc-like recording medium is mounted, a spindle motor for causing the disc table to rotate, an optical pickup that is moved in a radial direction of the disc-like recording medium mounted on the disc table, and a pickup base for supporting the optical pickup such that the optical pickup becomes movable in the radial direction of the disc-like recording medium, the disk drive unit being movable in a direction in which it moves farther away from a recording surface of the disc-like recording medium, a slider that includes a main body and a rack gear and is movable in a first direction that is the same as an insertion direction of the disc-like recording medium with respect to the disc insertion slot and a second direction that is the same as an ejection direction of the disc-like recording medium, the slider being moved in the second direction during loading of the disc-like recording medium and moved in the first direction during ejection of the disc-like recording medium, a drive motor that functions as a drive source for moving the slider in the first direction and the second direction, a deceleration gear group that intermeshes with the rack gear of the slider and to which a drive force of the drive motor is transmitted, a rotatable eject lever that is rotated in one rotational direction to press the disc-like recording medium during the ejection of the disc-like recording medium and causes the disc-like recording medium to be ejected from the disc insertion slot, and a link member that is coupled with the eject lever and to which the drive force of the drive motor is transmitted via the slider so that the link member becomes movable, the slider being provided with a lock plate that is movably supported by the main body and moved between a lock position at which the rack gear is locked with respect to the main body and a lock release position at which the lock of the rack gear with respect to the main body is released to enable the main body to move with respect to the rack gear in the first direction and the second direction, and a slide plate that is supported by the main body while being movable in the first direction and the second direction and includes a pressed portion that is pressed in the first direction, a lock release portion for moving the lock plate from the lock position to the lock release position at a time the pressed portion is pressed and moved in the first direction, and a press portion for pressing the main body and moving it in the first direction at the time the lock plate is moved to the lock release position.

Therefore, in the electronic apparatus, the lock of the rack gear with respect to the main body is released when the lock plate is moved from the lock position to the lock release position, and the main body thus becomes movable with respect to the rack gear in the first direction and the second direction.

The disc drive apparatus according to the embodiment of the present invention includes:

an outer casing including a disc insertion slot through which a disc-like recording medium is inserted and ejected;

a disc drive unit that includes a disc table on which the disc-like recording medium is mounted, a spindle motor for causing the disc table to rotate, an optical pickup that is moved in a radial direction of the disc-like recording medium mounted on the disc table, and a pickup base for supporting the optical pickup such that the optical pickup becomes movable in the radial direction of the disc-like recording medium, the disk drive unit being movable in a direction in which it moves farther away from a recording surface of the disc-like recording medium;

a slider that includes a main body and a rack gear and is movable in a first direction that is the same as an insertion direction of the disc-like recording medium with respect to the disc insertion slot and a second direction that is the same as an ejection direction of the disc-like recording medium, the slider being moved in the second direction during loading of the disc-like recording medium and moved in the first direction during ejection of the disc-like recording medium;

a drive motor that functions as a drive source for moving the slider in the first direction and the second direction;

a deceleration gear group that intermeshes with the rack gear of the slider and to which a drive force of the drive motor is transmitted;

a rotatable eject lever that is rotated in one rotational direction to press the disc-like recording medium during the ejection of the disc-like recording medium and causes the disc-like recording medium to be ejected from the disc insertion slot; and a link member that is coupled with the eject lever and to which the drive force of the drive motor is transmitted via the slider so that the link member becomes movable, the slider being provided with
lock plate that is movably supported by the main body and moved between a lock position at which the rack gear is locked with respect to the main body and a lock release position at which the lock of the rack gear with respect to the main body is released to enable the main body to move with respect to the rack gear in the first direction and the second direction, and a slide plate that is supported by the main body while being movable in the first direction and the second direction and includes a pressed portion that is pressed in the first direction, a lock release portion for moving the lock plate from the lock position to the lock release position at a time the pressed portion is pressed and moved in the first direction, and a press portion for pressing the main body and moving it in the first direction at the time the lock plate is moved to the lock release position.

Therefore, a load on the slide plate that is moved in the first direction at the time the lock plate is moved to the lock release position is small without the slide plate being applied with a load from the rack gear, with the result that an eject operation can be facilitated.

In the embodiment of the present invention, the slider is provided with a spring member that biases the lock plate toward the lock position from the lock release position.

Therefore, since the lock plate is biased toward the lock position by the spring member, the locked state of the rack gear with respect to the main body can be stabilized.

In the embodiment of the present invention, the main body is provided with a guided portion, and the rack gear is provided with a guide portion that slidably supports the guided portion and guides the main body in the first direction and the second direction.

Therefore, it is possible to smoothly and positively relock, after the lock of the rack gear with respect to the main body is released and the main body is moved with respect to the rack gear, the rack gear with respect to the main body by the lock plate.

In the embodiment of the present invention, the disc drive apparatus further includes a chassis that supports the link member while enabling the link member to slide in a predetermined linear direction and rotatably supports the eject lever, the link member is provided with a slide portion, and the slider is provided with a cam portion with which the slide portion of the link member is slidably engaged and that causes the link member to slide in the predetermined linear direction.

Therefore, a link mechanism for coupling the slider with the link member for applying a movement force of the slider to the link member is not required, with the result that the mechanism can be simplified that much.

In the embodiment of the present invention, a slide pin is provided as the slide portion of the link member, a cam surface facing a predetermined direction is formed as the cam portion of the slider, and the link member slides in the predetermined linear direction with respect to the chassis by the slide pin being pressed by the cam surface and slid at a time the slider is moved in the first direction.

Therefore, a structure for applying the movement force of the slider to the link member is simple, and a mechanism of the disc drive apparatus can thus be simplified.

In the embodiment of the present invention, the disc drive apparatus further includes: a guide portion with which an outer circumferential surface of the disc-like recording medium is brought into sliding contact during the loading and the ejection of the disc-like recording medium to thus guide the disc-like recording medium; and a centering portion to hold the outer circumferential surface of the disc-like recording medium so that a center of the disc-like recording medium coincides with a center of the disc table during the loading of the disc-like recording medium, the guide portion and the centering portion being formed integrally.

Therefore, the outer circumferential surface of the disc-like recording medium is smoothly brought into sliding contact with the guide portion and the centering portion to thus enable the disc-like recording medium to be loaded and ejected smoothly, and the disc-like recording medium can also be prevented from being damaged.

In the embodiment of the present invention, the guide portion and the centering portion are each formed of a resin material, the guide portion is fixed to the outer casing, the centering portion can be elastically deformed with respect to the guide portion, and the centering portion is set apart from the outer circumferential surface of the disc-like recording medium by the centering portion being elastically deformed with respect to the guide portion at a time the disc-like recording medium is mounted on the disc table during the loading.

Therefore, the centering structure and operation are simple, and the mechanism can thus be simplified.

The electronic apparatus according to the embodiment of the present invention includes:
  an apparatus main body; and
  a disc drive apparatus to record and/or reproduce an information signal onto/from a disc-like recording medium loaded in the apparatus main body,
  the disc drive apparatus including
    an outer casing including a disc insertion slot through which a disc-like recording medium is inserted and ejected,
    a disc drive unit that includes a disc table on which the disc-like recording medium is mounted, a spindle motor for causing the disc table to rotate, an optical pickup that is moved in a radial direction of the disc-like recording medium mounted on the disc table, and a pickup base for supporting the optical pickup such that the optical pickup becomes movable in the radial direction of the disc-like recording medium, the disk drive unit being movable in a direction in which it moves farther away from a recording surface of the disc-like recording medium,
    a slider that includes a main body and a rack gear and is movable in a first direction that is the same as an insertion direction of the disc-like recording medium with respect to the disc insertion slot and a second direction that is the same as an ejection direction of the disc-like recording medium, the slider being moved in the second direction during loading of the disc-like recording medium and moved in the first direction during ejection of the disc-like recording medium,
    a drive motor that functions as a drive source for moving the slider in the first direction and the second direction,
    a deceleration gear group that intermeshes with the rack gear of the slider and to which a drive force of the drive motor is transmitted,
    a rotatable eject lever that is rotated in one rotational direction to press the disc-like recording medium during the ejection of the disc-like recording medium and causes the disc-like recording medium to be ejected from the disc insertion slot, and
    a link member that is coupled with the eject lever and to which the drive force of the drive motor is transmitted via the slider so that the link member becomes movable, the slider being provided with
      a lock plate that is movably supported by the main body and moved between a lock position at which the rack gear is locked with respect to the main body and a lock release position at which the lock of the rack gear with respect to the main body is released to enable the main body to move with respect to the rack gear in the first direction and the second direction, and
      a slide plate that is supported by the main body while being movable in the first direction and the second direction and includes a pressed portion that is pressed in the first direction, a lock release portion for moving the lock plate from the lock position to the lock release position at a time the pressed portion is pressed and moved in the first direction, and a press portion for pressing the main body and moving it in the first direction at the time the lock plate is moved to the lock release position.

Therefore, a load on the slide plate that is moved in the first direction at the time the lock plate is moved to the lock release position is small without the slide plate being applied with a load from the rack gear, with the result that an eject operation can be facilitated.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, a disc drive apparatus and an electronic apparatus according to an embodiment of the present invention will be described with reference to the drawings. In the following embodiment, the electronic apparatus of the present invention is applied to a personal computer, whereas the disc drive apparatus of the present invention is applied to a disc drive apparatus equipped in the personal computer.

It should be noted that an applicable range of the electronic apparatus and the disc drive apparatus of the present invention is not limited to a personal computer and a disc drive apparatus equipped in the personal computer. The electronic apparatus of the present invention is widely applicable to various electronic apparatuses that handle disc-like recording media, an information terminal apparatus such as a game apparatus and a PDA (Personal Digital Assistant), an image pickup apparatus such as a still camera, an electronic camera, and a video camera, and a recording apparatus and an acoustic apparatus that handle various disc-like recording media. Moreover, the disc drive apparatus of the present invention is widely applicable to disc drive apparatuses that record and/or reproduce information signals onto/from the disc-like recording media handled in the various electronic apparatuses.

Figure 1:
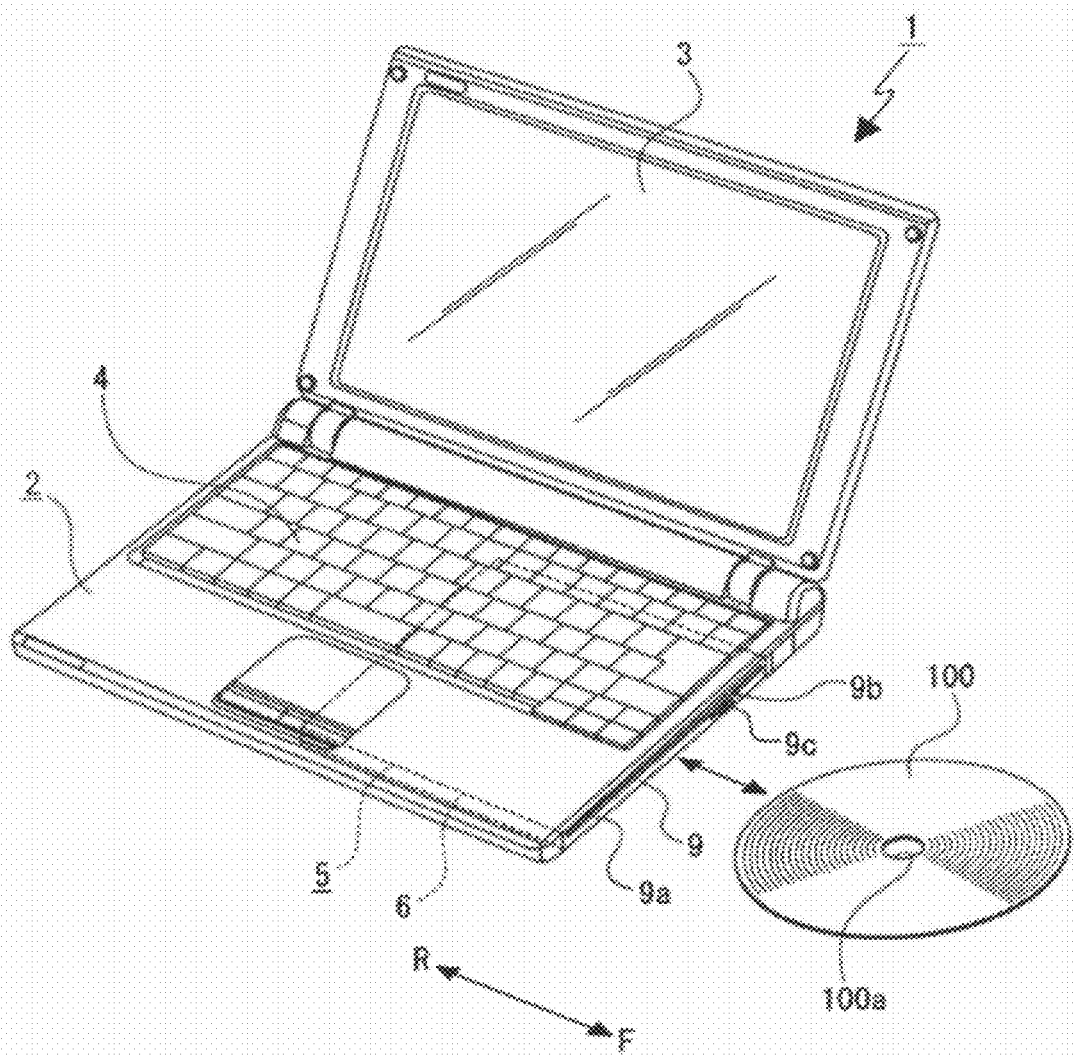
FIG. 1 is a perspective view showing, together with FIGS. 2 to 37, an electronic apparatus according to an embodiment of the present invention.

An electronic apparatus (personal computer) 1 includes, for example, an apparatus main body 2 and a display apparatus 3 rotatably supported by the apparatus main body 2. A keyboard 4 on which required operation keys are arranged is provided in the apparatus main body 2 (see FIG. 1). It should be noted that the electronic apparatus 1 may be, for example, a so-called desktop apparatus in which an apparatus main body and a keyboard are provided separately.

A disc drive apparatus 5 is incorporated in the apparatus main body 2. It should be noted that in the following description on the disc drive apparatus 5, for convenience, a disc insertion slot side to be described later is referred to as front, and an insertion direction of a disc-like recording medium with respect to the disc insertion slot is referred to as back. Front and back directions, longitudinal directions, and lateral directions are defined in a state where a user inserts a disc-like recording medium 100 into the disc insertion slot. In other words, the F direction shown in FIGS. 1 and 2 becomes the front and the R direction becomes the back.

Figure 2:
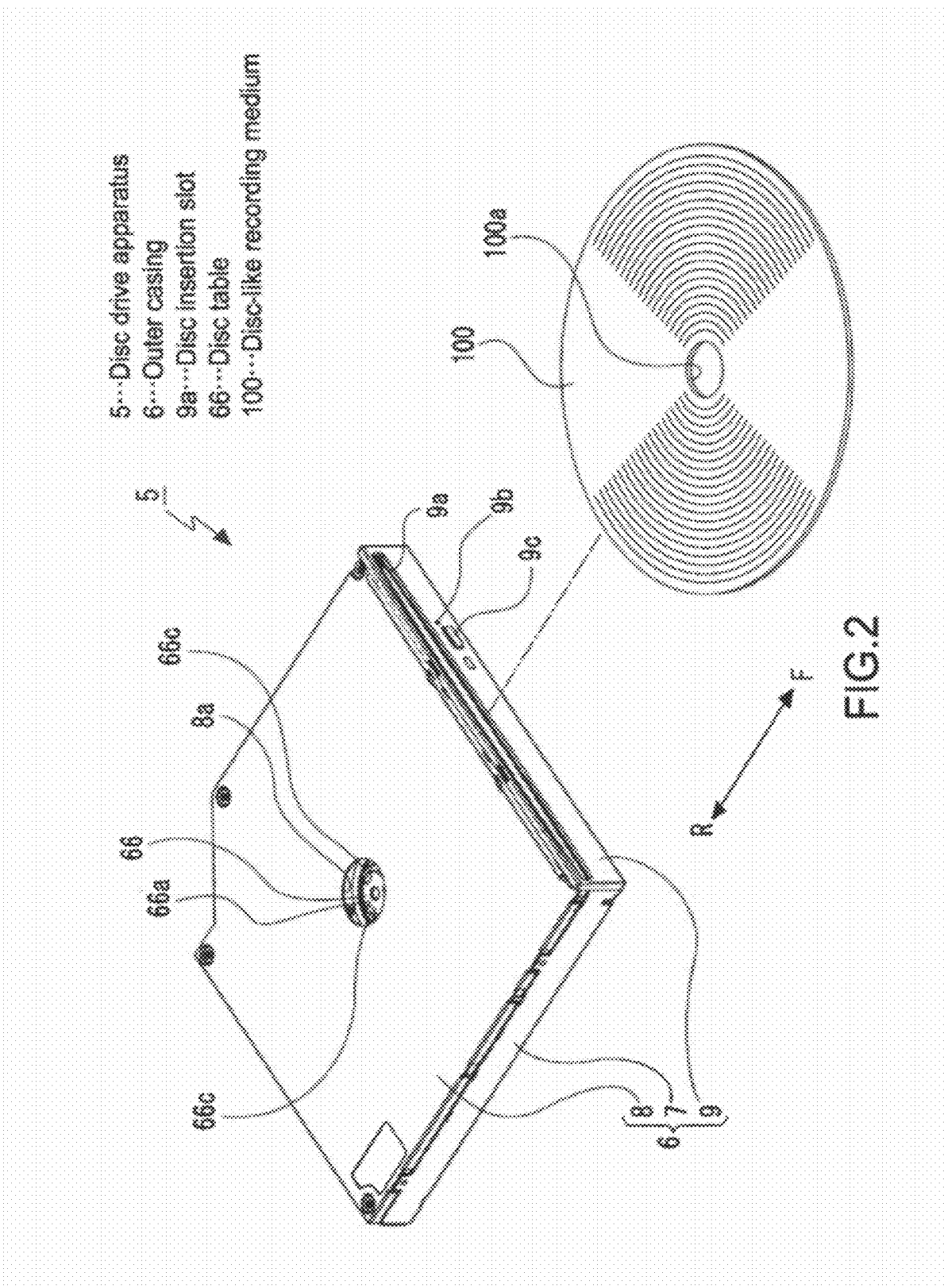
FIG. 2 is a perspective view of a disc drive apparatus and a disc-like recording medium.

The disc drive apparatus 5 is formed to be flat and substantially rectangular and has a structure in which required portions are provided in an outer casing 6 (see FIG. 2). The outer casing 6 is constituted of a case body 7 partially formed as a shallow box whose top and front are opened, a cover body 8 that covers the case body 7 from the top, and a front panel 9 attached to a front end of the case body 7.

An insertion hole 8a penetrating the cover body 8 in the longitudinal direction is formed at a center portion of the cover body 8.

A disc insertion slot 9a is formed on the front panel 9, and the disc insertion slot 9a is formed to be horizontally long in accordance with the shape of the disc-like recording medium 100. A pin insertion hole 9b penetrating the front panel 9 in the front-back direction is formed on the front panel 9. An eject button 9c is provided on the front panel 9.

Figure 3:
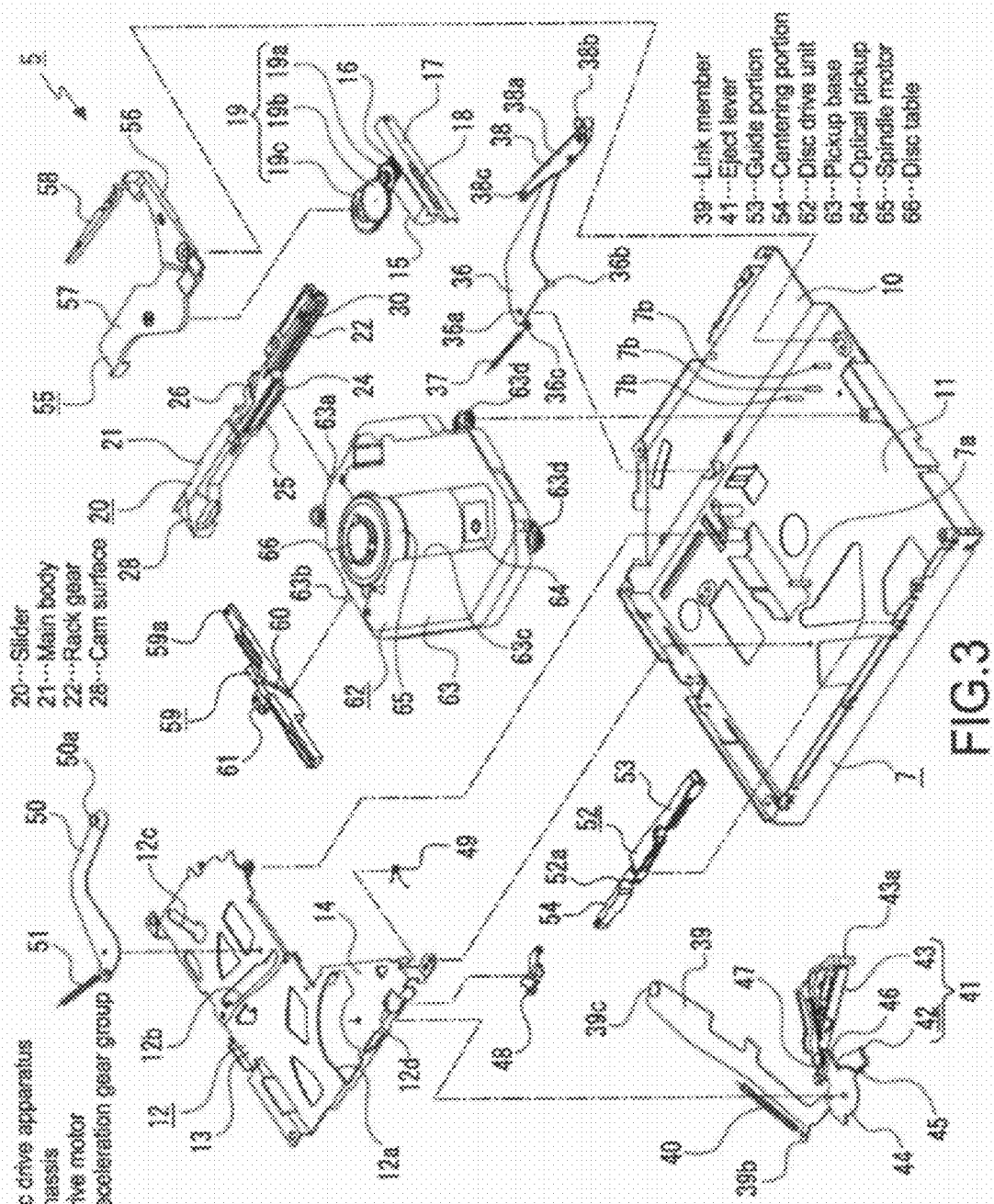
FIG. 3 is an exploded perspective view of the disc drive apparatus.
Figure 4:
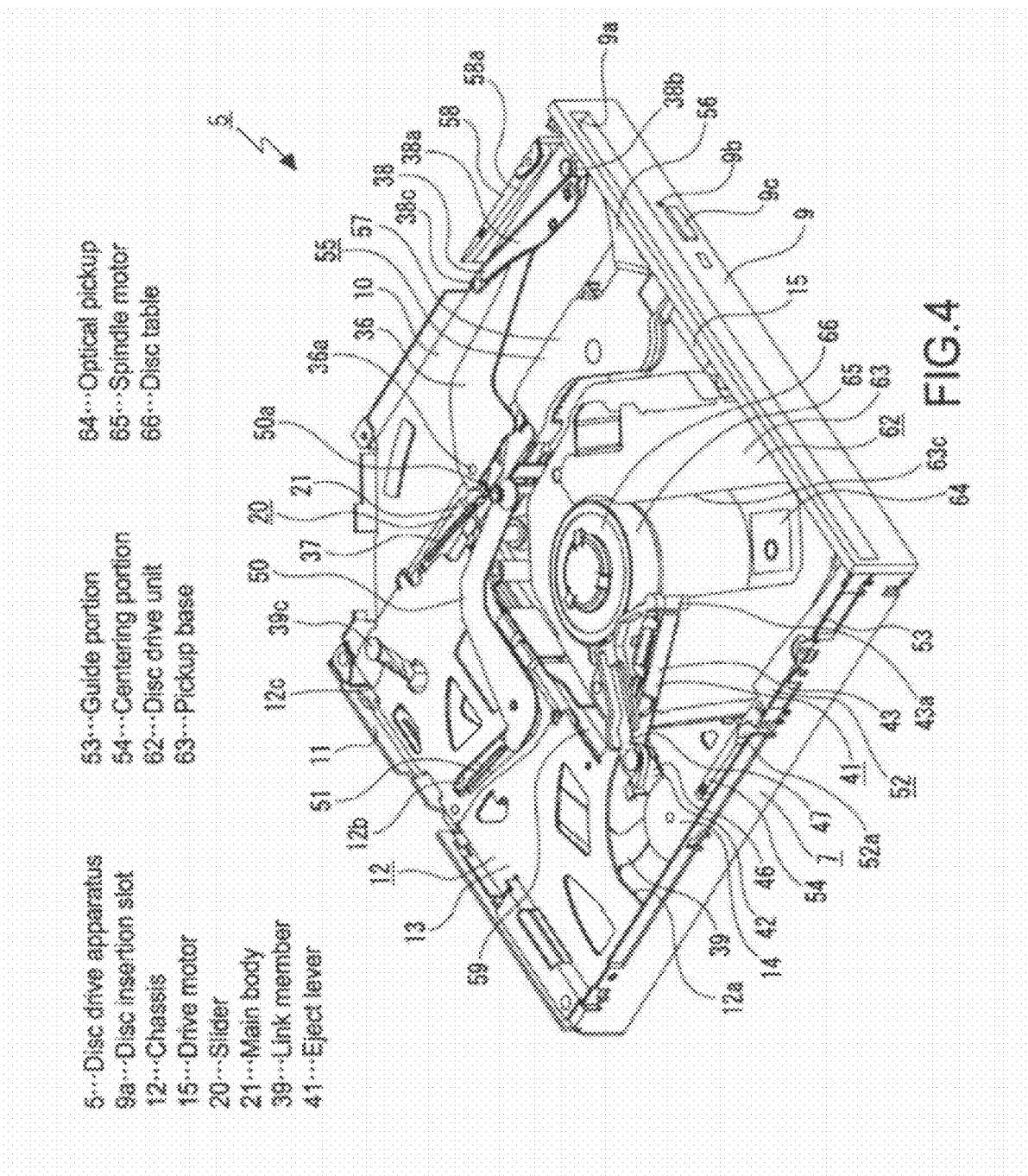
FIG. 4 is a perspective view of the disc drive apparatus.
Figure 5:
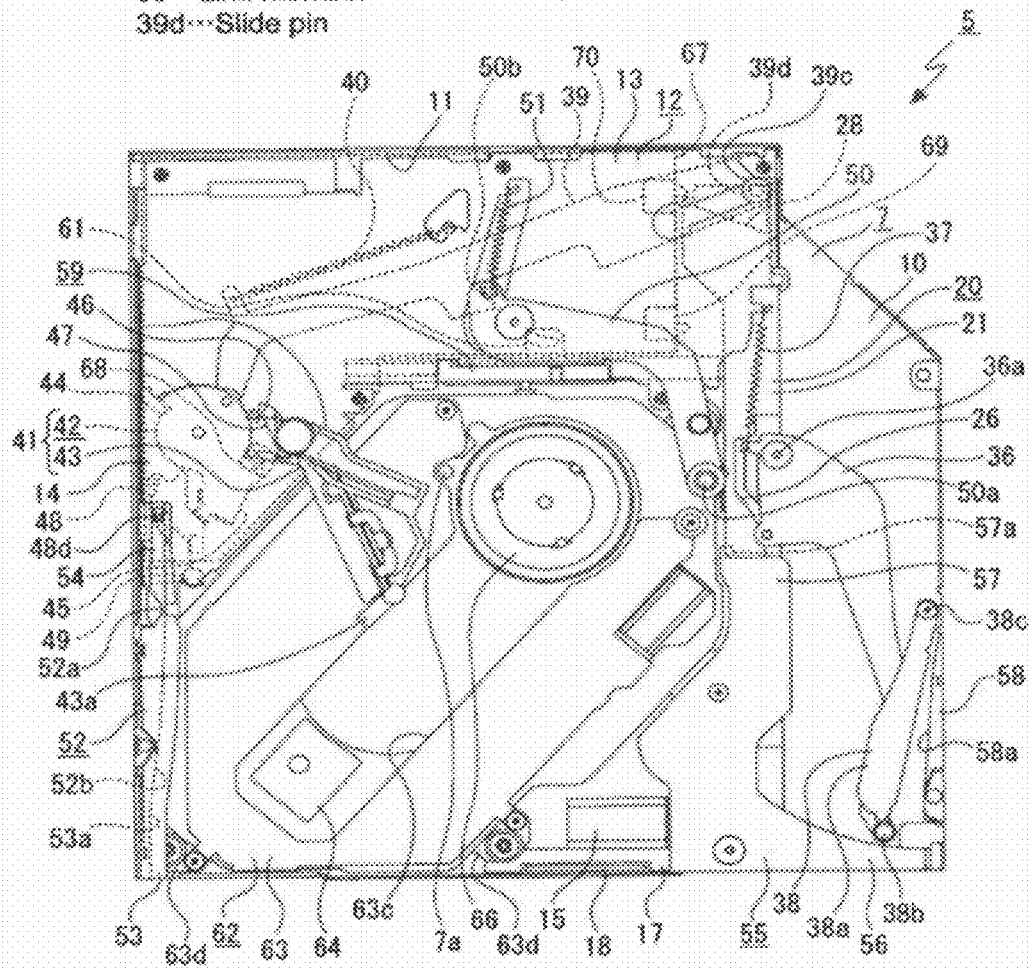
FIG. 5 is a schematic plan view of the disc drive apparatus.

A right end portion of the case body 7 is provided as a support surface portion 10 that is a step higher than other portions, and a part of the case body 7 excluding the support surface portion 10 is formed as a concave arrangement portion 11 that is opened at the top (see FIGS. 3 to 5).

Provided at a bottom surface portion of the concave arrangement portion 11 of the case body 7 is a release pin 7a protruding upwardly from substantially the center portion of the bottom surface portion, and gear support shafts 7b protruding upwardly are provided at a rightward position of the bottom surface portion on a front end side.

Figure 6:
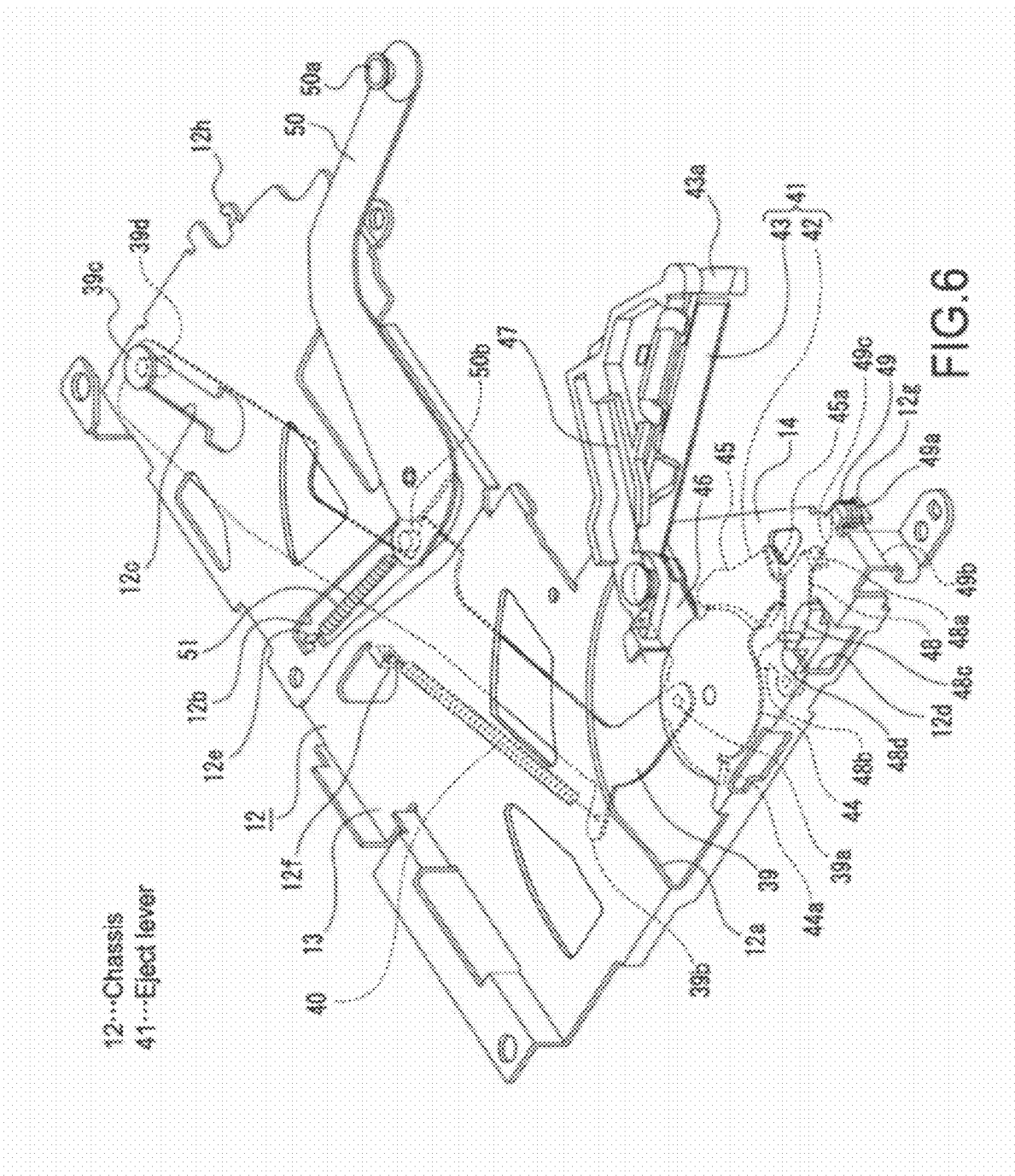
FIG. 6 is an enlarged perspective view of a chassis and members supported by the chassis.

A chassis 12 is provided in the concave arrangement portion 11 of the case body 7. As shown in FIG. 6, the chassis 12 is constituted of a base surface portion 13 formed almost as a rectangle that is long in the lateral direction and a protrusion surface portion 14 protruding in the front direction from the left end portion of the base surface portion 13.

An insertion arrangement hole 12a formed substantially as an arc is formed at a left end portion of the chassis 12, a spring arrangement hole 12b practically extending in the front-back direction is formed at substantially the center of the base surface portion 13 in the lateral direction, and a support hole 12c practically extending in the lateral direction is formed at a right end portion of the base surface portion 13. A lever arrangement hole 12d is formed at a left end portion of the protrusion surface portion 14 of the chassis 12.

The chassis 12 is provided with, at an opening edge of the spring arrangement hole 12b on the back side, a first spring support piece portion 12e. Also provided in the chassis 12 are a second spring support piece portion 12f that protrudes downwardly from substantially the center of the base surface portion 13 in the lateral direction and a third spring support piece portion 12g that protrudes downwardly from a front end portion of the protrusion surface portion 14. The chassis 12 is also provided with a fourth spring support piece portion 12h at the right end portion of the base surface portion 13.

In the concave arrangement portion 11 of the case body 7, a drive motor 15 is provided at a rightward position at the front end portion. A worm 16 is fixed to a motor shaft of the drive motor 15.

The drive motor 15 is attached to a motor holding plate 17. On the motor holding plate 17, a shutter 18 is supported while being movable in substantially the longitudinal direction. The shutter 18 is biased in substantially a downward direction by a spring (not shown). The shutter 18 is moved in substantially the longitudinal direction by a slider to be described later that moves in the front-back direction to thus open and close the disc insertion slot 9a of the front panel 9 and is practically moved upwardly to thus block the disc insertion slot 9a when the slider is moved to the front end portion in the movement direction.

A deceleration gear group 19 is provided in the vicinity of the drive motor 15, and the deceleration gear group 19 is constituted of a plurality of gears 19a to 19c that intermesh with one another in the stated order. The gears 19a to 19c are supported by the gear support shafts 7b provided in the case body 7, and the gear 19a closest to the drive motor 15 intermeshes with the worm 16.

At the right end portion of the concave arrangement portion 11 of the case body 7, a slider 20 is supported while being movable in the front-back direction. The slider 20 is moved to the front as a second direction during loading of the disc-like recording medium 100 and moved to the back as a first direction during ejection of the disc-like recording medium 100.

Figure 7:
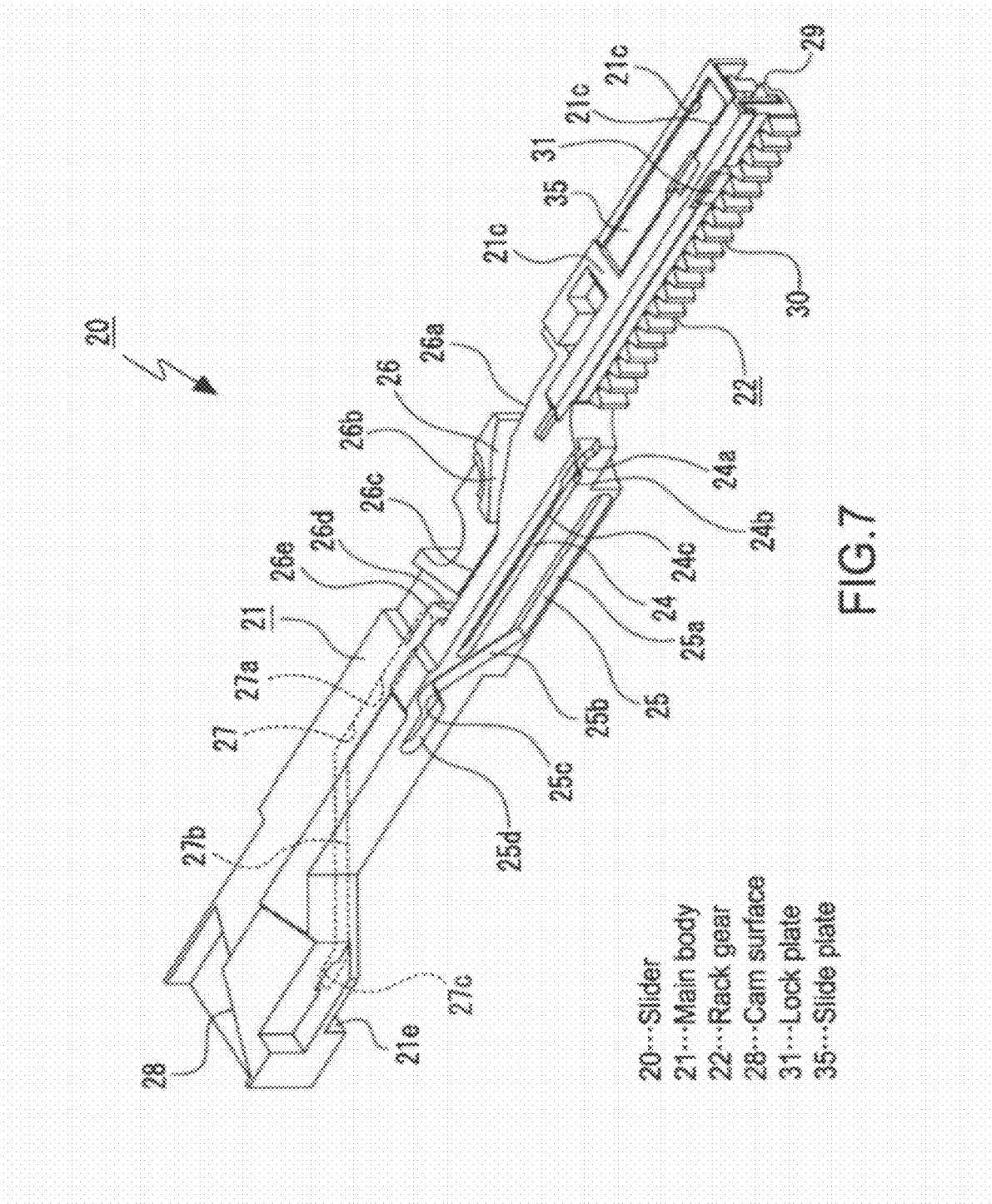
FIG. 7 is an enlarged perspective view of a slider.
Figure 8:
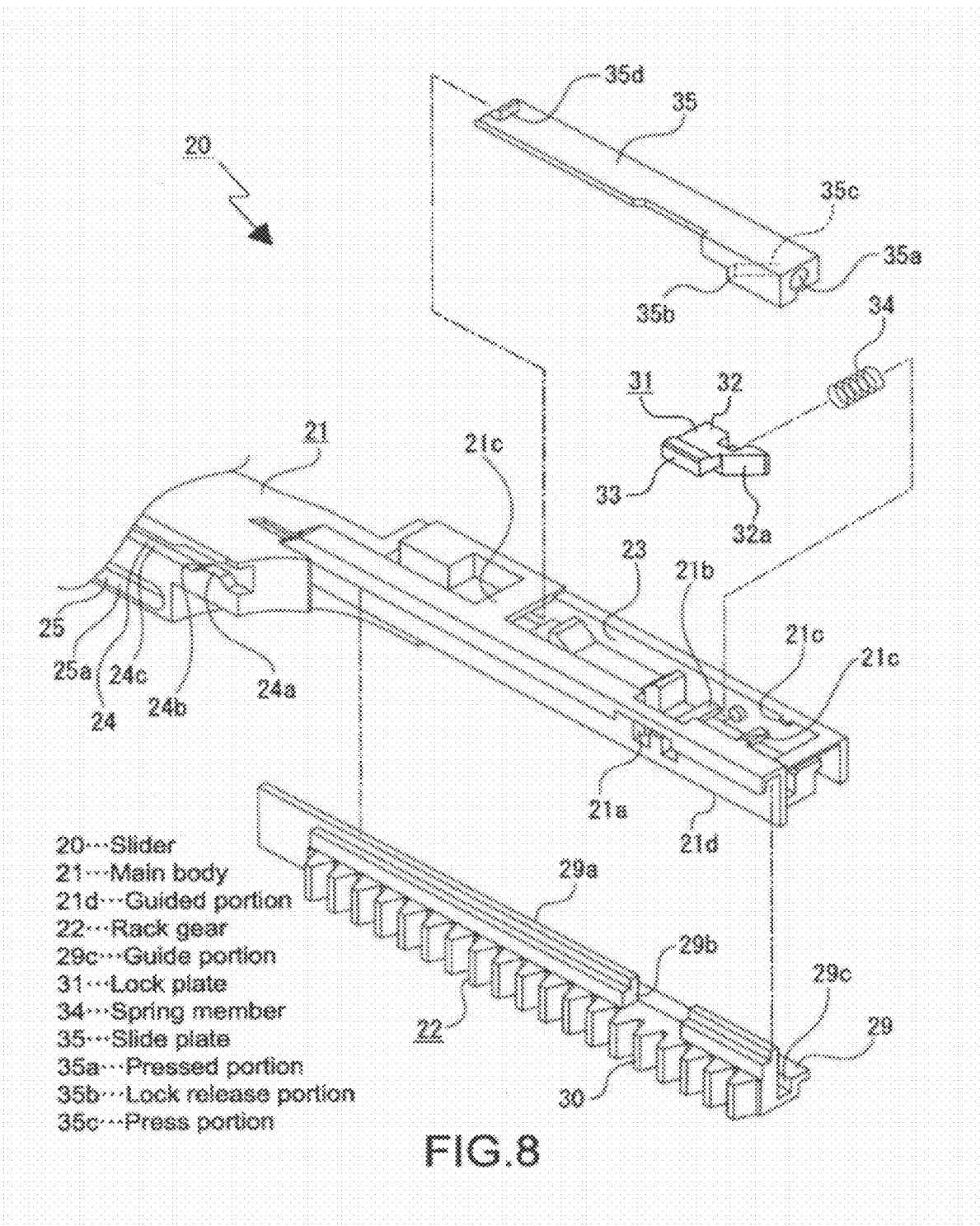
FIG. 8 is an enlarged exploded perspective view showing a part of the slider.

The slider 20 includes a main body 21 elongated in the front-back direction and a rack gear 22 that is supported by a front end portion of the main body 21 (see FIGS. 7 and 8).

A concave support portion 23 that extends in the front-back direction and is opened at the top and front is formed at a front end portion of the main body 21.

A communication hole 21a that penetrates the main body 21 in the lateral direction and is in communication with the concave support portion 23 is formed on the main body 21. A support protrusion 21b is provided across the concave support portion 23 from the communication hole 21a. The support protrusion 21b protrudes upwardly and extends in the lateral direction. In the main body 21, press portions 21c that cover a part of the concave support portion 23 from above are provided.

Also provided in the main body 21 is a guided portion 21d that protrudes downwardly from a position on the left-hand side of the concave support portion 23 and extends in the front-back direction.

On a left-hand side surface of the main body 21, a support groove 24 that is opened leftwardly is formed at substantially the center portion in the front-back direction. The support groove 24 is constituted of an upper linear portion 24a extending in the front-back direction, an inclined portion 24b that is continuous with a rear end of the upper linear portion 24a and inclined downwardly toward the back, and a lower linear portion 24c that is continuous with a rear end of the inclined portion 24b and extends in the front-back direction.

A guide groove 25 that is opened leftwardly is formed on the left-hand side surface of the main body 21. The guide groove 25 is constituted of a first horizontal portion 25a extending in the front-back direction, a first inclined portion 25b that is continuous with a rear end of the first horizontal portion 25a and inclined upwardly toward the back, a second inclined portion 25c that is continuous with a rear end of the first inclined portion 25b and inclined downwardly toward the back, and a second horizontal portion 25d that is continuous with a rear end of the second inclined portion 25c and extends in the front-back direction. The second horizontal portion 25d is positioned to be higher than the first horizontal portion 25a. The first horizontal portion 25a is located below the support groove 24.

On an upper surface of the main body 21, a shaft slide groove 26 that is opened at the top is formed on a back side of the concave support portion 23. The shaft slide groove 26 is constituted of a front-side linear portion 26a extending in the front-back direction, a front-side inclined portion 26b that is continuous with a rear end of the front-side linear portion 26a and inclined leftwardly toward the back, a mid linear portion 26c that is continuous with a rear end of the front-side inclined portion 26b and extends in the front-back direction, a back-side inclined portion 26d that is continuous with a rear end of the mid linear portion 26c and inclined rightwardly toward the back, and a back-side linear portion 26e that is continuous with a rear end of the back-side inclined portion 26d and extends in the front-back direction.

A guide groove 27 that is opened at the bottom is formed on a lower surface of the main body 21 at a position on the back side. The guide groove 27 is constituted of a first linear portion 27a extending in the front-back direction, an inclined portion 27b that is continuous with a rear end of the first linear portion 27a and inclined leftwardly toward the back, and a second linear portion 27c that is continuous with a rear end of the inclined portion 27b and extends in the front-back direction.

At the back end portion of the main body 21, a cam surface 28 that practically faces the back and functions as a cam portion is formed. The cam surface 28 is inclined so as to be displaced forwardly toward the right-hand direction.

A lower end portion of the back end portion of the main body 21 is provided as a switch press portion 21e.

The rack gear 22 has a structure in which a base portion 29 extending in the front-back direction and a gear portion 30 provided on the left-hand side of the base portion 29 are formed integrally. A wall portion 29a that extends in the front-back direction and protrudes upwardly is provided at the left end portion of the base portion 29, and a locked concave portion 29b that penetrates the wall portion 29a in the lateral direction and is opened at the top is formed on the wall portion 29a. On the right-hand side of the wall portion 29a of the base portion 29, a guide portion 29c that extends in the front-back direction and is opened at the top is formed.

By inserting the guided portion 21d in the guide portion 29c, the rack gear 22 is supported by the main body 21. The gear portion 30 of the rack gear 22 intermeshes with the gear 19c that is closest to the rack gear 22 among the deceleration gear group 19.

By a drive force of the drive motor 15 being supplied to the gear portion 30 of the rack gear 22, the slider 20 is moved in the front-back direction in accordance with a rotational direction of the drive motor 15. The main body 21 is movable with respect to the rack gear 22 in the front-back direction in a state where the rack gear 22 is not locked by a lock plate to be described later.

A lock plate 31 is supported by the support protrusion 21b of the main body 21 while being movable in the lateral direction. The lock plate 31 has a structure in which a supported portion 32 and a lock portion 33 protruding leftwardly from an upper end portion of the supported portion 32 are formed integrally. A cam slide surface 32a is formed at a front end portion of the supported portion 32, and the cam slide surface 32a is inclined so as to be displaced backwardly toward the left-hand direction.

A supported groove (not shown) that extends in the lateral direction is formed on the supported portion 32 of the lock plate 31, and the lock plate 31 becomes slidable in the lateral direction by the supported groove being supported by the support protrusion 21b.

In a state where the lock plate 31 is supported by the support protrusion 21b, the lock portion 33 can protrude leftwardly from the communication hole 21a of the main body 21. The lock plate 31 is moved between a lock position as a leftward moving end and a lock release position as a rightward moving end. At the lock position, a left-hand side surface of the supported portion 32 of the lock plate 31 comes into contact with a right-hand side surface of the wall portion 29a of the rack gear 22 so that a leftward movement of the lock plate 31 is restricted. At the lock release position, a right-hand side surface of the supported portion 32 of the lock plate 31 comes into contact with a side surface of the concave support portion 23 so that a rightward movement of the lock plate 31 is restricted.

The lock plate 31 locks the rack gear 22 with respect to the main body 21 by fitting the lock portion 33 thereof to the locked concave portion 29b formed on the base portion 29 of the rack gear 22 at the lock position. Therefore, at the lock position, the main body 21 and the rack gear 22 are integrally moved in the front-back direction when the drive force of the drive motor 15 is transmitted from the deceleration gear group 19 to the rack gear 22.

Further, the lock plate 31 releases the lock of the rack gear 22 with respect to the main body 21 by pulling out the lock portion 33 thereof from the locked concave portion 29b of the rack gear 22 at the lock release position. Therefore, at the lock release position, the main body 21 is movable with respect to the rack gear 22 in the front-back direction as described above when the drive motor 15 is stopped.

A spring member 34 that is a compression coil spring, for example, is provided in the concave support portion 23 of the main body 21. The spring member 34 is supported between the supported portion 32 of the lock plate 31 and the right-hand side surface of the concave support portion 23. Therefore, the lock plate 31 is biased toward the lock position from the lock release position by the spring member 34, and the rack gear 22 is locked with respect to the main body 21 by the lock plate 31 in a state where no external force is applied to the lock plate 31.

As described above, since the lock plate 31 is biased toward the lock position by the spring member 34 in the disc drive apparatus 5, the locked state of the rack gear 22 with respect to the main body 21 can be stabilized.

In the concave support portion 23 of the main body 21, a slide plate 35 is supported while being slidable in the front-back direction. The slide plate 35 is substantially rectangular and elongated in the front-back direction.

A hole-type pressed portion 35a that is opened at the front is formed at a front end portion of the slide plate 35, and a lock release portion 35b protruding downwardly is formed at a left end portion of the front end portion thereof. The lock release portion 35b includes a press portion 35c as an inclined surface that is displaced forwardly toward the right-hand direction. At a back end portion of an upper surface of the slide plate 35, a stopper 35d protruding upwardly is provided.

In a state where the slide plate 35 is supported by the concave support portion 23, the slide plate 35 is pressed by the press portions 21c provided at the upper end portion of the concave support portion 23 while being apart from each other in the front-back direction, so as to be prevented from dropping off from the concave support portion 23.

In the state where the slide plate 35 is supported by the concave support portion 23, the lock release portion 35b is located in front of the cam slide surface 32a of the lock plate 31.

When the lock plate 31 is at the lock position, the cam slide surface 32a and the press portion 35c of the slide plate 35 come into contact with each other, with the result that a bias force of the spring member 34 with respect to the lock plate 31 is applied to the slide plate 35 via the cam slide surface 32a. In other words, since both the cam slide surface 32a and the press portion 35c are inclined surfaces, a leftward bias force of the spring member 34 with respect to the lock plate 31 is applied to the slide plate 35 as a frontward bias force via the cam slide surface 32a.

Therefore, the frontward bias force of the spring member 34 is applied to the slide plate 35, and the stopper 35d of the slide plate 35 is pressed by the back-side press portion 21c of the main body 21, with the result that a frontward movement of the slide plate 35 with respect to the main body 21 is restricted.

At the support surface portion 10 of the case body 7, a rotary lever 36 is supported rotatably (see FIGS. 3 to 5). The rotary lever 36 is provided with a shaft portion 36b that protrudes downwardly in front of a rotary fulcrum portion 36a and a spring hook protrusion piece 36c provided in the vicinity of the rotary fulcrum portion 36a.

A first tensile coil spring 37 is supported between the spring hook protrusion piece 36c of the rotary lever 36 and the third spring support piece portion 12g of the chassis 12. The rotary lever 36 is biased by the first tensile coil spring 37 in a clockwise direction when seen in a plane.

A load lever 38 is rotatably supported by the support surface portion 10 of the case body 7. The load lever 38 is constituted of a rotary surface portion 38a and a roller 38b rotatably supported at a front end portion of the rotary surface portion 38a. A slide groove (not shown) that is opened at the bottom is formed on the rotary surface portion 38a of the load lever 38. A back end portion of the load lever 38 functions as a rotational fulcrum 38c.

The front end portion of the rotary lever 36 is slidably supported by the slide groove of the load lever 38. Therefore, when the rotary lever 36 is rotated, the load lever 38 is also rotated along with the rotational movement of the rotary lever 36.

The load lever 38 is biased in the clockwise direction when seen in a plane by an operation of the first tensile coil spring 37 via the rotary lever 36.

Figure 9:
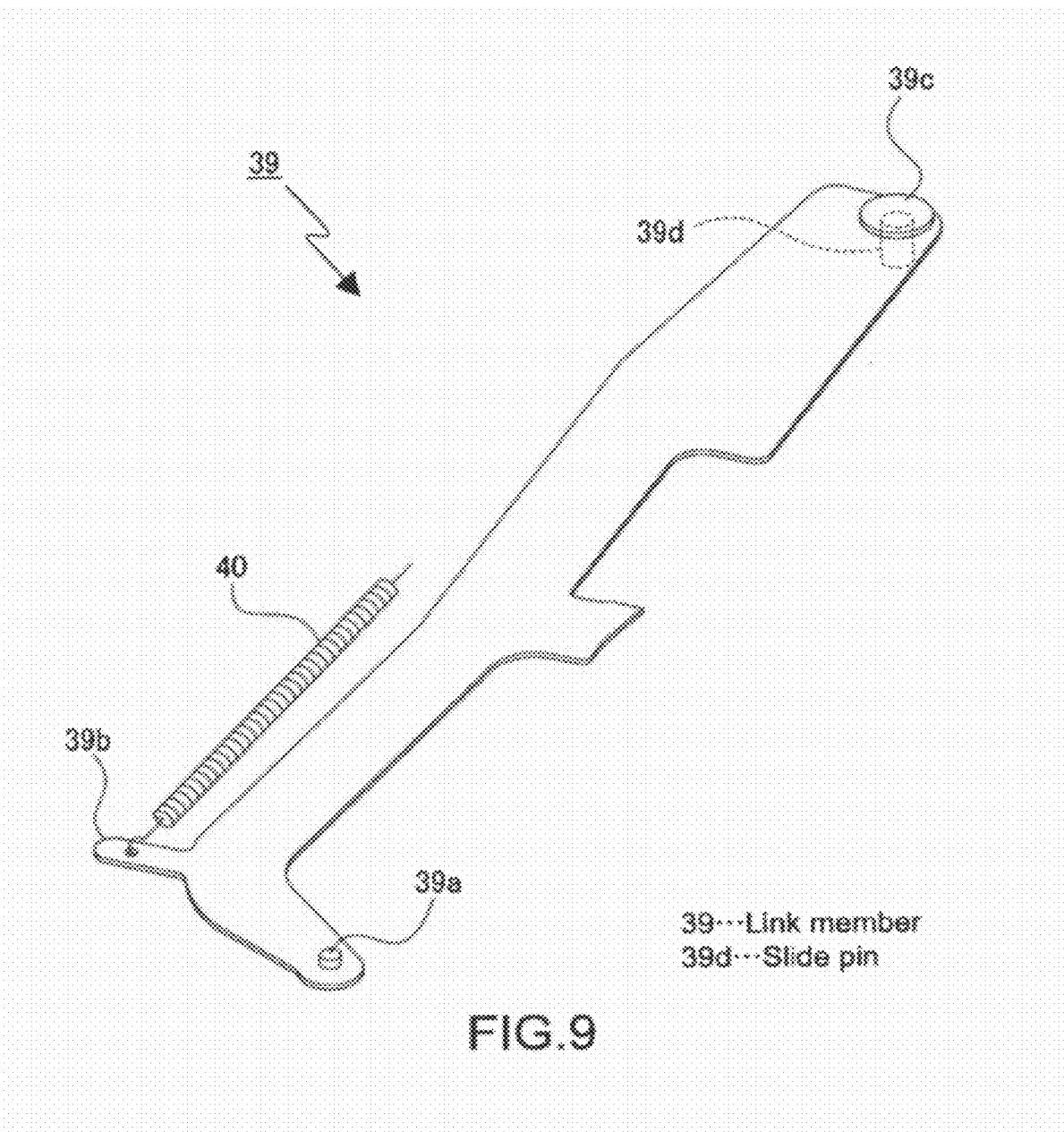
FIG. 9 is an enlarged perspective view of a link member.

On the lower surface side of the chassis 12, a link member 39 that is elongated in substantially the lateral direction is supported rotatably (see FIGS. 3 to 6). As shown in FIG. 9, the link member 39 is constituted of a lever coupling portion 39a provided at a left end portion, a spring support protrusion 39b provided close to the left end, and a supported shaft portion 39c and a slide pin 39d provided at a right end portion. The supported shaft portion 39c protruding upwardly is placed on top of the slide pin 39d protruding downwardly. The slide pin 39d functions as a slide portion that is slid by the cam surface 28 of the slider 20.

The supported shaft portion 39c of the link member 39 is slidably supported by the support hole 12c of the chassis 12 so that the link member 39 becomes slidable with respect to the chassis 12 in a direction in which the support hole 12c extends (in substantially the lateral direction). In a state where the link member 39 is supported by the chassis 12, the slide pin 39d is at a position at which it can engage with the cam surface 28 of the slider 20.

A second tensile coil spring 40 is supported between the spring support protrusion 39b of the link member 39 and the second spring support piece portion 12f of the chassis 12 (see FIGS. 4 to 6). Therefore, the link member 39 is biased in substantially the right-hand direction by the second tensile coil spring 40.

Figure 10:
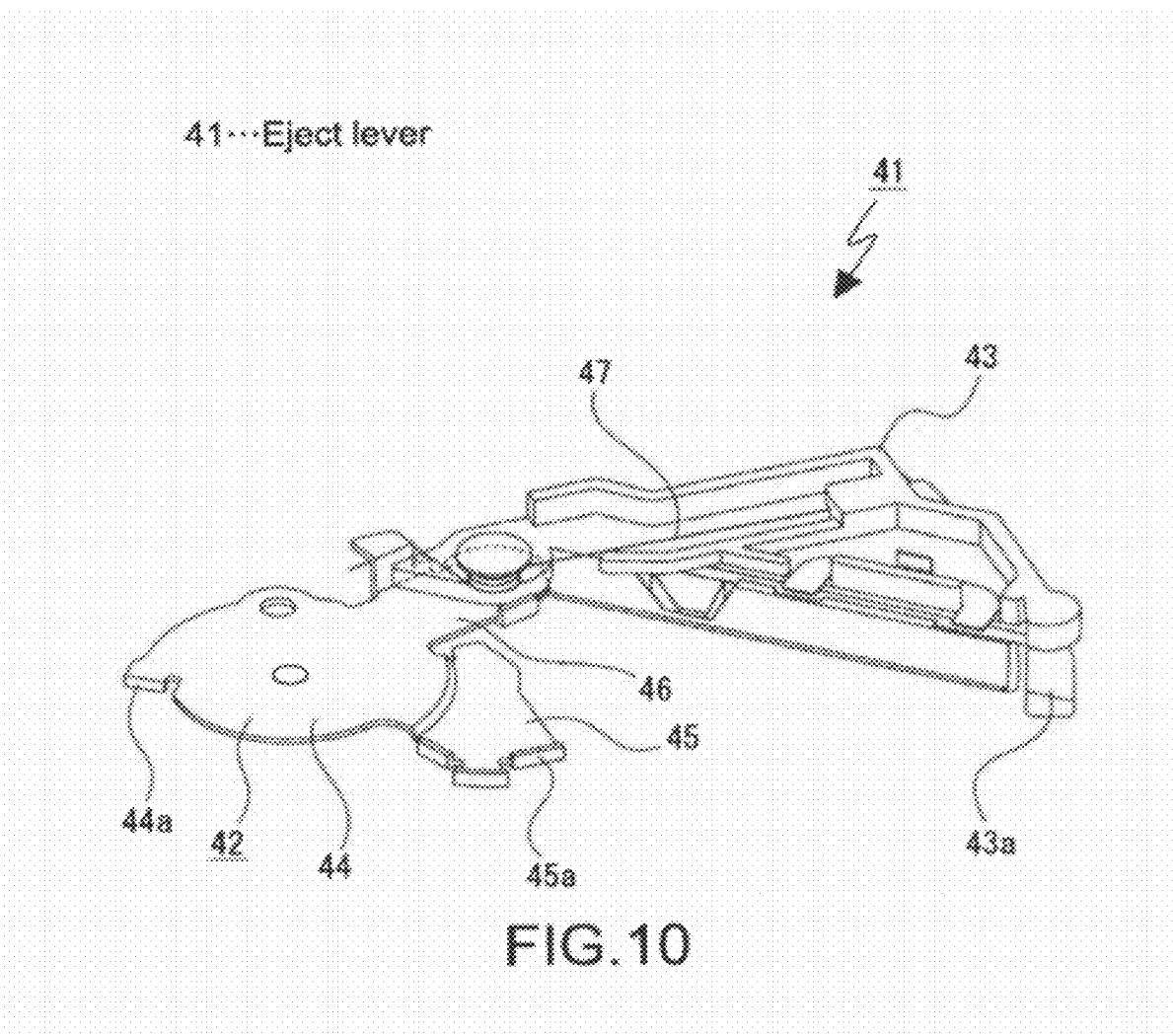
FIG. 10 is an enlarged perspective view of an eject lever.

An eject lever 41 is rotatably supported by the protrusion surface portion 14 of the chassis 12 (see FIGS. 3 to 6). The eject lever 41 has a structure in which a rotary support body 42 and a lever body 43 are coupled with each other (see FIG. 10).

The rotary support body 42 has a structure in which a base portion 44 formed approximately as a plate is integrally formed with a first protrusion 45 and a second protrusion 46 that protrude outwardly from an outer circumferential portion of the base portion 44. A press piece 44a is provided at the outer circumferential portion of the base portion 44. A pressed piece 45a is provided to the first protrusion 45. A center portion of the base portion 44 of the rotary support body 42 is rotatably supported by a lower surface side of the protrusion surface portion 14 of the chassis 12.

The lever body 43 is substantially triangular. One corner portion is rotatably coupled with the second protrusion 46 of the rotary support body 42, and a tongue-like disc holding portion 43a is provided at the other corner portion.

A bias spring 47 is supported between the rotary support body 42 and the lever body 43, and the lever body 43 is biased by the bias spring 47 with respect to the rotary support body 42 in the clockwise direction when seen in a plane.

In a state where the rotary support body 42 of the eject lever 41 is supported by the chassis 12, a coupling portion between the rotary support body 42 and the lever body 43 is inserted into the insertion arrangement hole 12a of the chassis 12 and the lever body 43 is positioned on an upper surface side of the chassis 12 (see FIGS. 4 to 6).

On the rotary support body 42 of the eject lever 41, the lever coupling portion 39a of the link member 39 is rotatably coupled with the outer circumferential portion of the base portion 44. Therefore, the link member 39 moves in substantially the lateral direction along with the operation of the eject lever 41, and the eject lever 41 is applied with a bias force of the second tensile coil spring 40 via the link member 39 to be biased in the clockwise direction when seen in a plane.

Figure 11:
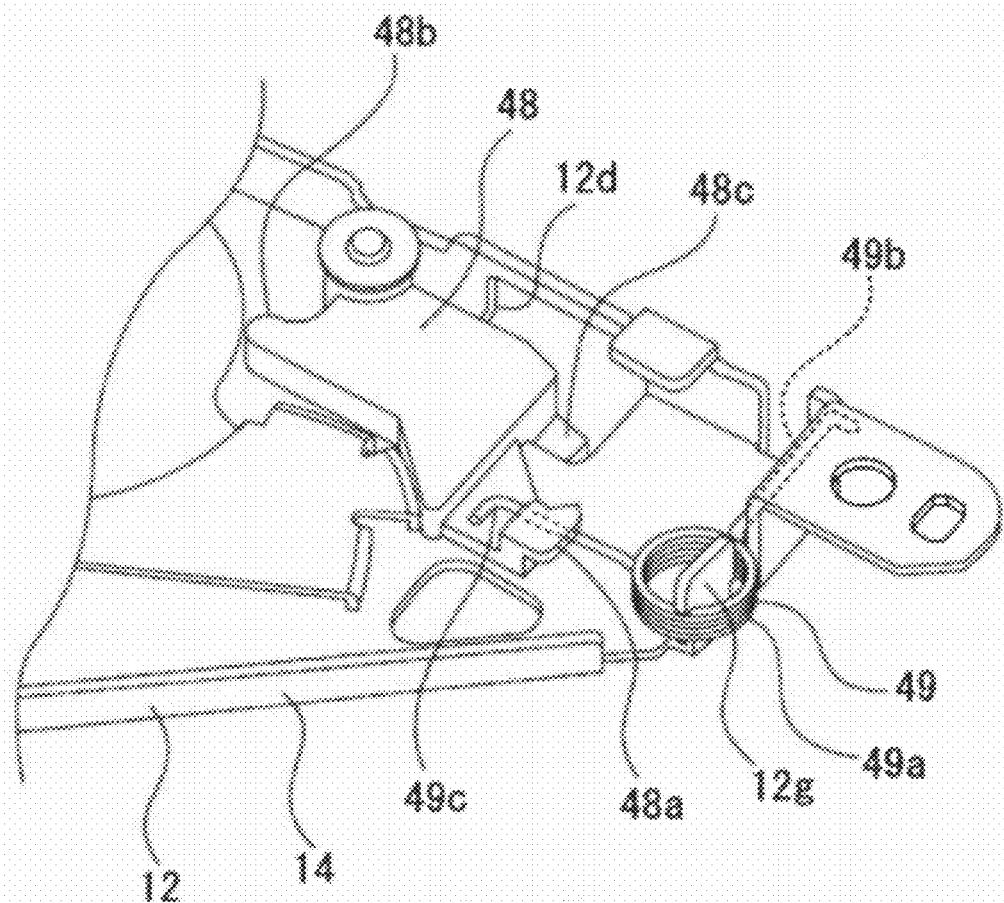
FIG. 11 is an enlarged perspective view showing a state where a centering lever is supported by the chassis.

A centering lever 48 is rotatably supported on the lower surface side of the protrusion surface portion 14 of the chassis 12 (see FIGS. 3 to 5). As shown in FIGS. 6 and 11, provided to the centering lever 48 are a spring hook protrusion 48a protruding in the front direction from the front end portion, a pressed protrusion 48b protruding backwardly from the back end portion, and a stopper protrusion 48c protruding upwardly from the front end portion. The stopper protrusion 48c is provided with a coupling pin 48d that protrudes upwardly.

The centering lever 48 is rotatably supported by the chassis 12 at the back end portion thereof. In a state where the centering lever 48 is supported by the chassis 12, the stopper protrusion 48c protrudes upwardly from the lever arrangement hole 12d of the chassis 12.

A coil portion 49a of a bias spring 49 as a torsional coil spring is supported by the third spring support piece portion 12g of the chassis 12, and one end portion 49b and the other end portion 49c of the bias spring 49 are engaged with the chassis 12 and the spring hook protrusion 48a of the centering lever 48, respectively. Therefore, the centering lever 48 is biased by the bias spring 49 in the counterclockwise direction when seen in a plane.

A support lever 50 is rotatably supported on the upper surface side of the base surface portion 13 of the chassis 12 (see FIGS. 3 to 6).

Figure 12:
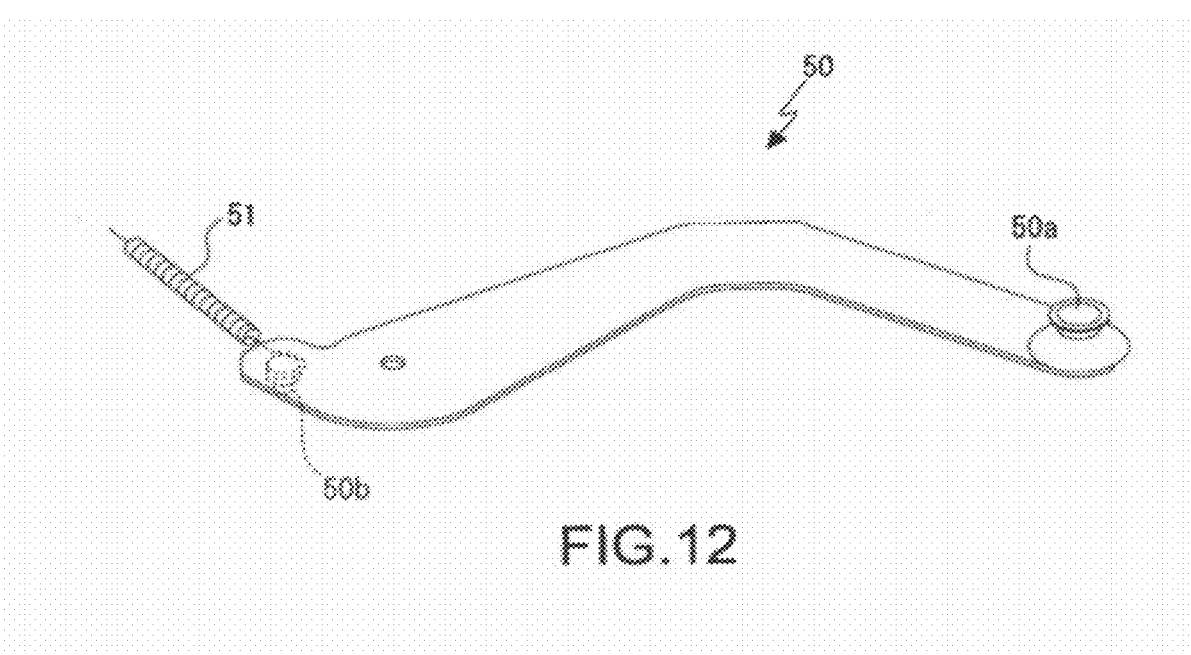
FIG. 12 is an enlarged perspective view of a support lever.

As shown in FIG. 12, the support lever 50 is substantially L-shaped, and a holding roller 50a is provided at one end portion thereof. An operated pin 50b that protrudes downwardly is provided at the other end portion of the support lever 50, and a position near the other end of the support lever 50 is used as a rotational fulcrum.

In a state where the support lever 50 is supported by the chassis 12, a third tensile coil spring 51 is supported between the operated pin 50b of the support lever 50 and the first spring support piece portion 12e of the chassis 12 (see FIGS. 4 to 6). Therefore, the support lever 50 is biased by the third tensile coil spring 51 in the clockwise direction when seen in a plane.

At a front-half portion of the left end portion of the concave arrangement portion 11 in the case body 7, a first guide member 52 is provided (see FIGS. 3 to 5). The first guide member 52 is elongated in the front-back direction and formed of a resin material.

Figure 13:
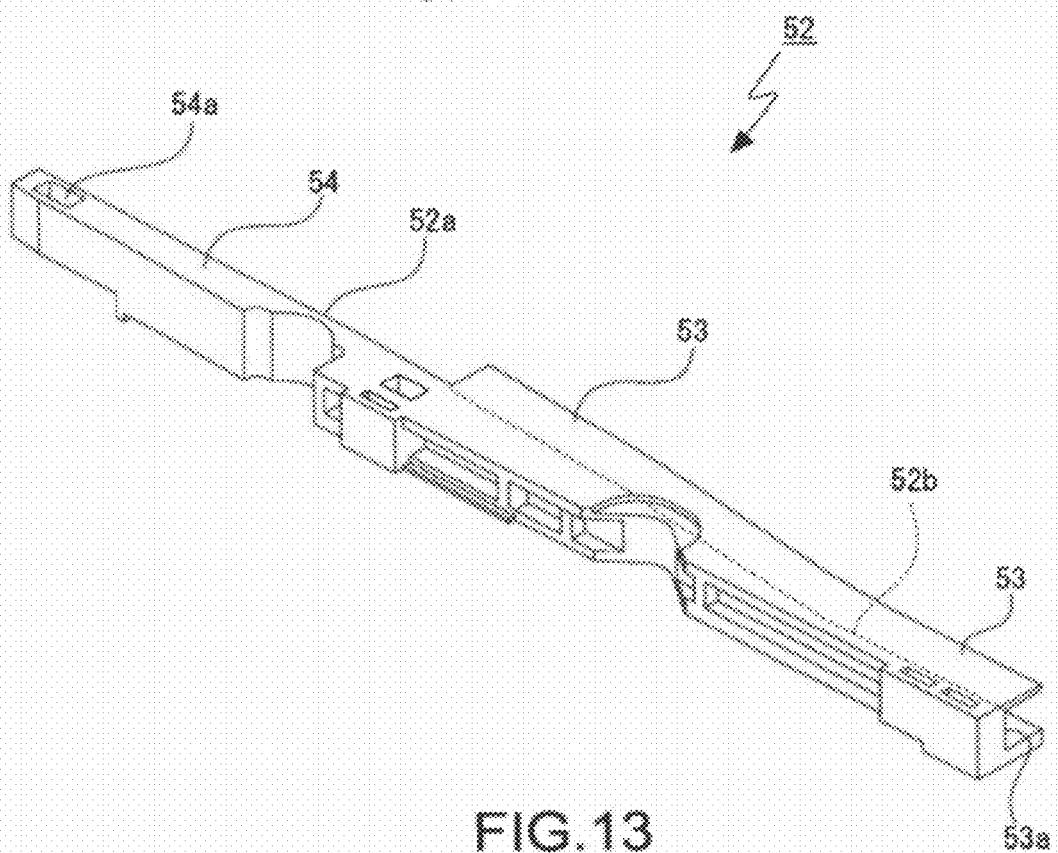
FIG. 13 is an enlarged perspective view of a first guide member.

As shown in FIG. 13, the first guide member 52 has a structure in which a guide portion 53 and a centering portion 54 are coupled in the front-back direction to be formed integrally. The guide portion 53 of the first guide member 52 is fixed to the case body 7.

A coupling portion 52a between the guide portion 53 and the centering portion 54 is formed to be thin, and the centering portion 54 can be elastically deformed with respect to the guide portion 53 in a direction in which it moves substantially laterally using the coupling portion 52a as a fulcrum.

A guide groove 53a that is opened on the right-hand side is formed on the guide portion 53.

A right-hand side surface of the first guide member 52 is formed substantially as a plane and formed as a disc guide surface 52b with which an outer circumferential surface of the disc-like recording medium 100 inserted into the disc insertion slot 9a of the front panel 9 is brought into sliding contact.

A coupling hole 54a that penetrates the centering portion 54 longitudinally is formed at the back end portion of the centering portion 54, and the coupling pin 48d of the centering lever 48 is inserted from below and coupled with the coupling hole 54a (see FIGS. 3 to 5). Therefore, using the coupling portion 52a as a fulcrum, the centering portion 54 is elastically deformed with respect to the guide portion 53 in a direction in which it moves substantially laterally along with the operation of the centering lever 48.

At a front-half portion of the right end portion of the case body 7, a second guide member 55 is provided. The second guide member 55 is formed of a resin material.

Figure 14:
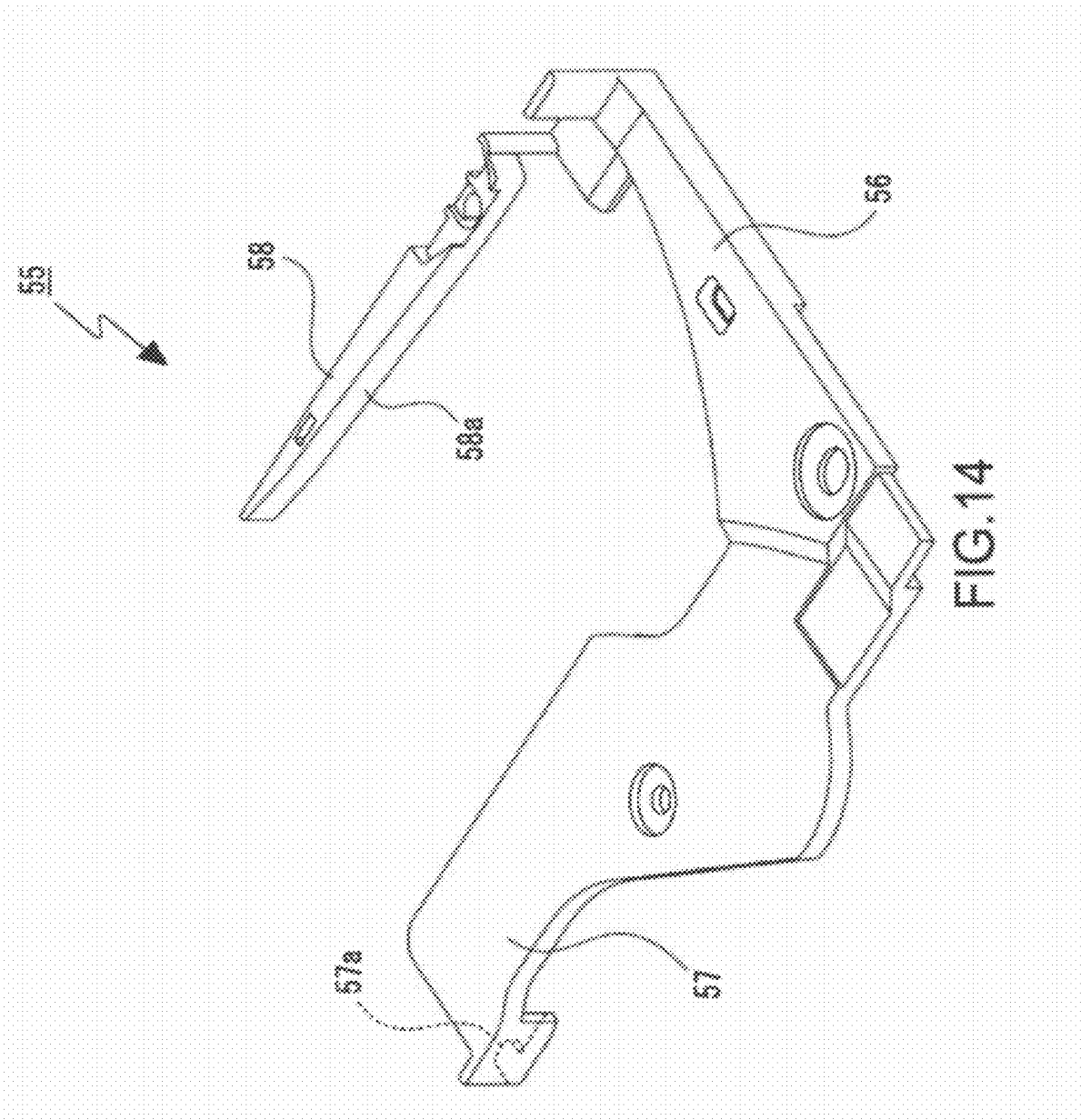
FIG. 14 is an enlarged perspective view of a second guide member.

As shown in FIG. 14, the second guide member 55 has a structure in which a coupling portion 56 extending in the lateral direction is integrally formed with a guide surface portion 57 that protrudes backwardly from the left end portion of the coupling portion 56 and a guide protrusion 58 that protrudes backwardly from the right end portion of the coupling portion 56.

The guide surface portion 57 is formed to be wide and has a practically-planar upper surface, and a supported protrusion piece 57a is provided at a left end portion of the back end portion thereof. The supported protrusion piece 57a protrudes rightwardly and slidably engages with the support groove 24 formed on the main body 21 of the slider 20.

A left-hand side surface of the guide protrusion 58 is formed substantially as a plane and formed as a disc guide surface 58a with which the outer circumferential surface of the disc-like recording medium 100 inserted into the disc insertion slot 9a of the front panel 9 is brought into sliding contact.

The coupling portion 56 of the second guide member 55 is fixed to the front end portion of the support surface portion 10 in the case body 7, and the guide surface portion 57 partially blocks the worm 16, the deceleration gear group 19, and the slider 20 from above so that the guide protrusion 58 is positioned at the right end portion of the support surface portion 10 as shown in FIGS. 4 and 5.

A sub-slider 59 is supported by the concave arrangement portion 11 of the case body 7 while being movable in the lateral direction (see FIGS. 3 to 5). The sub-slider 59 can be moved right in front of the base surface portion 13 of the chassis 12 in the lateral direction.

Figure 15:
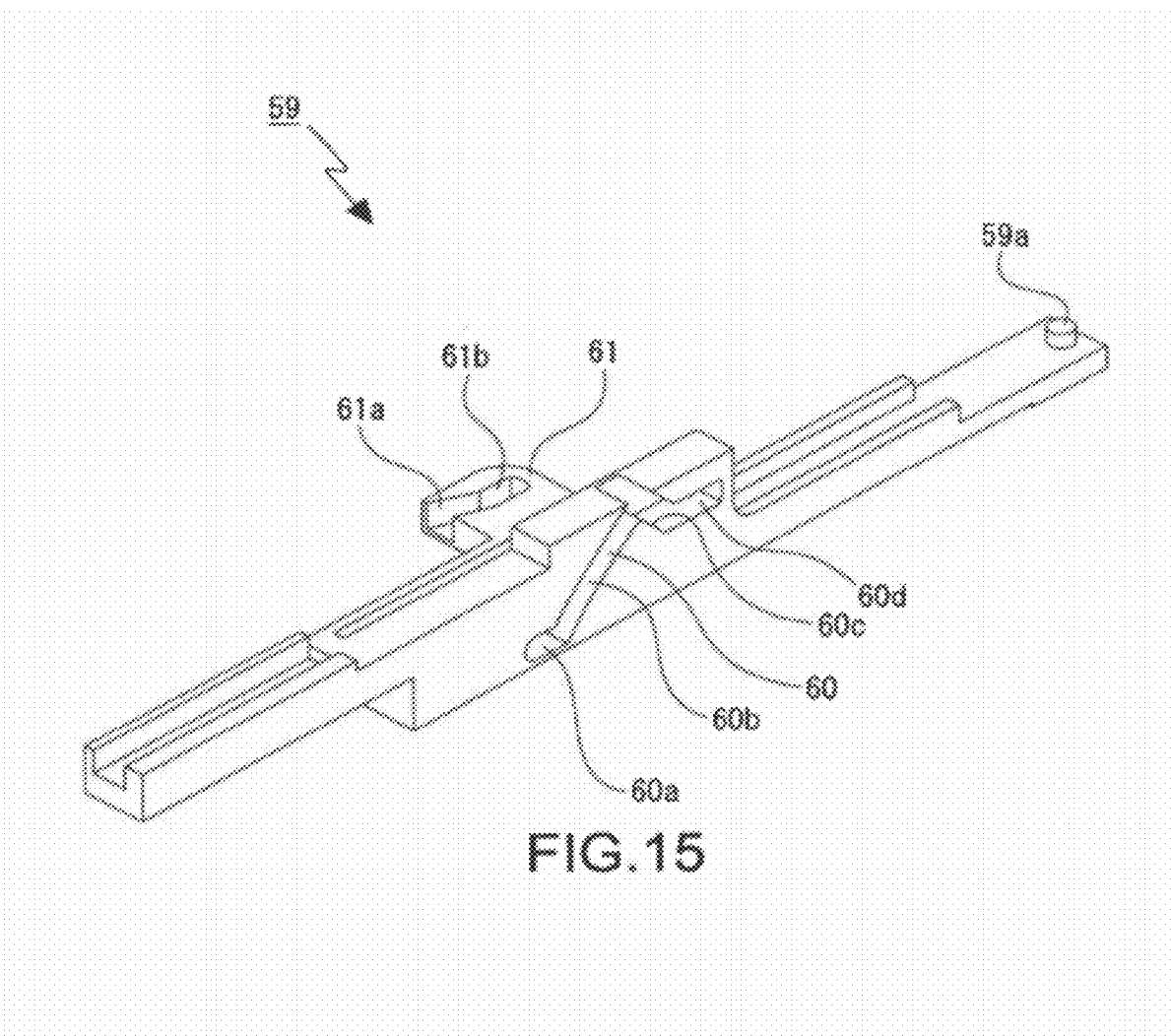
FIG. 15 is an enlarged perspective view of a sub-slider.

As shown in FIG. 15, the sub-slider 59 is elongated in the lateral direction and includes a guide groove 60 that is opened at the front at a center portion thereof in the lateral direction. The guide groove 60 is constituted of a first horizontal portion 60a extending in the lateral direction, a first inclined portion 60b that is continuous with a right end of the first horizontal portion 60a and inclined upwardly toward the right-hand direction, a second inclined portion 60c that is continuous with a right end of the first inclined portion 60b and inclined downwardly toward the right-hand direction, and a second horizontal portion 60d that is continuous with a right end of the second inclined portion 60c and extends in the lateral direction. The second horizontal portion 60d is positioned to be higher than the first horizontal portion 60a.

A cam pin 59a that protrudes upwardly is provided at a right end portion of the sub-slider 59. The cam pin 59a slidably engages with the guide groove 27 formed on the main body 21 of the slider 20.

The sub-slider 59 is provided with a cam protrusion 61 that protrudes backwardly from a back surface thereof. The cam protrusion 61 is provided at the center portion of the sub-slider 59 in the lateral direction. Formed on the cam protrusion 61 are an inclined cam groove 61a that is inclined so as to be displaced forwardly toward the right-hand direction and a linear cam groove 61b that is continuous with a right end of the inclined cam groove 61a and extends in the lateral direction.

As shown in FIGS. 3 to 5, at a position on the front side of the sub-slider 59 in the concave arrangement portion 11 of the case body 7, a disc drive unit 62 is supported at a back end portion thereof while being rotatable (liftable) in a direction in which it moves in substantially the longitudinal direction. The disc drive unit 62 includes a pickup base 63 and an optical pickup 64 that is supported by the pickup base 63 while being movable in a radial direction of the disc-like recording medium 100.

Figure 16:
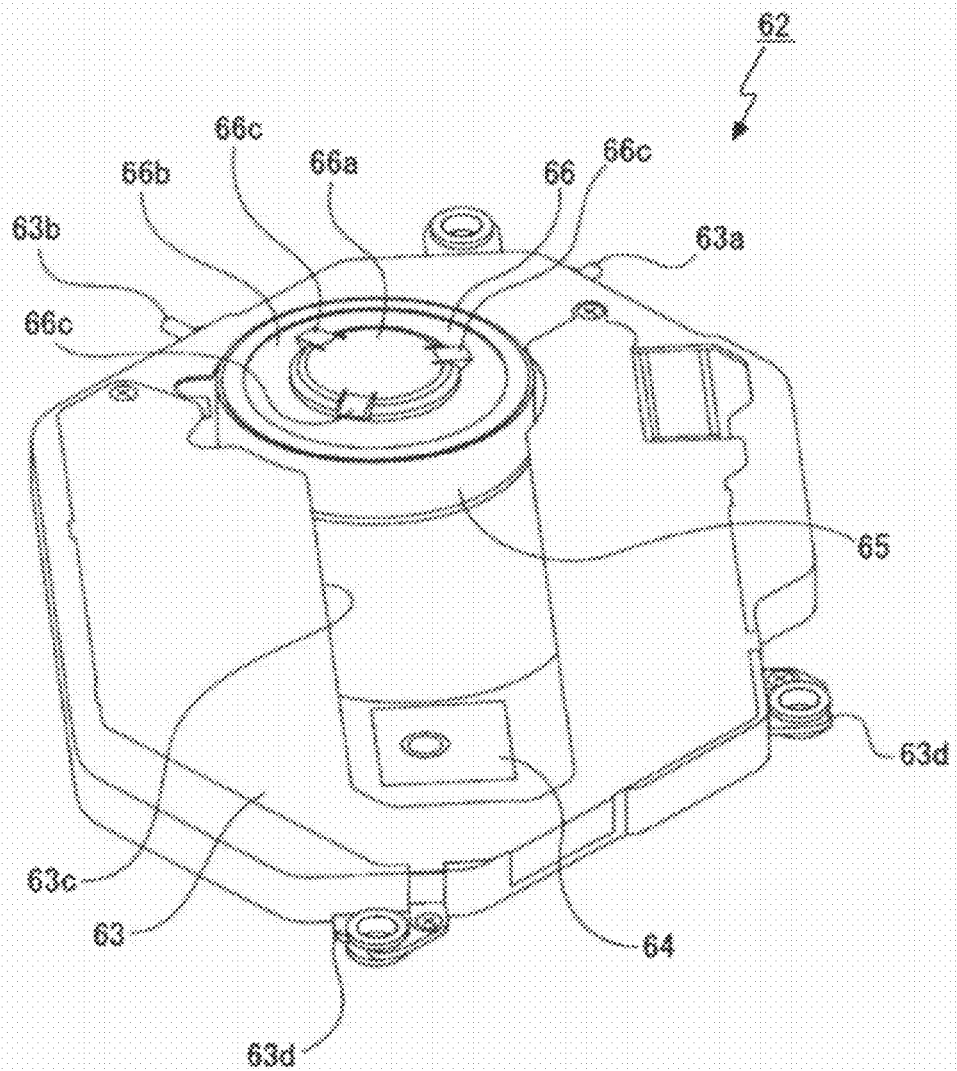
FIG. 16 is an enlarged perspective view of a disc drive unit.

On an outer circumferential surface of the pickup base 63, a first coupling pin 63a that protrudes rightwardly and a second coupling pin 63b that protrudes backwardly are provided (see FIG. 16).

An arrangement hole 63c for arranging the optical pickup 64 and the like is formed on the pickup base 63. Supported protrusions 63d are provided at the back end portion of the pickup base 63 while being apart from each other in the lateral direction. The supported protrusions 63d are supported at the front end portion of the case body 7.

The first coupling pin 63a is slidably coupled with the guide groove 25 formed on the main body 21 of the slider 20, and the second coupling pin 63b is slidably coupled with the guide groove 60 formed on the sub-slider 59. Therefore, by the slider 20 being moved in the front-back direction and the sub-slider 59 being moved in the lateral direction, the disc drive unit 62 is rotated (lifted up/down) in the direction in which the back end portion thereof moves in substantially the longitudinal direction using the supported protrusions 63d as a fulcrum.

A spindle motor 65 and a disc table 66 are provided at the back end portion of the arrangement hole 63c of the pickup base 63. The optical pickup 64 is movably supported in the arrangement hole 63c.

The disc table 66 is fixed to a motor shaft of the spindle motor 65 and includes a centering protrusion 66a at a center portion thereof. A table portion 66b on which the disc-like recording medium 100 is placed is provided on an outer circumferential side of the centering protrusion 66a. At an outer circumferential portion of an upper end portion of the centering protrusion 66a, engagement claws 66c are provided while being apart from each other in the circumferential direction. The engagement claws 66c can be elastically deformed in a direction in which they are set apart from the center of the centering protrusion 66a.

A circuit board 67 is provided below the chassis 12, and an activation switch 68, a first position detection switch 69, and a second position detection switch 70 are mounted on the circuit board 67 as shown in FIG. 5. The activation switch 68 is located near the left end of the circuit board 67, and the first position detection switch 69 and the second position detection switch 70 are located at a right end portion of the circuit board 67 while being apart from each other in the front-back direction.

Hereinafter, operations of the disc drive apparatus 5 at times of loading and ejecting the disc-like recording medium 100 will be described (see FIGS. 17 to 31). It should be noted that in descriptions below, the rotational directions of the respective portions will be referred to as S1 direction and S2 direction as indicated in the figures. The S1 direction is a clockwise direction when seen in a plane, whereas the S2 direction is a counterclockwise direction when seen in a plane.

First, an initial state of the portions as a state before the disc-like recording medium 100 is inserted into the disc insertion slot 9a of the front panel 9 will be described (see FIGS. 17 and 18).

Figure 17:
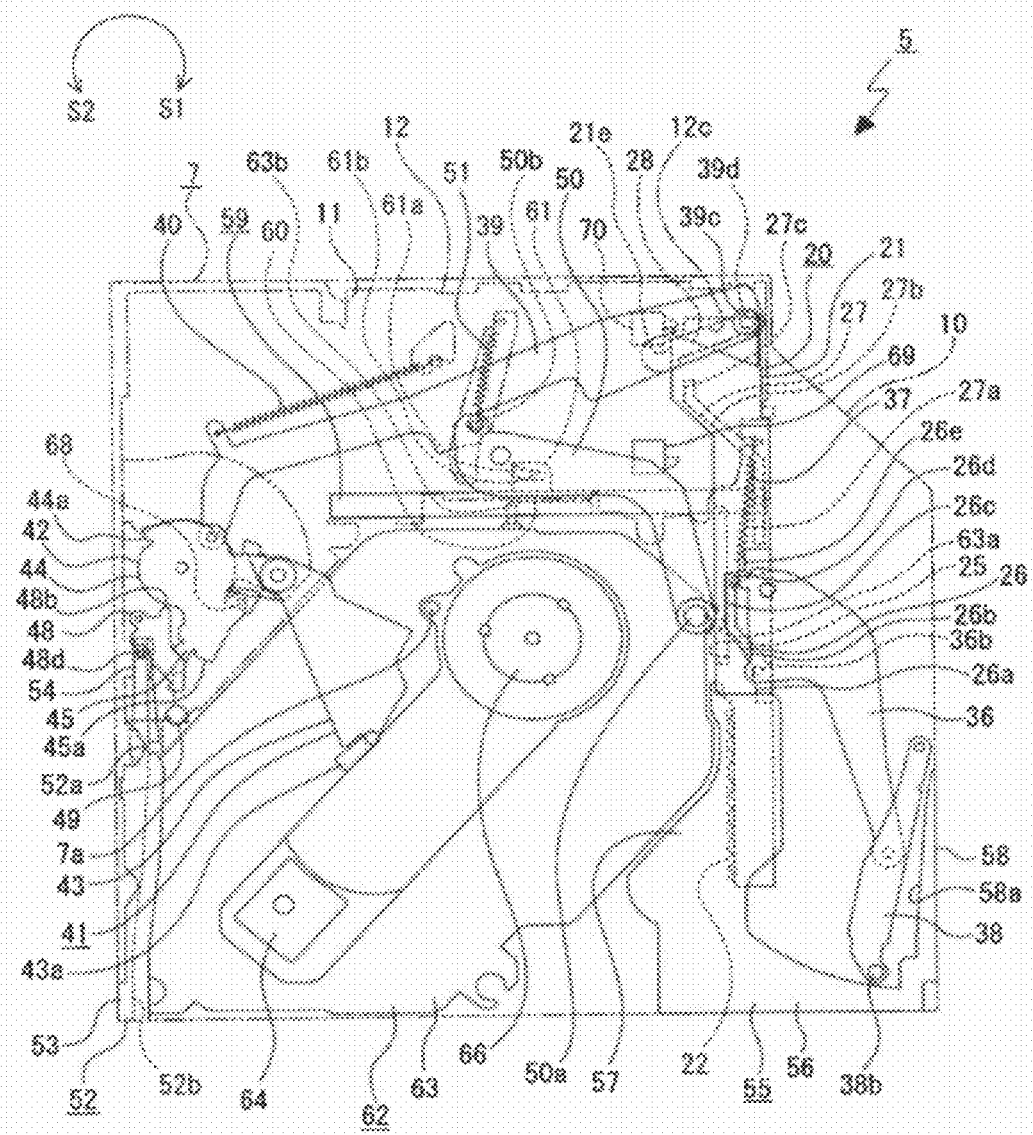
FIG. 17 is a schematic plan view showing, together with FIGS. 18 to 31, an initial state of an operation of the disc drive apparatus.
Figure 18:
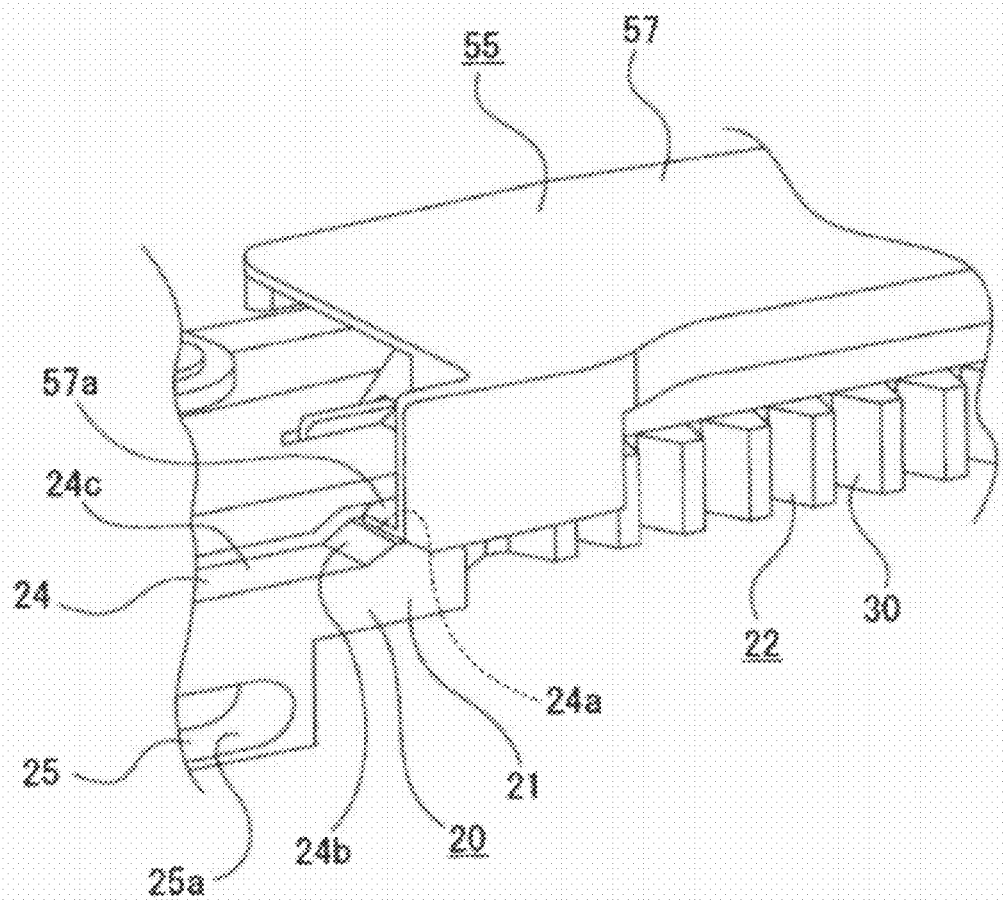
FIG. 18 is an enlarged perspective view showing a state where a supported protrusion piece of the second guide member is engaged with an upper linear portion of a support groove of the slider.

The slider 20 is held as the rack gear 22 intermeshes with the deceleration gear group 19 and positioned slightly more on the front side than the back-side moving end as shown in FIG. 17. At this time, the supported protrusion piece 57a of the second guide member 55 engages with the upper linear portion 24a of the support groove 24 of the slider 20 (see FIG. 18). Therefore, the second guide member 55 is elastically deformed such that the back end portion of the guide surface portion 57 is positioned to be slightly higher than the front end portion.

Since the back end portion of the guide surface portion 57 is positioned to be slightly higher than the front end portion as described above, it becomes difficult for the back end portion of the disc-like recording medium 100 to come into contact with the disc table 66 of the disc drive unit 62 or the pickup base 63 at a time the disc-like recording medium 100 is inserted into the disc insertion slot 9a and brought into sliding contact with the guide surface portion 57. Therefore, the disc-like recording medium 100 and the disc table 66 can be prevented from being damaged, and a smooth insertion operation of the disc-like recording medium 100 into the outer casing 6 can be secured.

Since the slider 20 is located on the back side of the shutter 18 supported by the motor holding plate 17 as described above, the shutter 18 is held at a position at which the disc insertion slot 9a of the front panel 9 is opened.

The first coupling pin 63a of the disc drive unit 62 engages with the front end portion of the first horizontal portion 25a of the guide groove 25 formed on the slider 20.

The shaft portion 36b of the rotary lever 36 engages with the back end portion of the front-side linear portion 26a of the shaft slide groove 26 formed on the slider 20. At this time, the rotary lever 36 is positioned close to a rotating end in the S2 direction. Thus, the load lever 38 coupled with the rotary lever 36 is also positioned close to the rotating end in the S2 direction.

The cam pin 59a of the sub-slider 59 engages with the first linear portion 27a of the guide groove 27 formed on the slider 20 (see FIG. 17). Therefore, the sub-slider 59 is positioned at the rightward moving end. At this time, the second coupling pin 63b of the disc drive unit 62 is engaged with the first horizontal portion 60a of the guide groove 60 formed on the sub-slider 59.

In the initial state, the switch press portion 21e of the slider 20 is positioned right in front of the second position detection switch 70, and the second position detection switch 70 is in an off state. Moreover, the first position detection switch 69 positioned in front of the second position detection switch 70 is also in the off state.

The supported shaft portion 39c of the link member 39 is in contact with a rightward opening edge of the support hole 12c of the chassis 12 by a bias force of the second tensile coil spring 40 and positioned at the rightward moving end. At this time, the slide pin 39d of the link member 39 is positioned in front of and set apart from the cam surface 28 of the slider 20.

The eject lever 41 coupled with the link member 39 is positioned at a rotating end in the S1 direction in accordance with the position of the link member 39, and the lever body 43 is positioned at the frontward moving end. Further, the disc holding portion 43a is positioned in front of the centering protrusion 66a of the disc table 66. At this time, the activation switch 68 is operated by the first protrusion 45 to become an on state.

The stopper protrusion 48c of the centering lever 48 comes into contact with a rightward opening edge of the lever arrangement hole 12d by the bias force of the bias spring 49 so that the centering lever 48 is positioned at the rotating end in the S2 direction.

The operated pin 50b of the support lever 50 comes into contact with a rightward opening edge of the spring arrangement hole 12b of the chassis 12 by the bias force of the third tensile coil spring 51 so that the support lever 50 is positioned at the rotating end in the S1 direction.

As described above, the first coupling pin 63a of the disc drive unit 62 engages with the front end portion of the first horizontal portion 25a of the guide groove 25 formed on the slider 20, and the second coupling pin 63b of the disc drive unit 62 engages with the left end portion of the first horizontal portion 60a of the guide groove 60 formed on the sub-slider 59. Thus, the disc drive unit 62 is inclined downwardly toward the back and positioned at the downward moving end.

Figure 19:
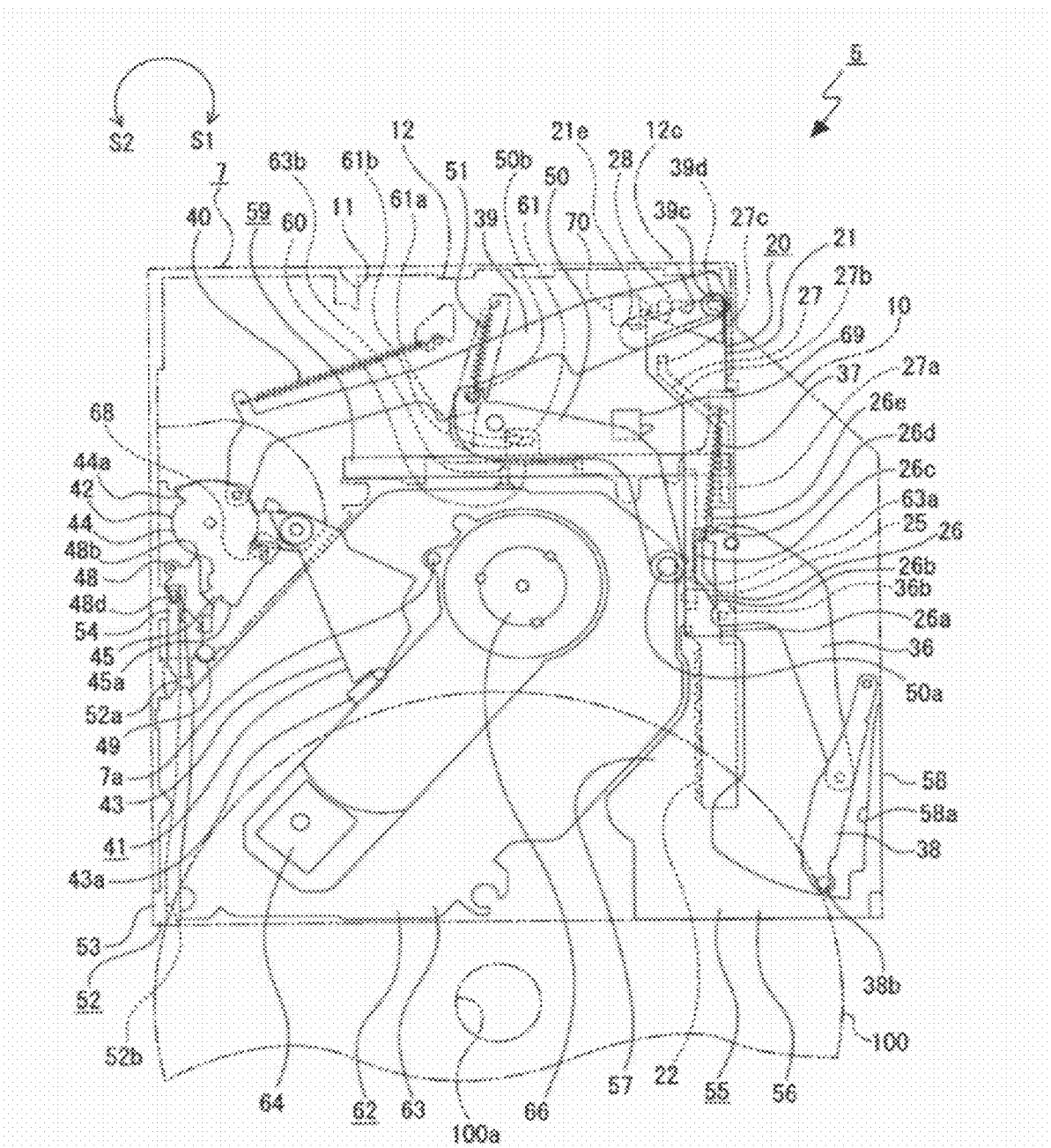
FIG. 19 is a schematic plan view showing a state right after the disc-like recording medium is inserted into a disc insertion slot.
Figure 20:
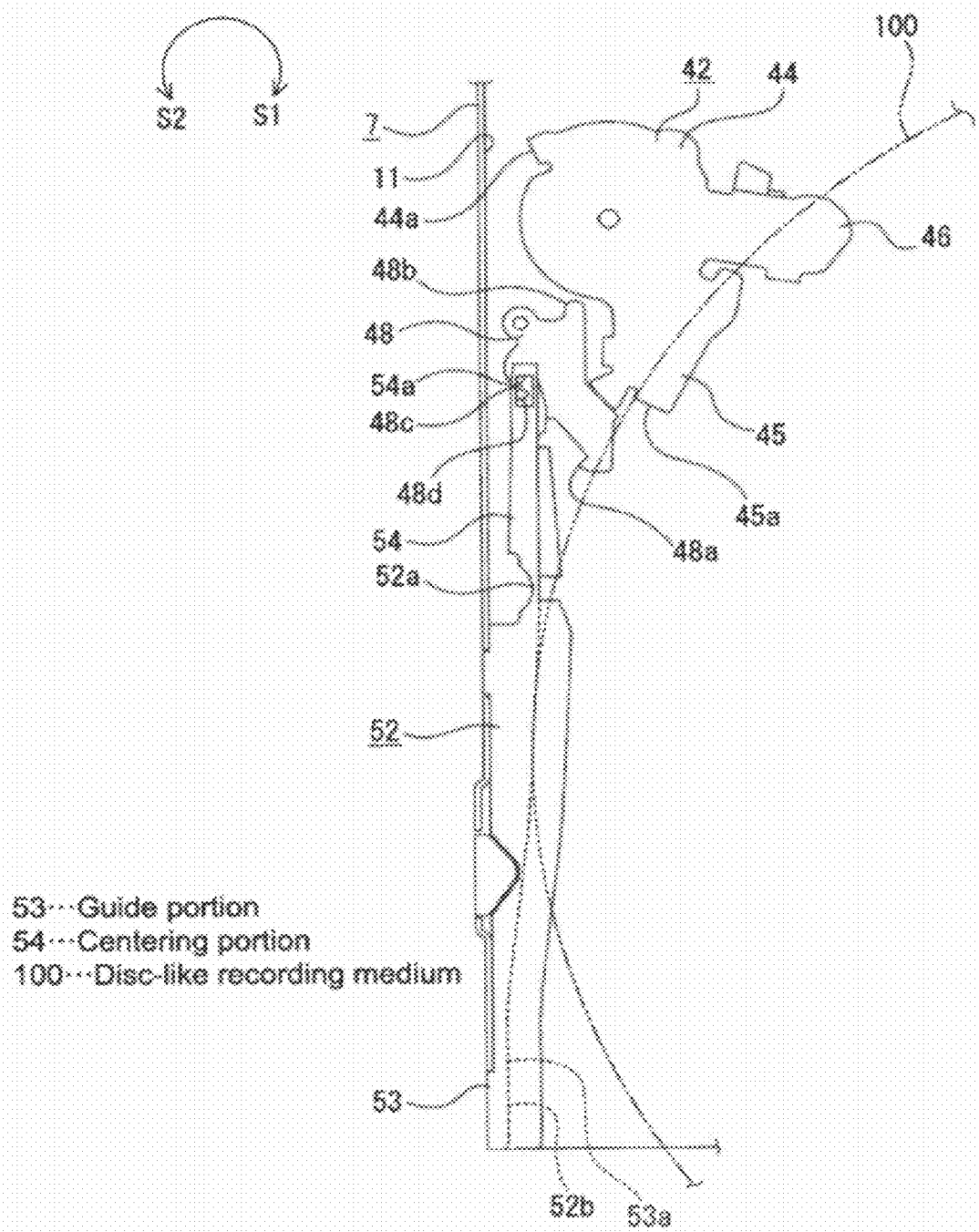
FIG. 20 is an enlarged schematic plan view showing a state where the disc-like recording medium is guided by a guide groove of the first guide member.

When the disc-like recording medium 100 is inserted into the disc insertion slot 9a of the front panel 9 in the initial state described above, the outer circumferential surface of the disc-like recording medium 100 is brought into sliding contact with the roller 38b of the load lever 38 and the guide groove 53a of the first guide member 52 so that the disc-like recording medium 100 is moved in the back direction as shown in FIGS. 19 and 20.

Figure 21:
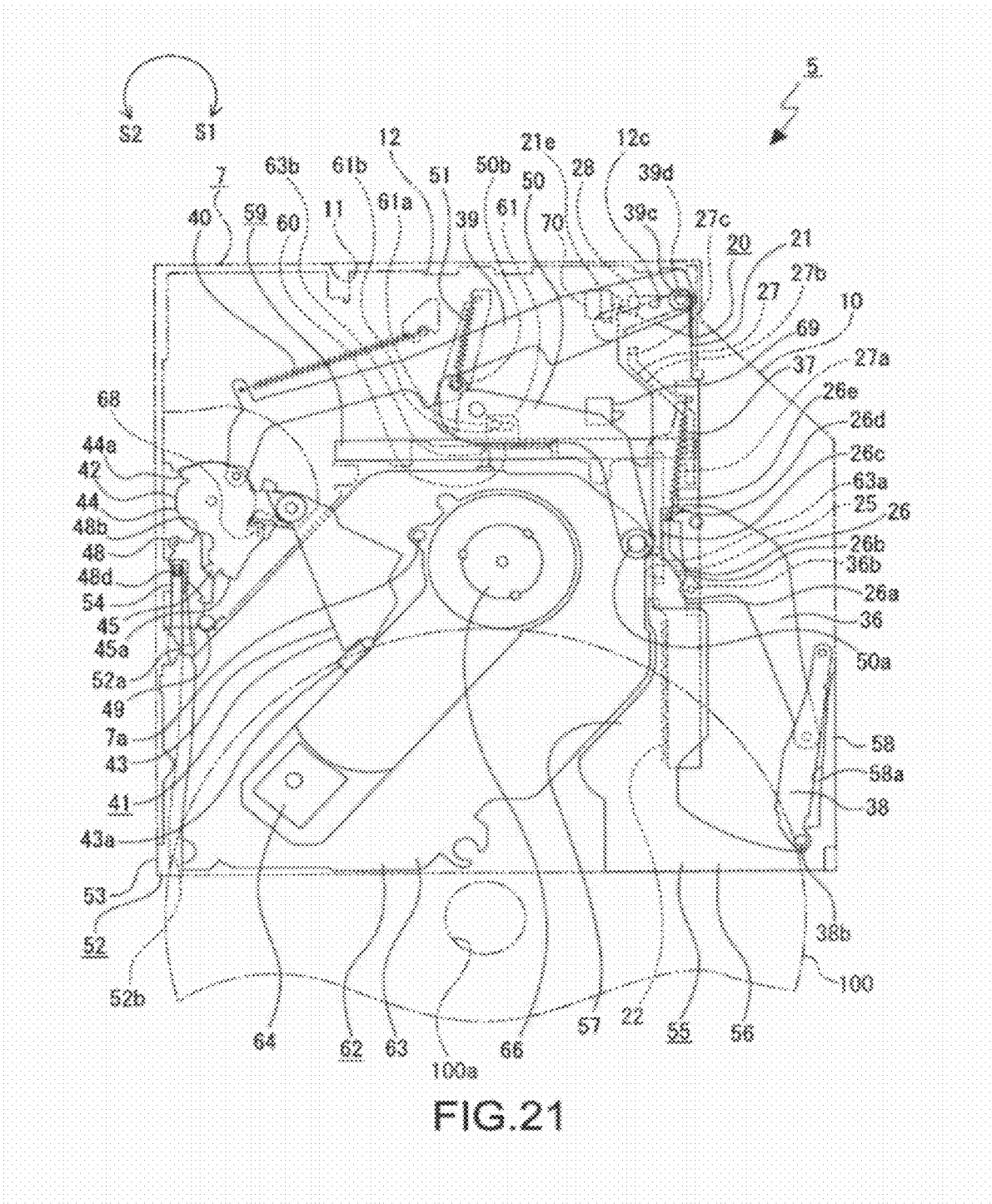
FIG. 21 is a schematic plan view showing, following FIG. 19, a state where the disc-like recording medium is held by a disc holding portion of the eject lever.

The disc-like recording medium 100 moved in the back direction is held as the outer circumferential surface thereof is brought into contact with the disc holding portion 43a of the lever body 43 of the eject lever 41 as shown in FIG. 21. The eject lever 41 is pressed by the disc-like recording medium 100 and rotated in the S2 direction against the bias force of the second tensile coil spring 40. At this time, the load lever 38 is rotated in the S2 direction against the bias force of the first tensile coil spring 37 along with the backward movement of the disc-like recording medium 100, and the rotary lever 36 is also rotated in the S2 direction along with the rotation of the load lever 38.

When the disc-like recording medium 100 is inserted into the disc insertion slot 9a, the disc-like recording medium 100 is held by the disc holding portion 43a located in front of the centering protrusion 66a of the disc table 66 as described above.

Therefore, since the disc-like recording medium 100 is held in front of the centering protrusion 66a, even when the disc-like recording medium 100 is inserted into the disc insertion slot 9a while inclining downwardly toward the back with respect to the horizontal state, it is difficult for the disc-like recording medium 100 to come into contact with the disc table 66 or the pickup base 63. Moreover, since the back end portion of the guide surface portion 57 of the second guide member 55 is positioned to be slightly higher than the front end portion thereof at the time the disc-like recording medium 100 is inserted into the disc insertion slot 9a as described above, it is difficult for the back end portion of the disc-like recording medium 100 to come into contact with the disc table 66 or the pickup base 63. Thus, the disc-like recording medium 100 and the disc table 66 can be prevented from being damaged, and a smooth insertion operation of the disc-like recording medium 100 into the outer casing 6 can be secured.

Figure 22:
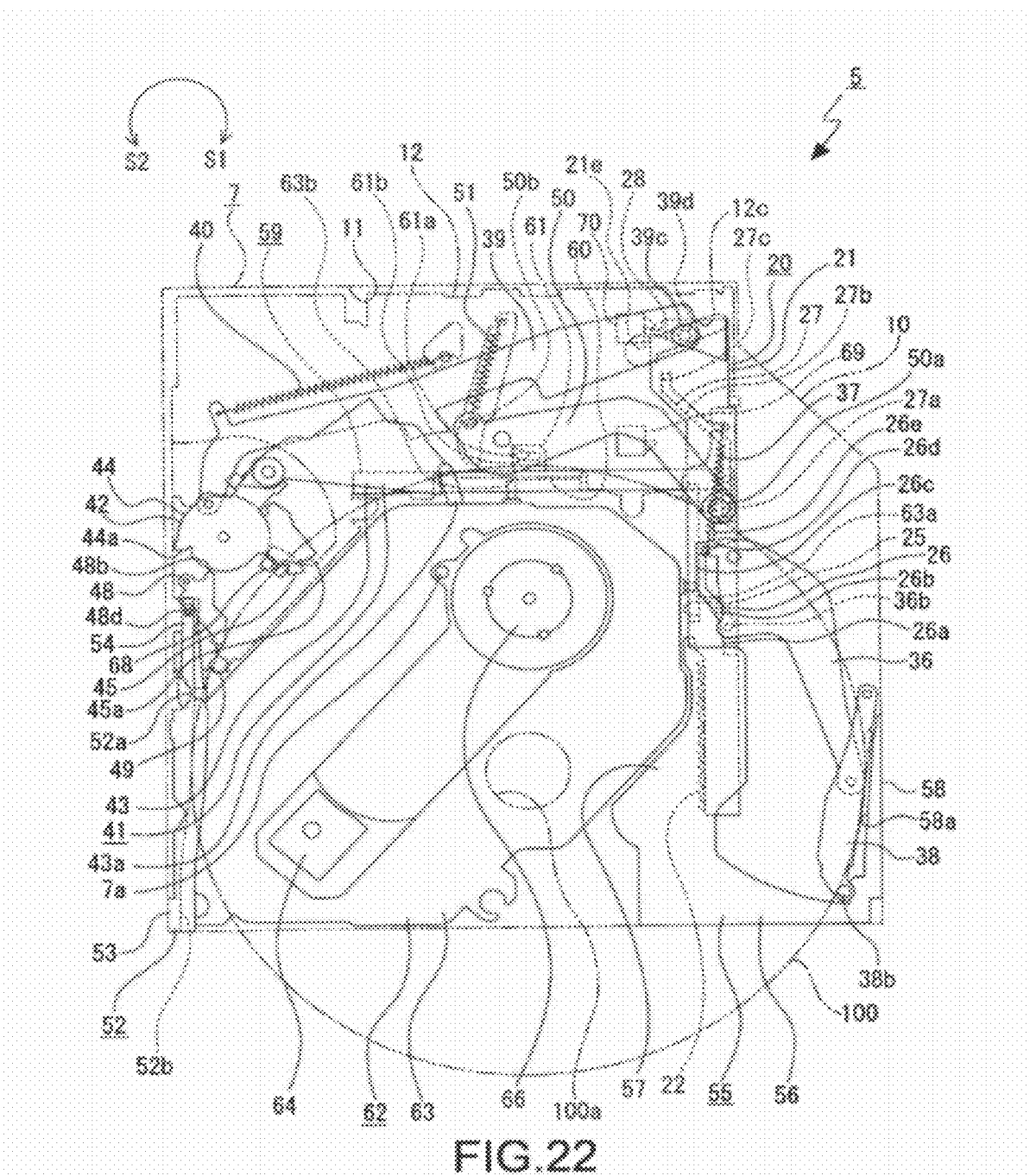
FIG. 22 is a schematic plan view showing, following FIG. 21, a state where a drive motor is started to be rotated clockwise.

Further, as the disc-like recording medium 100 is inserted into the case body 7 and moved toward the back, the center of the disc-like recording medium 100 is moved to the back of the roller 38b of the load lever 38 as shown in FIG. 22. Since the load lever 38 is biased in the S1 direction by the bias force of the first tensile coil spring 37, the roller 38b is pressed against the outer circumferential surface of the disc-like recording medium 100.

At this time, the disc-like recording medium 100 is held by the disc holding portion 43a of the eject lever 41 and the holding roller 50a of the support lever 50. The eject lever 41 and the support lever 50 are rotated in the S2 direction due to the disc holding portion 43a and the holding roller 50a being pressed by the disc-like recording medium 100.

The disc-like recording medium 100 is brought into sliding contact with the disc guide surface 52b of the first guide member 52 and the disc guide surface 58a of the second guide member 55 to be guided and moved in the back direction. The link member 39 is moved in substantially the left-hand direction along with the rotation of the eject lever 41 in the S2 direction.

It should be noted that when the disc-like recording medium 100 is inserted into and ejected from the disc insertion slot 9a, the outer circumferential surface of the disc-like recording medium 100 is guided by the disc guide surface 52b of the first guide member 52 and the disc guide surface 58a of the second guide member 55 to be moved in the front-back direction.

As described above, the first guide member 52 has a structure in which the guide portion 53 and the centering portion 54 are coupled in the front-back direction to be formed integrally, and the disc guide surface 52b is formed across both the guide portion 53 and the centering portion 54.

Since the guide portion 53 and the centering portion 54 are formed integrally as described above, the outer circumferential surface of the disc-like recording medium 100 is successively and smoothly brought into sliding contact with the guide portion 53 and the centering portion 54 so as to enable the disc-like recording medium 100 to be loaded smoothly and prevent the disc-like recording medium 100 from being damaged.

As described above, when the eject lever 41 is rotated in the S2 direction, an operation by the first protrusion 45 of the rotary support body 42 with respect to the activation switch 68 is canceled and the activation switch 68 is put to the off state. When the activation switch 68 is put to the off state, the rotation of the drive motor 15 in one direction (positive rotational direction) is started.

After the rotation of the drive motor 15 is started, the loading of the disc-like recording medium 100 by the drive force of the drive motor 15 is carried out. Thus, a manual insertion task of the disc-like recording medium 100 by a user becomes unnecessary.

When the drive motor 15 is started to rotate, the drive force thereof is transmitted to the slider 20 via the worm 16 and the deceleration gear group 19 to thus move the slider 20 in the front direction.

Figure 23:
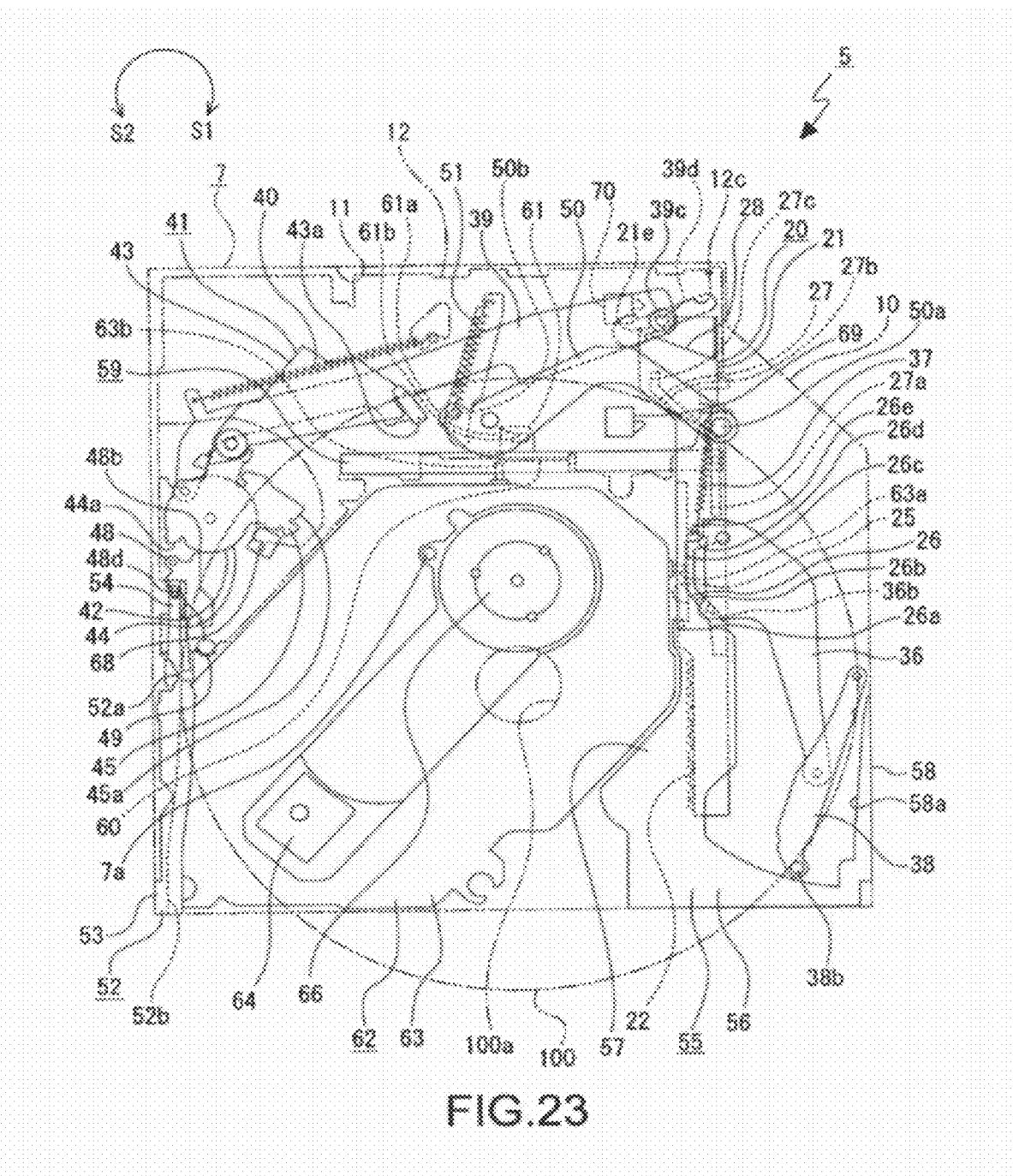
FIG. 23 is a schematic plan view showing, following FIG. 22, a state where the disc-like recording medium is being inserted into a case body by a load lever.

When the slider 20 is moved in the front direction, the shaft portion 36b of the rotary lever 36 is moved from the front-side linear portion 26a to the front-side inclined portion 26b along the shaft slide groove 26 (see FIG. 23). As a result, the rotary lever 36 and the load lever 38 are rotated in the S1 direction so that the disc-like recording medium 100 is pressed backward by the roller 38b of the load lever 38 and moved backward by the drive force of the drive motor 15.

At this time, the supported protrusion piece 57a of the second guide member 55 moves from the upper linear portion 24a to the lower linear portion 24c via the inclined portion 24b in the support groove 24 of the slider 20. Thus, the back end portion of the second guide member 55 is restored from its elastic deformation and returns to the same height as the front end portion.

The first coupling pin 63a of the disc drive unit 62 is moved backward along the first horizontal portion 25a. Since the cam pin 59a is moved backward along the first linear portion 27a of the guide groove 27, the sub-slider 59 does not move laterally, and the second coupling pin 63b of the disc drive unit 62 is still engaged with the first horizontal portion 60a of the guide groove 60. Therefore, the disc drive unit 62 is not lifted up nor down.

Figure 24:
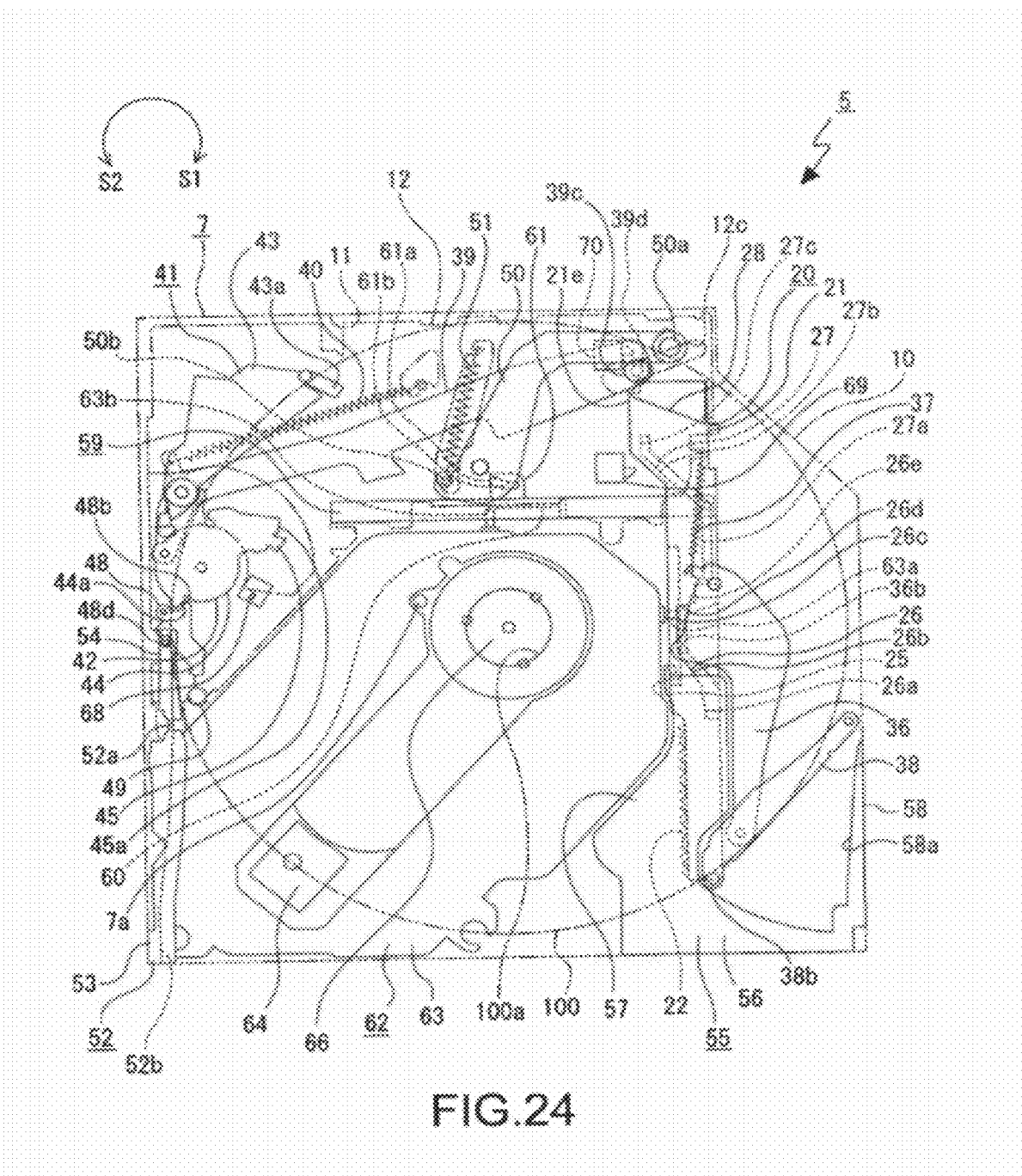
FIG. 24 is a schematic plan view showing, following FIG. 23, a state where centering of the disc-like recording medium is completed.
Figure 25:
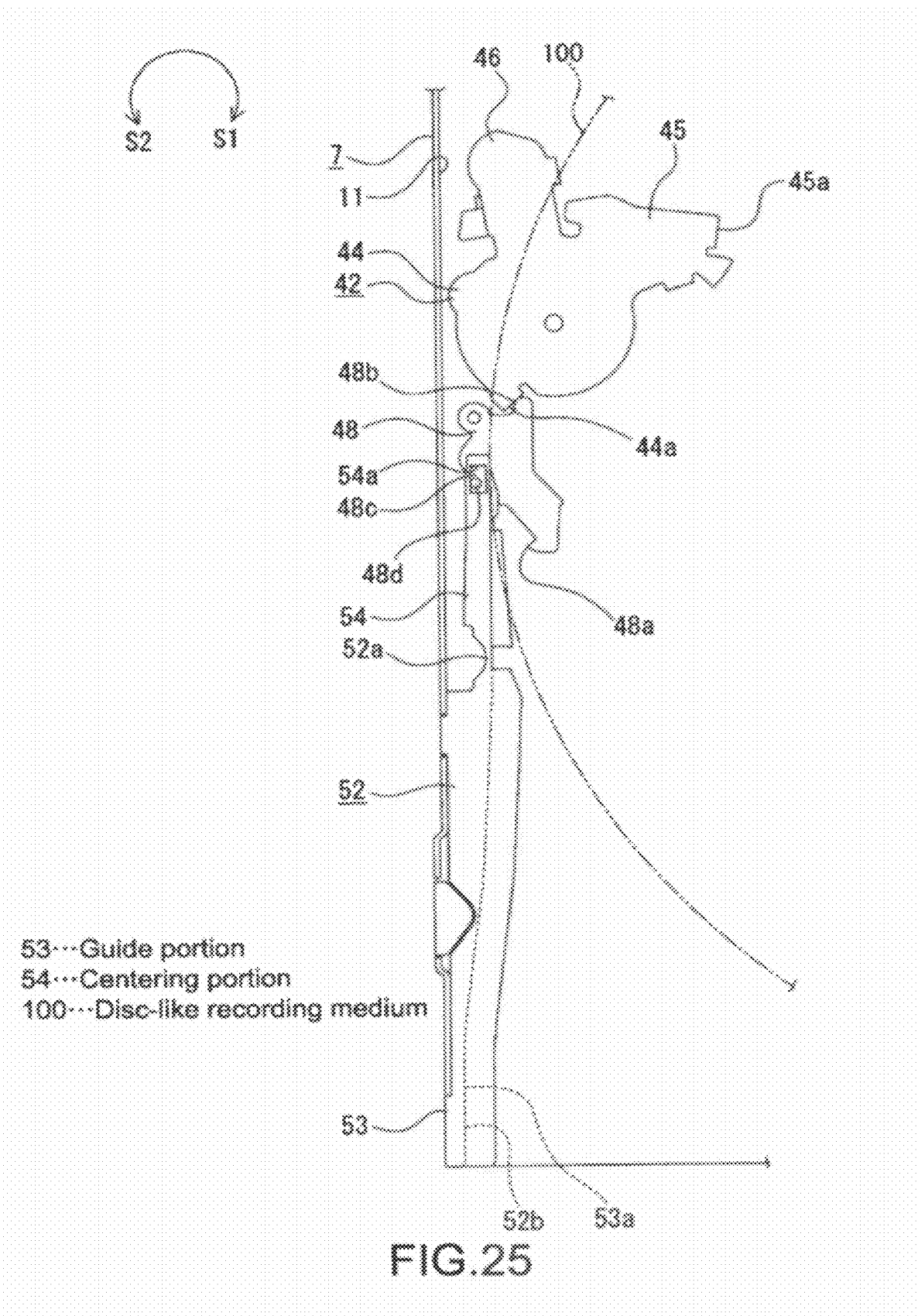
FIG. 25 is an enlarged schematic plan view showing a state where the disc-like recording medium is held by a centering portion of the first guide member.

If the slider 20 is subsequently moved in the front direction, the entire disc-like recording medium 100 is inserted into the case body 7 by the rotation of the load lever 38 in the S1 direction as shown in FIG. 24.

When the entire disc-like recording medium 100 is inserted into the case body 7, the rotary lever 36 that has been rotated in the S1 direction is moved backwardly along the mid linear portion 26c since the shaft portion 36b thereof is moved from the front-side inclined portion 26b to the mid linear portion 26c along the shaft slide groove 26. Thus, the rotations of the rotary lever 36 and the load lever 38 in the S1 direction are stopped, and the backward movement of the disc-like recording medium 100 is stopped. At this time, a center hole 100a of the disc-like recording medium 100 is located right above the centering protrusion 66a of the disc table 66.

Since the backward movement of the disc-like recording medium 100 is stopped, the rotation of the eject lever 41 in the S2 direction, the movement of the link member 39 in substantially the left-hand direction, and the rotation of the support lever 50 in the S2 direction are stopped. At this time, the holding roller 50a is pressed against the outer circumferential surface of the disc-like recording medium 100 by the third tensile coil spring 51 that biases the support lever 50 in the S1 direction, and the outer circumferential surface of the disc-like recording medium 100 is pressed against the roller 38b of the load lever 38 and the centering portion 54 of the first guide member 52 (see FIG. 25). Thus, the disc-like recording medium 100 is held by the holding roller 50a of the support lever 50, the roller 38b of the load lever 38, and the centering portion 54 of the first guide member 52 (see FIG. 24) and positioned with respect to the centering protrusion 66a of the disc table 66. At this time, the disc holding portion 43a of the eject lever 41 is also in contact with the outer circumferential surface of the disc-like recording medium 100.

When the shaft portion 36b of the rotary lever 36 is moved backwardly along the mid linear portion 26c by the frontward movement of the slider 20, the first coupling pin 63a of the disc drive unit 62 is moved from the first horizontal portion 25a to the first inclined portion 25b in the guide groove 25 and moved upward along the first inclined portion 25b. At this time, the cam pin 59a of the sub-slider 59 is moved from the first linear portion 27a to the inclined portion 27b in the guide groove 27 so that the sub-slider 59 is moved backwardly along the inclined portion 27b. Therefore, the sub-slider 59 is moved leftwardly, and the second coupling pin 63b of the disc drive unit 62 is moved from the first horizontal portion 60a to the first inclined portion 60b in the guide groove 60 and moved upwardly along the first inclined portion 60b.

The disc drive unit 62 is lifted upwardly since the first coupling pin 63a thereof is moved upwardly along the first inclined portion 25b and the second coupling pin 63b thereof is moved upwardly along the first inclined portion 60b.

By the lift up of the disc drive unit 62, the disc-like recording medium 100 is brought up by the engagement claws 66c of the disc table 66, with the result that an inner circumferential portion of the disc-like recording medium 100 is pressed against the lower surface of the cover body 8. At this time, the upper end portion of the centering protrusion 66a of the disc table 66 protrudes upwardly from the insertion hole 8a of the cover body 8.

The cover body 8 against which the disc-like recording medium 100 is pressed from below is temporarily bent, but the reaction force thereof is applied to the disc-like recording medium 100 as a downward press force. Thus, the engagement claws 66c of the disc table 66 are elastically deformed by the press force applied to the disc-like recording medium 100, and the centering protrusion 66a fits in the center hole 100a of the disc-like recording medium 100. When the centering protrusion 66a is fit in the center hole 100a of the disc-like recording medium 100, the elastically-deformed engagement claws 66c are restored from its elastic deformation and thus engage with an upper opening edge of the center hole 100a of the disc-like recording medium 100 so that the disc-like recording medium 100 is chucked and held by the disc table 66.

The slider 20 is subsequently moved in the front direction even after the disc-like recording medium 100 is chucked by the disc table 66, and the first coupling pin 63a of the disc drive unit 62 is moved from the first inclined portion 25b to the second inclined portion 25c in the guide groove 25 to be moved along the second inclined portion 25c. At this time, the cam pin 59a of the sub-slider 59 is moved along the inclined portion 27b of the guide groove 27. Thus, the sub-slider 59 is moved leftwardly, and the second coupling pin 63b of the disc drive unit 62 is moved from the first inclined portion 60b to the second inclined portion 60c in the guide groove 60 to be moved along the second inclined portion 60c.

By the first coupling pin 63a being moved along the second inclined portion 25c and the second coupling pin 63b being moved along the second inclined portion 60c as described above, the disc drive unit 62 is moved in substantially the downward direction.

Figure 26:
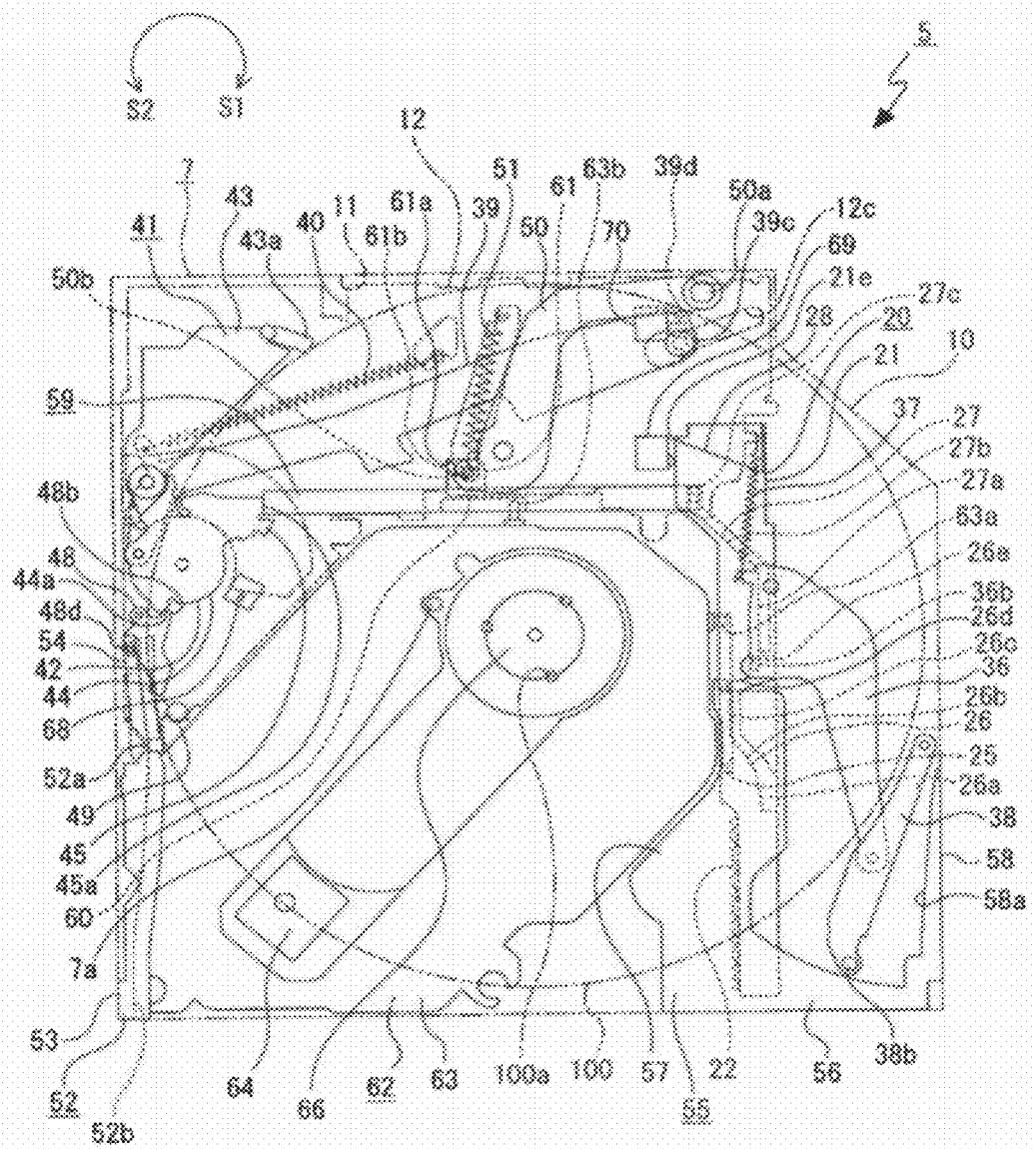
FIG. 26 is a schematic plan view showing a state where a loading operation of the disc-like recording medium is completed.
Figure 27:
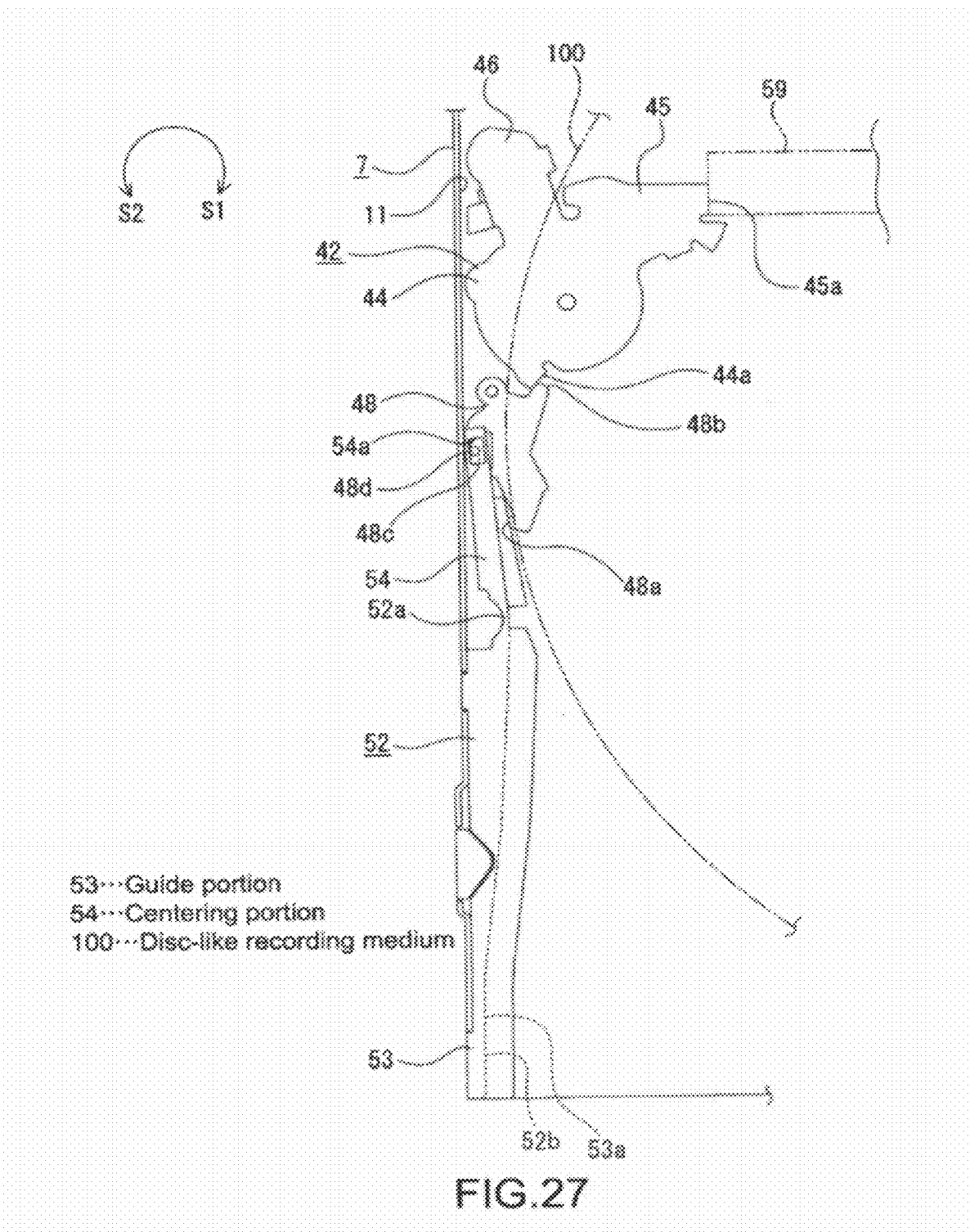
FIG. 27 is an enlarged schematic plan view showing a state where the centering portion of the first guide member is elastically deformed to thus set apart an outer circumferential surface of the disc-like recording medium.

The slider 20 is subsequently moved in the front direction by the drive force of the drive motor 15 (see FIG. 26).

The slider 20 is moved to the frontward moving end, and the shutter 18 supported by the motor holding plate 17 is moved in substantially the upward direction by an operation of the slider 20 to block the disc insertion slot 9a.

When the slider 20 is moved in the front direction, the first coupling pin 63a of the disc drive unit 62 is moved from the second inclined portion 25c to the second horizontal portion 25d in the guide groove 25 to be moved along the second horizontal portion 25d. At this time, the cam pin 59a of the sub-slider 59 is moved along the inclined portion 27b of the guide groove 27 toward the second linear portion 27c. Therefore, the sub-slider 59 is moved leftwardly, and the second coupling pin 63b of the disc drive unit 62 is moved from the second inclined portion 60c to the second horizontal portion 60d in the guide groove 60 to be moved along the second horizontal portion 60d.

As described above, since the first coupling pin 63a is moved along the second horizontal portion 25d and the second coupling pin 63b is moved along the second horizontal portion 60d, the disc drive unit 62 does not move in the longitudinal direction.

By the frontward movement of the slider 20, the shaft portion 36b of the rotary lever 36 is moved along the shaft slide groove 26 from the mid linear portion 26c to the backside linear portion 26e via the back-side inclined portion 26d. Thus, the rotary lever 36 and the load lever 38 are rotated in the S2 direction, and the roller 38b of the load lever 38 is set apart from the outer circumferential surface of the disc-like recording medium 100.

At this time, since the sub-slider 59 is moved leftwardly as described above, the operated pin 50b of the support lever 50 is inserted into the inclined cam groove 61a of the cam protrusion 61 to be moved to the linear cam groove 61b. By the operated pin 50b being moved from the inclined cam groove 61a to the linear cam groove 61b, the support lever 50 is rotated in the S2 direction against the bias force of the third tensile coil spring 51, and the holding roller 50a is set apart from the outer circumferential surface of the disc-like recording medium 100.

At the same time, by the leftward movement of the subslider 59, the pressed piece 45a of the rotary support body 42 in the eject lever 41 is pressed leftwardly by the left end portion of the sub-slider 59. Thus, the eject lever 41 is rotated in the S2 direction against the bias force of the second tensile coil spring 40.

When the eject lever 41 is rotated in the S2 direction, the link member 39 coupled with the eject lever 41 is moved to the leftward moving end.

By the rotation of the eject lever 41 in the S2 direction, the disc holding portion 43a of the lever body 43 of the eject lever 41 is set apart from the outer circumferential surface of the disc-like recording medium 100.

At the same time, by the rotation of the eject lever 41 in the S2 direction, the pressed protrusion 48b of the centering lever 48 is pressed rightwardly by the press piece 44a of the rotary support body 42 of the eject lever 41 so that the centering lever 48 is rotated in the S1 direction against the bias force of the bias spring 49. By the rotation of the centering lever 48 in the S1 direction, the centering portion 54 of the first guide member 52 coupled with the centering lever 48 is elastically deformed in a direction in which it moves leftwardly with respect to the guide portion 53 (see FIG. 27). As a result, the centering portion 54 is set apart from the outer circumferential surface of the disc-like recording medium 100.

As described above, in the disc drive apparatus 5, the centering portion 54 integrally formed with the guide portion 53 is elastically deformed with respect to the guide portion 53 so that the centering portion 54 is set apart from the outer circumferential surface of the disc-like recording medium 100. As a result, structures and operations become simple, and a mechanism can thus be simplified.

By thus setting apart the roller 38b of the load lever 38, the holding roller 50a of the support lever 50, the disc holding portion 43a of the lever body 43, and the centering portion 54 of the first guide member 52 from the outer circumferential surface of the disc-like recording medium 100, the disc-like recording medium 100 becomes rotatable.

When the slider 20 is moved in the front direction as described above, the first position detection switch 69 is operated by the switch press portion 21e to be put to an on state. When the first position detection switch 69 is put to the on state, the rotation of the drive motor 15 is stopped and the frontward movement of the slider 20 is also stopped.

The disc-like recording medium 100 is rotated along with the rotation of the disc table 66 by the rotation of the spindle motor 65, and information signals are recorded onto or reproduced from the disc-like recording medium 100 by the drive of the optical pickup 64.

When the recording or reproduction of information signals with respect to the disc-like recording medium 100 is ended, the drive motor 15 is rotated in an inverse direction to start an ejection operation by the user operating the eject button 9c.

Figure 28:
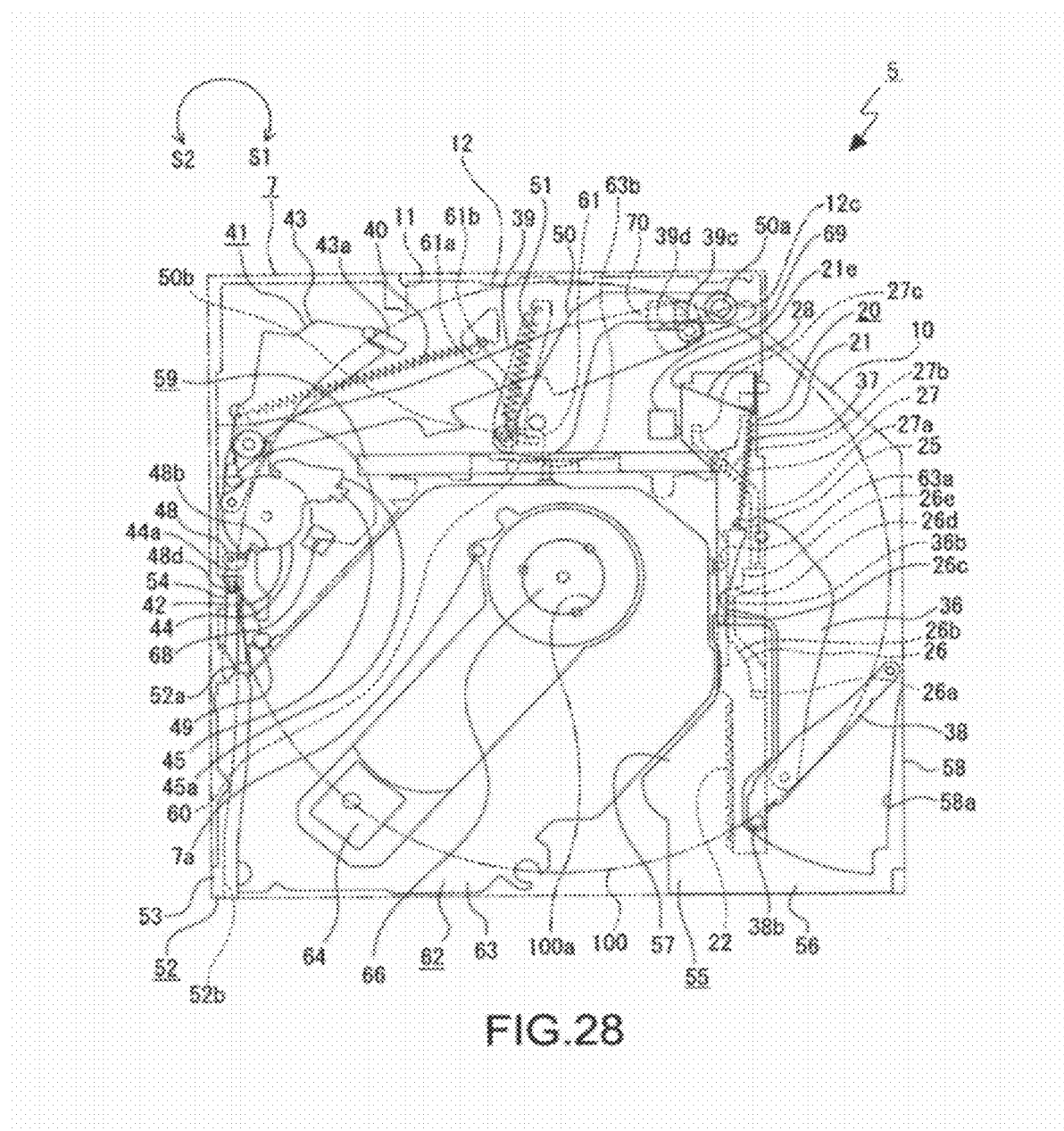
FIG. 28 is a schematic plan view showing a state right after an eject operation of the disc-like recording medium is started.

When the drive motor 15 is rotated in the inverse direction, the slider 20 is moved backwardly and the shutter 18 supported by the motor holding plate 17 is moved in substantially the downward direction to open the disc insertion slot 9a as shown in FIG. 28. Moreover, the operation to the first position detection switch 69 by the switch press portion 21e of the slider 20 is canceled, and the first position detection switch 69 is put to an off state.

At the same time, when the drive motor 15 is rotated in the inverse direction, the slider 20 is moved backwardly and the outer circumferential surface of the disc-like recording medium 100 is again held by the roller 38b of the load lever 38, the disc holding portion 43a of the eject lever 41, the holding roller 50a of the support lever 50, and the centering portion 54 of the first guide member 52 by an operation opposite from that described above.

Specifically, the shaft portion 36b of the rotary lever 36 is moved along the shaft slide groove 26 from the back-side linear portion 26e to the mid linear portion 26c via the back-side inclined portion 26d, and the rotary lever 36 and the load lever 38 are rotated in the S1 direction so that the roller 38b of the load lever 38 is brought into contact with the outer circumferential surface of the disc-like recording medium 100.

Further, the sub-slider 59 is moved rightwardly by the cam pin 59a thereof being moved along the guide groove 27 from the second linear portion 27c to the inclined portion 27b. By the rightward movement of the sub-slider 59, the operated pin 50b of the support lever 50 is pulled out of the inclined cam groove 61a and the support lever 50 is rotated in the S1 direction by the bias force of the third tensile coil spring 51 so that the holding roller 50a is brought into contact with the outer circumferential surface of the disc-like recording medium 100.

Furthermore, by the rightward movement of the sub-slider 59, the press of the sub-slider 59 with respect to the pressed piece 45a of the eject lever 41 is released and the eject lever 41 is rotated in the S1 direction by the bias force of the second tensile coil spring 40 so that the disc holding portion 43a is brought into contact with the outer circumferential surface of the disc-like recording medium 100.

Moreover, by the rotation of the eject lever 41 in the S1 direction, the press by the press piece 44a with respect to the pressed protrusion 48b of the centering lever 48 is released and the centering lever 48 is rotated in the S2 direction by the bias force of the bias spring 49. By the rotation of the centering lever 48 in the S2 direction, the centering portion 54 of the first guide member 52 is restored from its elastic deformation in the direction in which it moves rightwardly with respect to the guide portion 53, and the centering portion 54 is thus brought into contact with the outer circumferential surface of the disc-like recording medium 100.

Subsequently, by the backward movement of the slider 20 and the rightward movement of the sub-slider 59, the chucking of the disc-like recording medium 100 with respect to the disc table 66 is released as follows.

The release of the chucking of the disc-like recording medium 100 is carried out while the disc-like recording medium 100 is held by the roller 38b of the load lever 38, the disc holding portion 43a of the eject lever 41, the holding roller 50a of the support lever 50, and the centering portion 54 of the first guide member 52.

By the backward movement of the slider 20, the first coupling pin 63a of the disc drive unit 62 is moved along the guide groove 25 from the second horizontal portion 25d to the first horizontal portion 25a via the second inclined portion 25c and the first inclined portion 25b. Further, by the rightward movement of the sub-slider 59, the second coupling pin 63b of the disc drive unit 62 is moved along the guide groove 60 from the second horizontal portion 60d to the first horizontal portion 60a via the second inclined portion 60c and the first inclined portion 60b. As a result, the disc drive unit 62 is moved down after being temporarily lifted up and the inner circumferential portion of the disc-like recording medium 100 is brought into contact with the release pin 7a provided in the case body 7 during the drop so that the disc-like recording medium 100 is pulled apart from the centering protrusion 66a of the disc table 66 and the chucking is released.

While the chucking release operation of the disc-like recording medium 100 is being carried out, the rotary lever 36 does not rotate since the shaft portion 36b thereof is moved along the mid linear portion 26c of the shaft slide groove 26. As a result, the load lever 38 also does not rotate.

When the disc drive unit 62 is moved down and the chucking of the disc-like recording medium 100 is released, the disc-like recording medium 100 is ejected from the disc insertion slot 9a, and the slider 20 is subsequently moved in the back direction (see FIG. 29).

By the backward movement of the slider 20, the rightward movement of the sub-slider 59 is stopped since the cam pin 59a is moved from the inclined portion 27b to the first linear portion 27a in the guide groove 27. At this time, by the backward movement of the slider 20, the slide pin 39d of the link member 39 is pressed backward by the cam surface 28. Thus, the link member 39 is moved in substantially the right-hand direction by the slide pin 39d being brought into sliding contact with the cam surface 28 (see FIG. 30).

Figure 29:
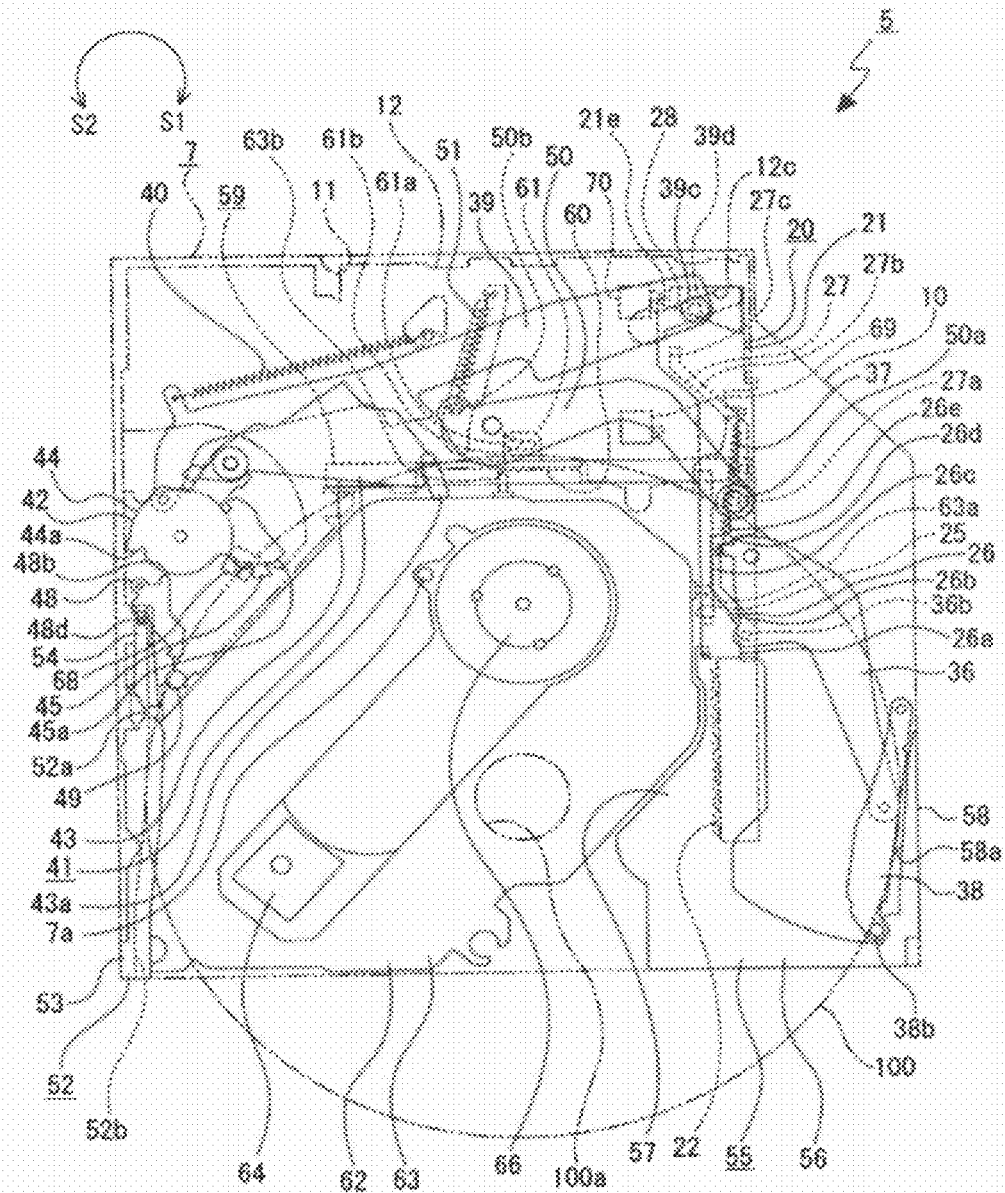
FIG. 29 is a schematic plan view showing, following FIG. 28, a state where the disc-like recording medium is ejected from the disc insertion slot.
Figure 30:
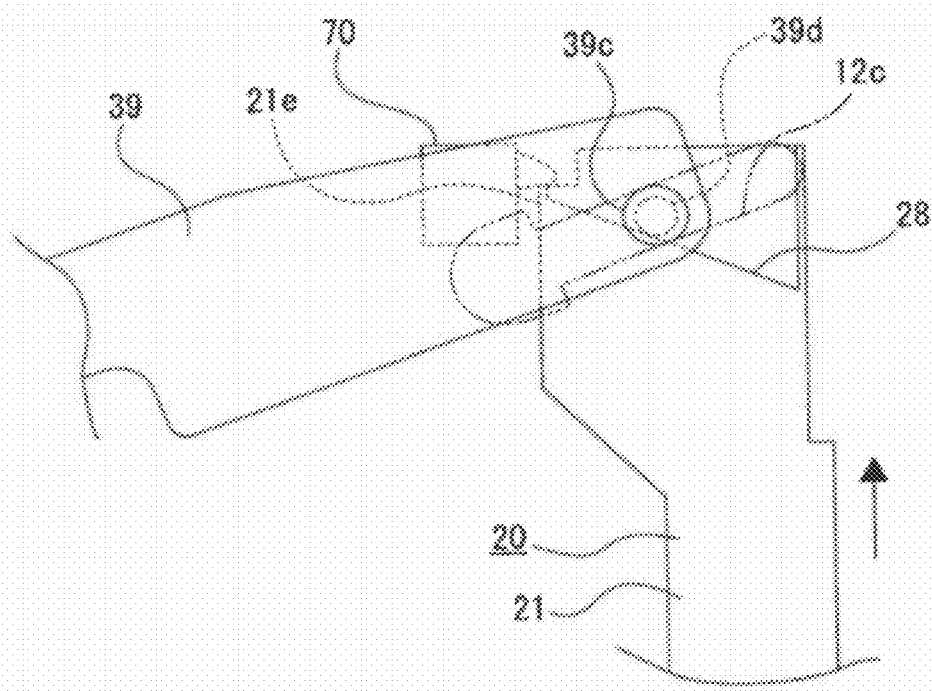
FIG. 30 is an enlarged schematic plan view showing a state where a slide pin of the link member is pressed by a cam surface of the slider.

As the link member 39 is moved in substantially the right-hand direction, the eject lever 41 is rotated in the S1 direction, and the disc-like recording medium 100 is pressed in the front direction by the disc holding portion 43a (see FIG. 29). As the disc-like recording medium 100 is moved in the front direction, a part thereof protrudes from the disc insertion slot 9a in the front direction.

At this time, the support lever 50 is rotated in the S1 direction by the bias force of the third tensile coil spring 51, and the holding roller 50a is followed by the frontward movement of the disc-like recording medium 100. The rotary lever 36 is rotated in the S2 direction since the shaft portion 36b thereof is moved from the mid linear portion 26c to the front-side linear portion 26a of the shaft slide groove 26 via the front-side inclined portion 26b, and the load lever 38 is rotated in the S2 direction while the roller 38b is in contact with the outer circumferential surface of the disc-like recording medium 100. The shaft portion 36b of the rotary lever 36 is moved to the front end portion of the front-side linear portion 26a of the shaft slide groove 26, and the load lever 38 is rotated to the rotating end in the S2 direction.

While the eject operation of the disc-like recording medium 100 is being carried out, the outer circumferential surface of the disc-like recording medium 100 is guided by the disc guide surface 52b of the first guide member 52 and the disc guide surface 58a of the second guide member 55 so that the disc-like recording medium 100 is moved in the front direction.

As described above, the first guide member 52 is formed by integrally coupling the guide portion 53 and the centering portion 54 in the front-back direction, and the disc guide surface 52b is formed across both the guide portion 53 and the centering portion 54.

Since the guide portion 53 and the centering portion 54 are formed integrally as described above, the outer circumferential surface of the disc-like recording medium 100 is successively and smoothly brought into sliding contact with the guide portion 53 and the centering portion 54, with the result that the loading operation of the disc-like recording medium 100 can be carried out smoothly and the disc-like recording medium 100 can be prevented from being damaged.

Figure 31:
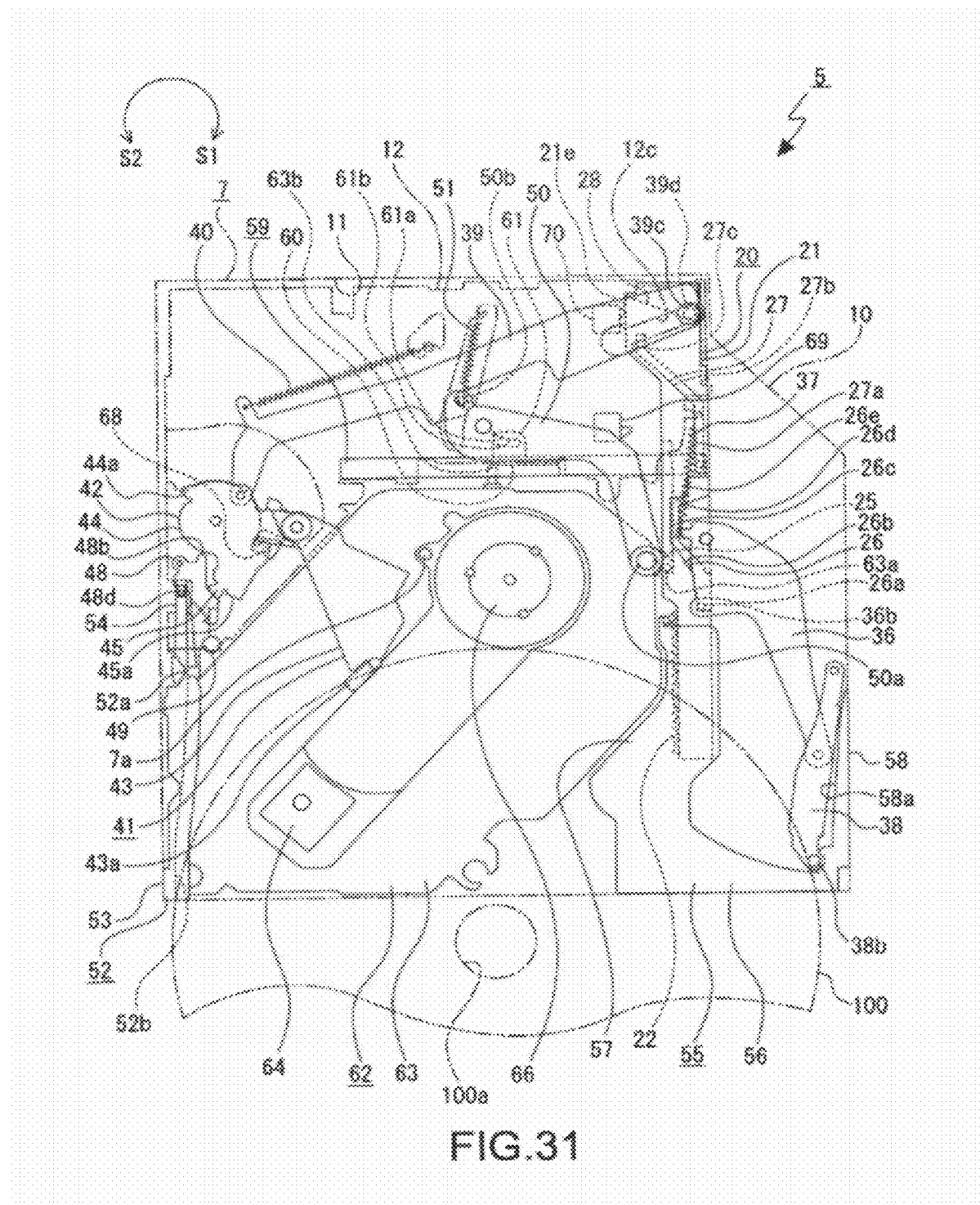
FIG. 31 is a schematic plan view showing a state where the eject operation is completed.

When the slider 20 is moved backwardly and almost the front-half portion of the disc-like recording medium 100 is ejected from the disc insertion slot 9a as shown in FIG. 31, the second position detection switch 70 is operated by the switch press portion 21e of the slider 20 to be put to an on state. At this time, the slider 20 is moved to the backward moving end.

The user can hold the part of the disc-like recording medium 100 protruding from the disc insertion slot 9a to take out the disc-like recording medium 100 from the disc drive apparatus 5.

As described above, when the second position detection switch 70 is put to the on state, the rotational direction of the drive motor 15 is inverted, and the frontward movement of the slider 20 is resumed.

The slider 20 is moved in the front direction until the respective portions are put back to the initial state (see FIG. 17) and stopped.

Since the eject operation is carried out by the drive force of the drive motor 15 in the disc drive apparatus 5 as described above, there is a fear that the disc-like recording medium 100 is not ejected in a case where the drive motor 15 becomes inoperable due to a failure in a circuit that supplies power to the drive motor 15, for example.

In this regard, in the disc drive apparatus 5, the disc-like recording medium 100 can be ejected forcibly as follows (see FIGS. 32 to 35).

The forcible ejection of the disc-like recording medium 100 can be carried out by inserting a press pin 200 into the pin insertion hole 9b formed on the front panel 9 and pressing the pressed portion 35a of the slide plate 35 supported by the main body 21 of the slider 20 in the back direction.

Figure 32:
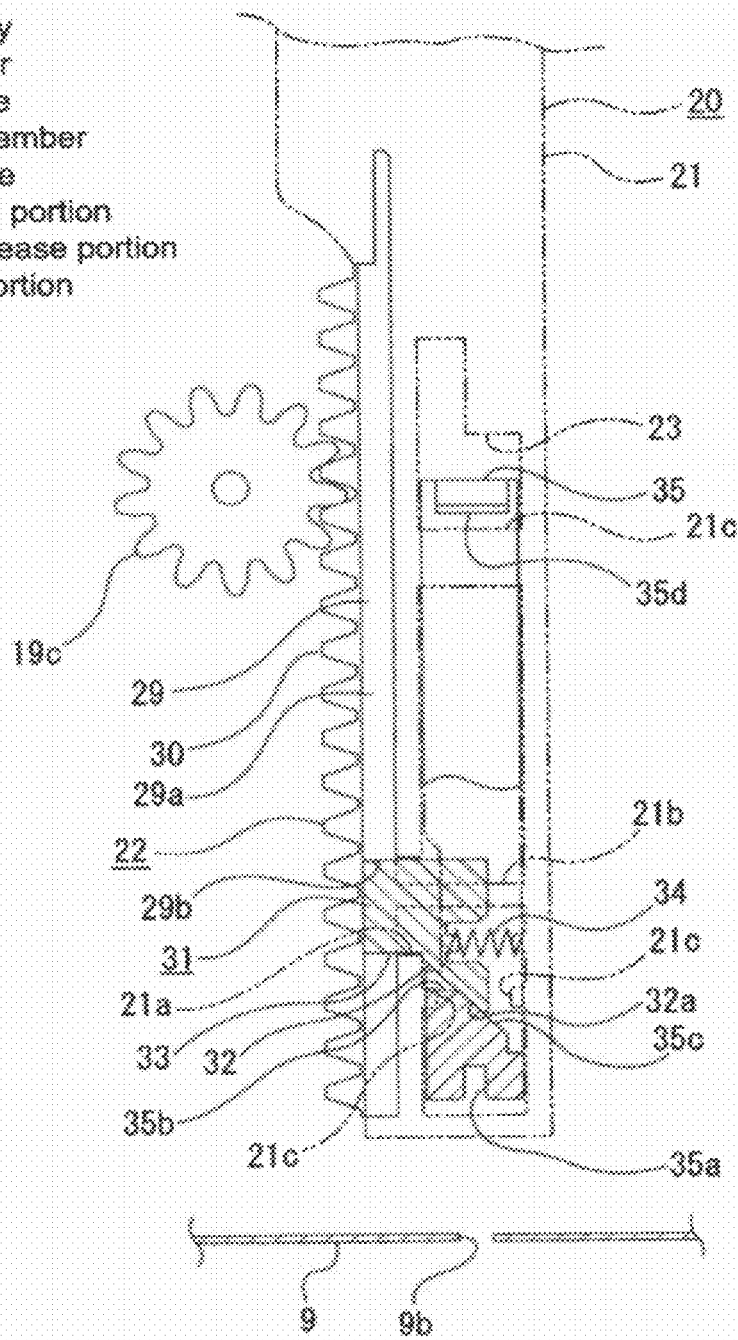
FIG. 32 is an enlarged plan view showing a forcible eject operation of the disc-like recording medium together with FIGS. 33 to 35, FIG. 32 showing a partial cross section of a locked state of a rack gear and a main body.
Figure 33:
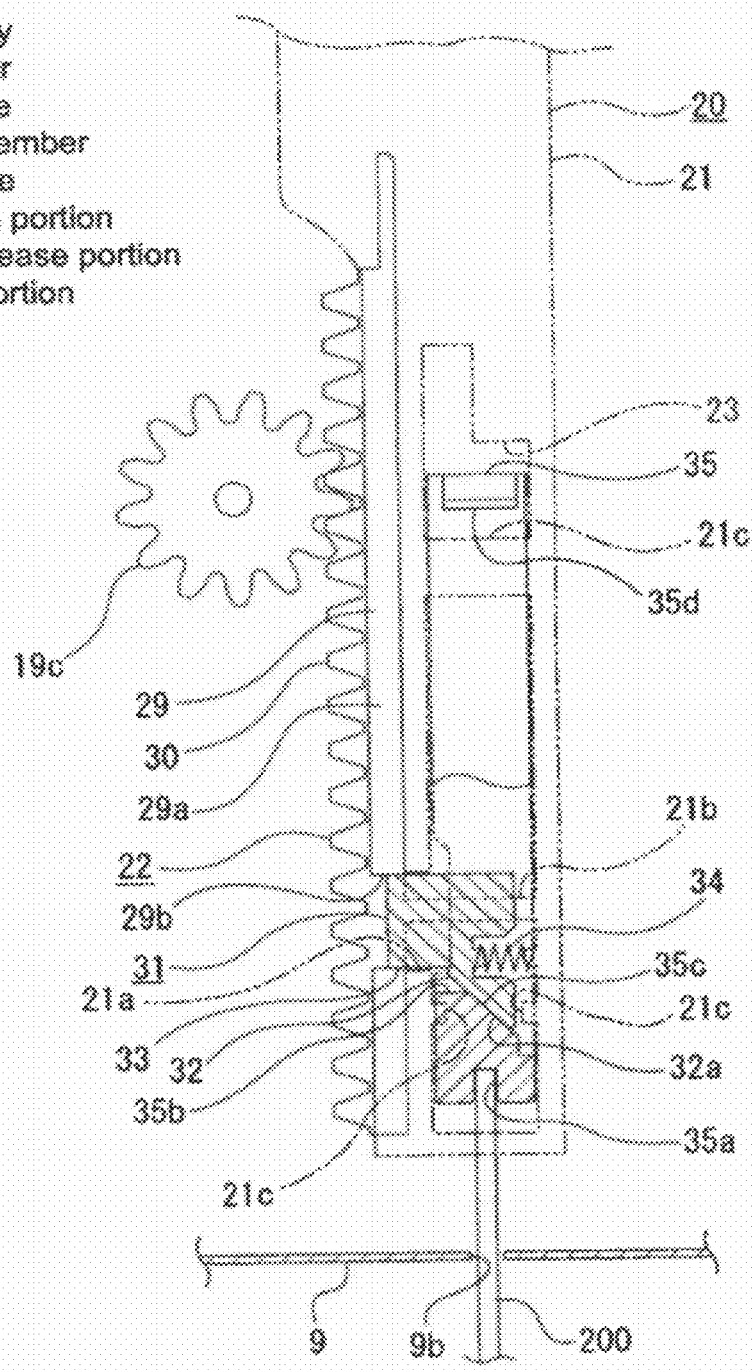
FIG. 33 is an enlarged plan view showing a partial cross section of a state where a slide plate is pressed and moved to the back and a cam slide surface of a lock plate is pressed to the back by a lock release portion.
Figure 34:
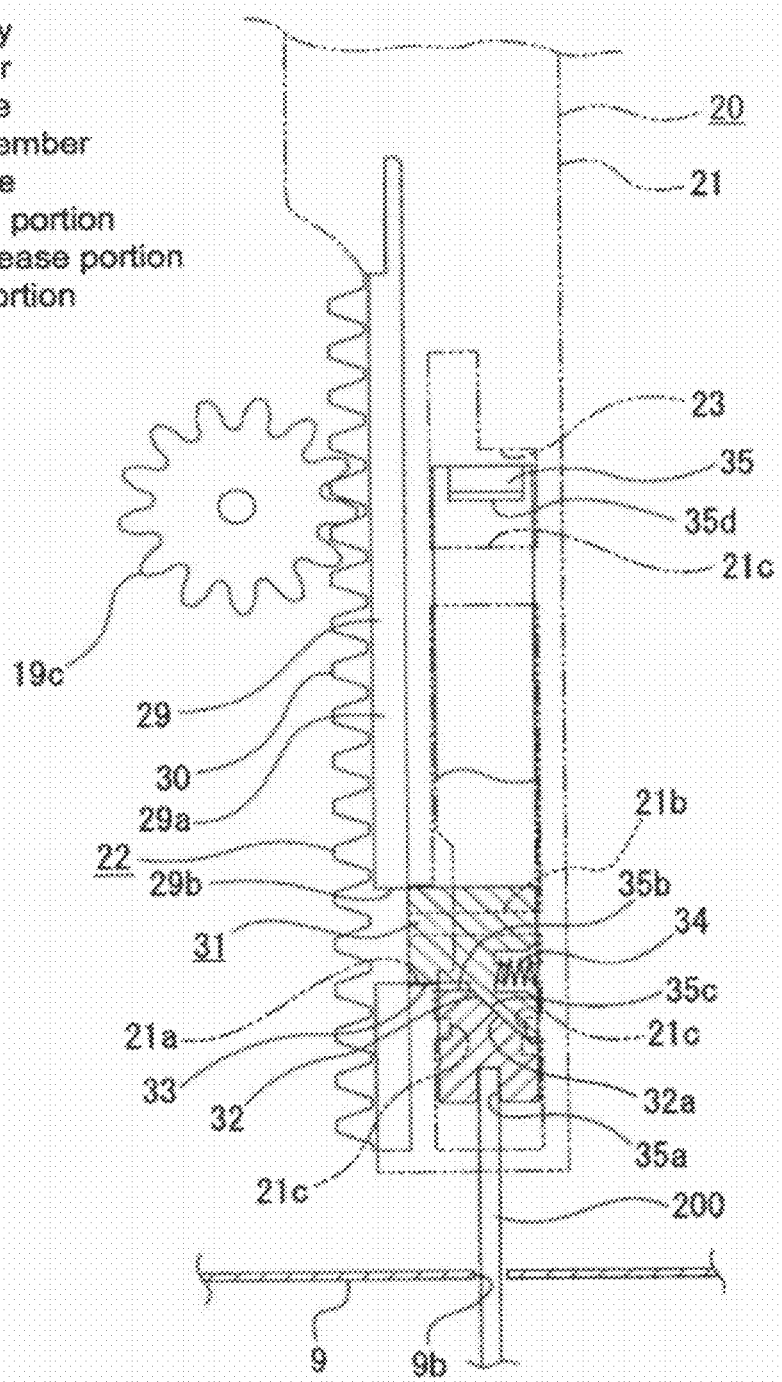
FIG. 34 is an enlarged plan view showing a partial cross section of a state where the lock plate is moved to the lock release position and the lock of the rack gear with respect to the main body is released.
Figure 35:
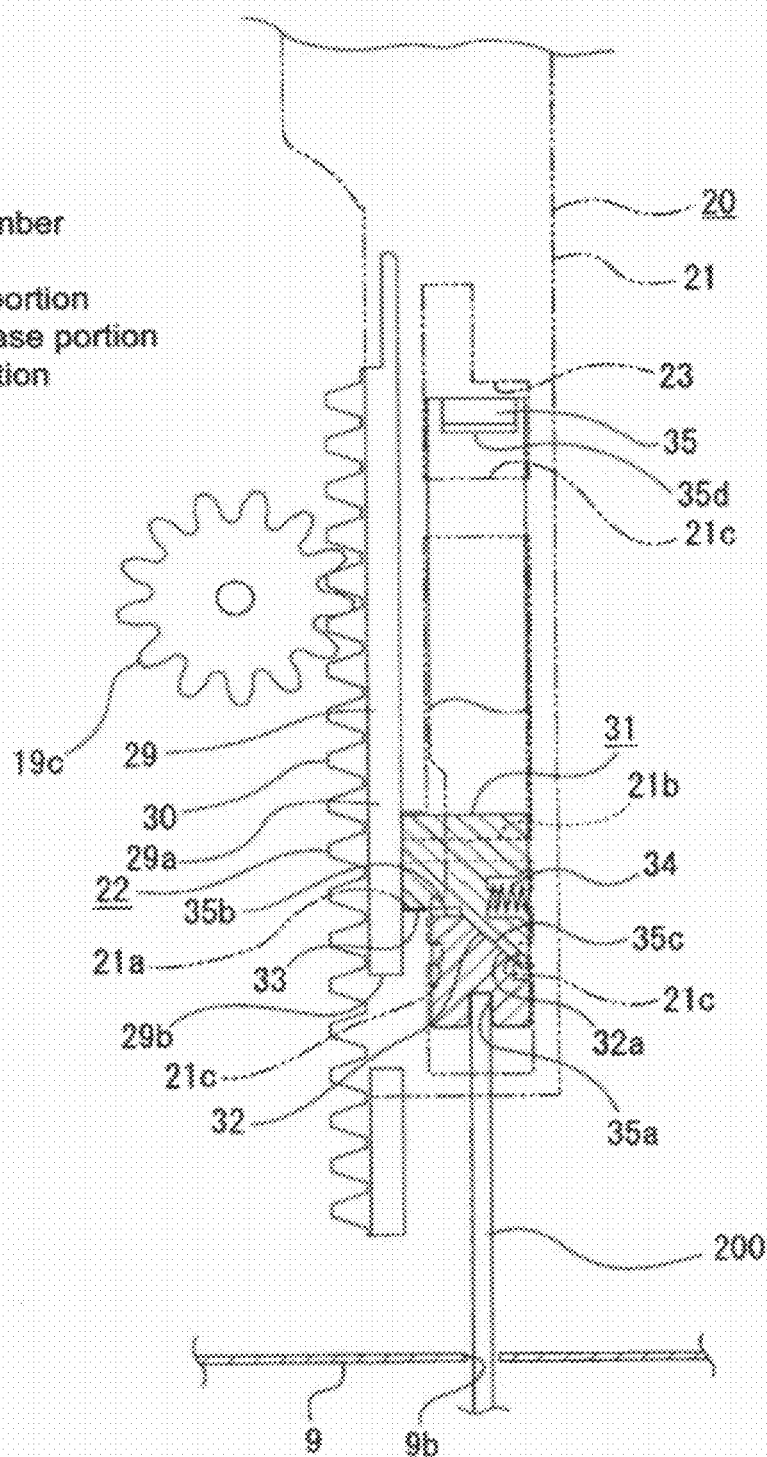
FIG. 35 is an enlarged plan view showing a partial cross section of a state where the main body is moved backward with respect to the rack gear.

The lock plate 31 is at the lock position as the leftward moving end (see FIG. 32). When the pressed portion 35a is pressed in the back direction by the press pin 200 to thus move the slide plate 35 in the back direction in this state, the cam slide surface 32a of the lock plate 31 is pressed in the back direction by the lock release portion 35b (see FIG. 33). As a result, the lock plate 31 is moved toward the lock release position against the bias force of the spring member 34, and the lock of the rack gear 22 with respect to the main body 21 is released (see FIG. 34).

When the lock plate 31 reaches the lock release position as the rightward moving end by the backward movement of the slide plate 35, the right-hand side surface of the supported portion 32 comes into contact with the side surface of the concave support portion 23 to restrict a further rightward movement of the lock plate 31. Thus, when the slide plate 35 is subsequently moved in the back direction and the cam slide surface 32a is pressed in the back direction by the press portion 35c, a backward press force by the press pin 200 is applied to the main body 21 via the slide plate 35 and the lock plate 31, with the result that the main body 21 moves in the back direction with respect to the rack gear 22. At this time, the main body 21 is moved in the back direction by the guided portion 21d thereof being guided by the guide portion 29c of the rack gear 22 (see FIG. 35).

When the main body 21 is moved in the back direction with respect to the rack gear 22, the disc-like recording medium 100 is ejected from the disc insertion slot 9a by the same operation as in the eject operation described above that has been carried out when the slider 20 is moved in the back direction by the drive force of the drive motor 15, and the forcible ejection is thus completed.

When the press pin 200 is pulled out of the pin insertion hole 9b after the forcible ejection of the disc-like recording medium 100 described above is completed, the press with respect to the pressed portion 35a of the slide plate 35 is released.

Figure 36:
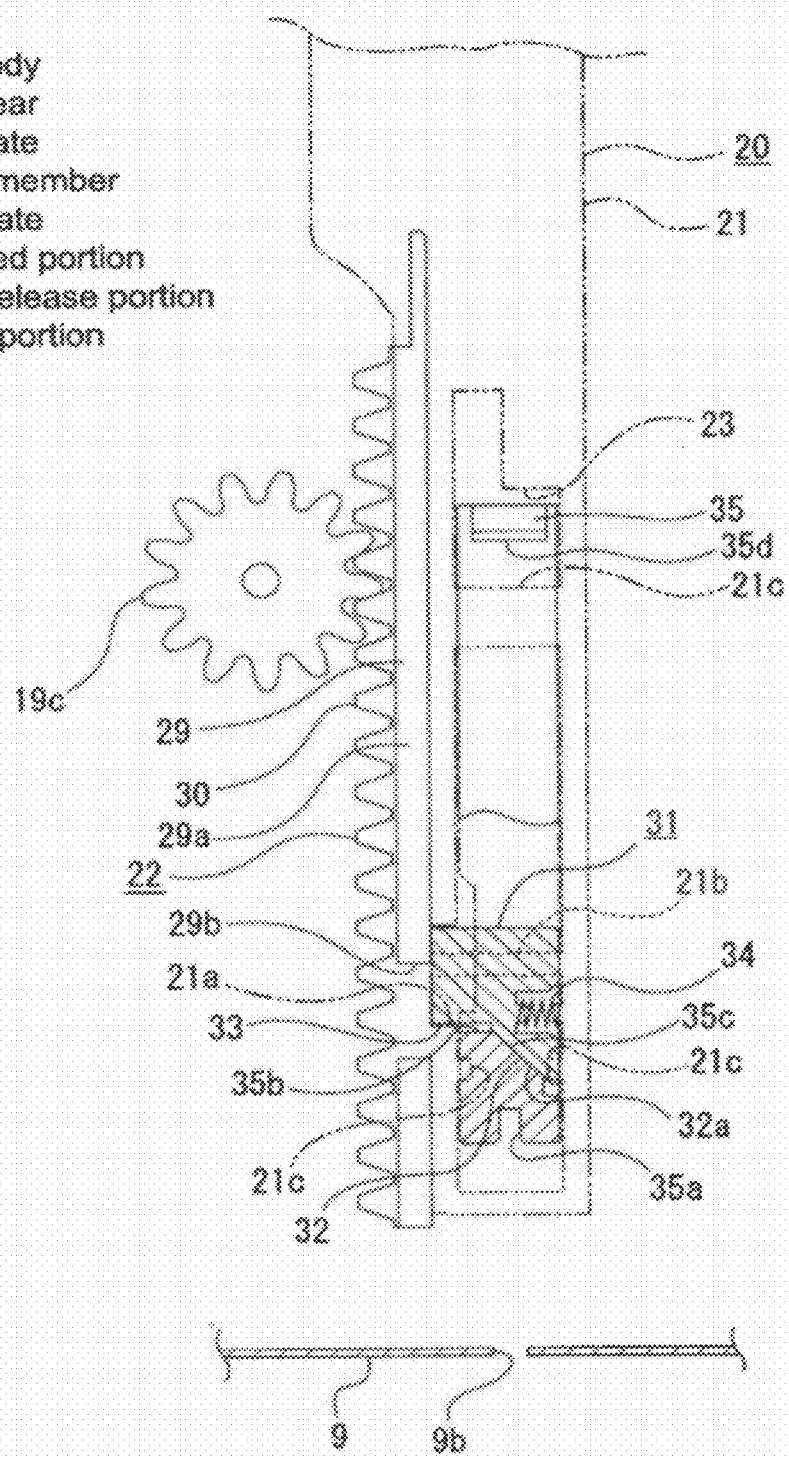
FIG. 36 is an enlarged plan view showing a partial cross section of a state where a press with respect to the slide plate is released.

When the main body 21 is moved with respect to the rack gear 22 in the front direction in a state where the press by the press pin 200 with respect to the pressed portion 35a of the slide plate 35 is released, the main body 21 is moved more to the back with respect to the rack gear 22 than in a case where the rack gear 22 is locked with respect to the main body 21. Thus, as shown in FIG. 36, the communication hole 21a is located more on the back side than the locked concave portion 29b of the rack gear 22, and the lock plate 31 is not moved to the lock position since the lock portion 33 thereof is in contact with the right-hand side surface of the wall portion 29a of the rack gear 22 by the bias force of the spring member 34.

Figure 37:
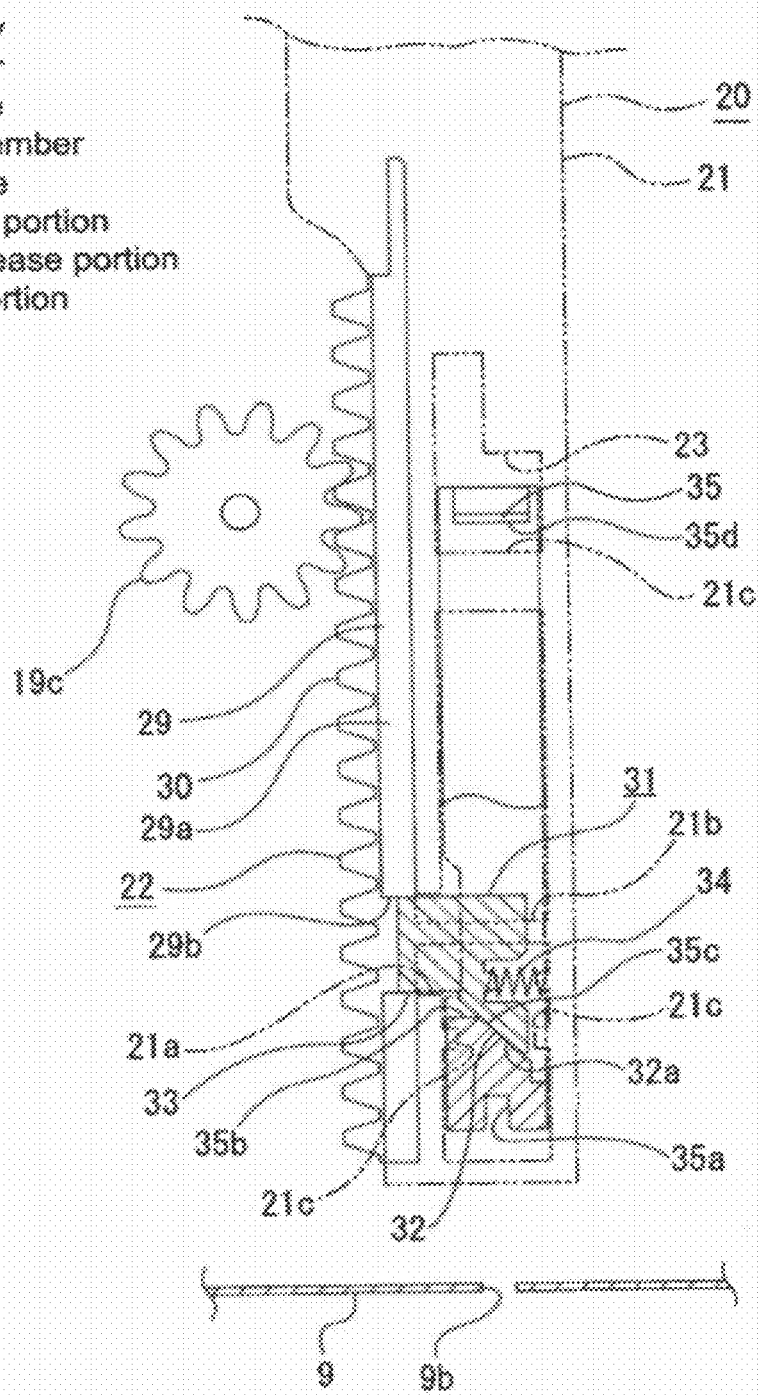
FIG. 37 is an enlarged plan view showing a partial cross section of a state where the lock plate is moved to a lock position.

As shown in FIG. 37, the lock plate 31 is moved toward the lock position by the bias force of the spring member 34 at a time the main body 21 is moved in the front direction with respect to the rack gear 22 and the communication hole 21a is positioned on the right-hand side of the locked concave portion 29b. When the lock plate 31 is started to be moved again toward the lock position, the lock portion 33 is fit in the locked concave portion 29b and the rack gear 22 is thus locked with respect to the main body 21 (see FIG. 32). The slide plate 35 is applied with the bias force of the spring member 34 via the lock plate 31, and the stopper 35d is pressed against the back-side press portion 21c of the main body 21. As a result, the frontward movement of the slide plate 35 with respect to the main body 21 is restricted, and the slide plate 35 returns to its original position before the press by the press pin 200 is performed.

It should be noted that also when the main body 21 is moved in the front direction with respect to the rack gear 22, the guided portion 21d is guided by the guide portion 29c of the rack gear 22.

As described above, since the guided portion 21d is provided in the main body 21 and the guide portion 29c is formed in the rack gear 22 so that the guided portion 21d is guided by the guide portion 29c at the time the main body 21 is moved in the front-back direction with respect to the rack gear 22, the rack gear 22 does not fall off from the main body 21. As a result, it is possible to smoothly and positively relock the rack gear 22 with respect to the main body 21 by the slide plate 35 after the lock of the rack gear 22 with respect to the main body 21 is released and the main body 21 is moved in the back direction with respect to the rack gear 22.

As described above, in the disc drive apparatus 5, the lock of the rack gear 22 with respect to the main body 21 is released and the main body 21 is moved in the back direction with respect to the rack gear 22 at the time a forcible eject operation of the disc-like recording medium 100 is carried out.

Therefore, no load is applied from the rack gear 22 to the slide plate 35 that is moved by the press pin 200 as an eject pin, with the result that a load on the slide plate 35 is small and a smooth eject operation can be realized.

Moreover, in the disc drive apparatus 5, the link member 39 is slid in the linear direction by pressing the slide pin 39d of the link member 39 by the cam surface 28 of the slider 20 and applying a movement force of the slider 20 to the link member 39.

Therefore, a link mechanism for coupling the slider 20 and the link member 39 for applying a movement force of the slider 20 to the link member 39 is unnecessary, with the result that the mechanism can be simplified that much. Further, since the movement force of the slider 20 is applied to the link member 39 without using the link mechanism, a loss of the movement force of the slider 20 to be applied to the link member 39 is small, and a transmission efficiency of the force to be applied to the link member 39 from the slider 20 can be improved.

Furthermore, since the movement force of the slider 20 is applied to the link member 39 using the slide pin 39d and the cam surface 28 facing a predetermined direction, a mechanism for applying a movement force is simple, and the mechanism of the disc drive apparatus 5 can be additionally simplified.

The present application contains subject matter related to that disclosed in Japanese Priority Patent Application JP 2009-205906 filed in the Japan Patent Office on Sep. 7, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc drive apparatus, comprising:
    an outer casing including a disc insertion slot through which a disc-like recording medium is inserted and ejected;
    a disc drive unit that includes a disc table on which the disc-like recording medium is mounted, a spindle motor for causing the disc table to rotate, an optical pickup that is moved in a radial direction of the disc-like recording medium mounted on the disc table, and a pickup base for supporting the optical pickup such that the optical pickup becomes movable in the radial direction of the disc-like recording medium, the disk drive unit being movable in a direction in which it moves farther away from a recording surface of the disc-like recording medium;
    a slider that includes a main body and a rack gear and is movable in a first direction that is the same as an insertion direction of the disc-like recording medium with respect to the disc insertion slot and a second direction that is the same as an ejection direction of the disc-like recording medium, the slider being moved in the second direction during loading of the disc-like recording medium and moved in the first direction during ejection of the disc-like recording medium;
a drive motor that functions as a drive source for moving the slider in the first direction and the second direction;
a deceleration gear group that intermeshes with the rack gear of the slider and to which a drive force of the drive motor is transmitted;
a rotatable eject lever that is rotated in one rotational direction to press the disc-like recording medium during the ejection of the disc-like recording medium and causes the disc-like recording medium to be ejected from the disc insertion slot; and
a link member that is coupled with the eject lever and to which the drive force of the drive motor is transmitted via the slider so that the link member becomes movable, the slider being provided with
    a lock plate that is movably supported by the main body and moved between a lock position at which the rack gear is locked with respect to the main body and a lock release position at which the lock of the rack gear with respect to the main body is released to enable the main body to move with respect to the rack gear in the first direction and the second direction, and
    a slide plate that is supported by the main body while being movable in the first direction and the second direction and includes a pressed portion that is pressed in the first direction, a lock release portion for moving the lock plate from the lock position to the lock release position at a time the pressed portion is pressed and moved in the first direction, and a press portion for pressing the main body and moving it in the first direction at the time the lock plate is moved to the lock release position.

2. The disc drive apparatus according to claim 1,
wherein the slider is provided with a spring member that biases the lock plate toward the lock position from the lock release position.

3. The disc drive apparatus according to claim 1,
wherein the main body is provided with a guided portion, and
wherein the rack gear is provided with a guide portion that slidably supports the guided portion and guides the main body in the first direction and the second direction.

4. The disc drive apparatus according to claim 1, further comprising
a chassis that supports the link member while enabling the link member to slide in a predetermined linear direction and rotatably supports the eject lever,
wherein the link member is provided with a slide portion, and
wherein the slider is provided with a cam portion with which the slide portion of the link member is slidably engaged and that causes the link member to slide in the predetermined linear direction.

5. The disc drive apparatus according to claim 4,
wherein a slide pin is provided as the slide portion of the link member,
wherein a cam surface facing a predetermined direction is formed as the cam portion of the slider, and
wherein the link member slides in the predetermined linear direction with respect to the chassis by the slide pin being pressed by the cam surface and slid at a time the slider is moved in the first direction.

6. The disc drive apparatus according to claim 1, further comprising:
a guide portion with which an outer circumferential surface of the disc-like recording medium is brought into sliding contact during the loading and the ejection of the disc-like recording medium to thus guide the disc-like recording medium; and
a centering portion to hold the outer circumferential surface of the disc-like recording medium so that a center of the disc-like recording medium coincides with a center of the disc table during the loading of the disc-like recording medium,
the guide portion and the centering portion being formed integrally.

7. The disc drive apparatus according to claim 6,
wherein the guide portion and the centering portion are each formed of a resin material,
wherein the guide portion is fixed to the outer casing,
wherein the centering portion can be elastically deformed with respect to the guide portion, and
wherein the centering portion is set apart from the outer circumferential surface of the disc-like recording medium by the centering portion being elastically deformed with respect to the guide portion at a time the disc-like recording medium is mounted on the disc table during the loading.

8. An electronic apparatus, comprising:
an apparatus main body; and
a disc drive apparatus to record and/or reproduce an information signal onto/from a disc-like recording medium loaded in the apparatus main body,
the disc drive apparatus including
    an outer casing including a disc insertion slot through which a disc-like recording medium is inserted and ejected,
    a disc drive unit that includes a disc table on which the disc-like recording medium is mounted, a spindle motor for causing the disc table to rotate, an optical pickup that is moved in a radial direction of the disc-like recording medium mounted on the disc table, and a pickup base for supporting the optical pickup such that the optical pickup becomes movable in the radial direction of the disc-like recording medium, the disk drive unit being movable in a direction in which it moves farther away from a recording surface of the disc-like recording medium,
    a slider that includes a main body and a rack gear and is movable in a first direction that is the same as an insertion direction of the disc-like recording medium with respect to the disc insertion slot and a second direction that is the same as an ejection direction of the disc-like recording medium, the slider being moved in the second direction during loading of the disc-like recording medium and moved in the first direction during ejection of the disc-like recording medium,
    a drive motor that functions as a drive source for moving the slider in the first direction and the second direction,
    a deceleration gear group that intermeshes with the rack gear of the slider and to which a drive force of the drive motor is transmitted,
    a rotatable eject lever that is rotated in one rotational direction to press the disc-like recording medium during the ejection of the disc-like recording medium and causes the disc-like recording medium to be ejected from the disc insertion slot, and a link member that is coupled with the eject lever and to which the drive force of the drive motor is transmitted via the slider so that the link member becomes movable, the slider being provided with
a lock plate that is movably supported by the main body and moved between a lock position at which the rack gear is locked with respect to the main body and a lock release position at which the lock of the rack gear with respect to the main body is released to enable the main body to move with respect to the rack gear in the first direction and the second direction, and a slide plate that is supported by the main body while being movable in the first direction and the second direction and includes a pressed portion that is pressed in the first direction, a lock release portion for moving the lock plate from the lock position to the lock release position at a time the pressed portion is pressed and moved in the first direction, and a press portion for pressing the main body and moving it in the first direction at the time the lock plate is moved to the lock release position.

* * * * *